US012124142B2

(12) United States Patent
Shimoshikiryoh

(10) Patent No.: US 12,124,142 B2
(45) Date of Patent: Oct. 22, 2024

(54) DISPLAY DEVICE

(71) Applicant: Sharp Display Technology Corporation, Kameyama (JP)

(72) Inventor: Fumikazu Shimoshikiryoh, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 105 days.

(21) Appl. No.: 17/841,715

(22) Filed: Jun. 16, 2022

(65) Prior Publication Data

US 2022/0404662 A1    Dec. 22, 2022

(30) Foreign Application Priority Data

Jun. 17, 2021 (JP) ................................. 2021-101007

(51) Int. Cl.
    *G02F 1/1362* (2006.01)
    *G02F 1/1347* (2006.01)

(52) U.S. Cl.
    CPC ........ *G02F 1/13629* (2021.01); *G02F 1/1347* (2013.01); *G02F 1/136222* (2021.01); *G02F 1/136286* (2013.01)

(58) Field of Classification Search
    CPC .......................... G02F 1/1347; G02F 1/136286
    See application file for complete search history.

(56) References Cited

U.S. PATENT DOCUMENTS

| | | | | |
|---|---|---|---|---|
| 6,608,660 B1* | 8/2003 | Okamoto | .......... | G02F 1/133516 349/110 |
| 2007/0242028 A1 | 10/2007 | Kitagawa et al. | | |
| 2011/0075070 A1 | 3/2011 | Kitagawa et al. | | |
| 2011/0141405 A1 | 6/2011 | Kitagawa et al. | | |
| 2015/0323164 A1* | 11/2015 | Kwon | ..................... | F21V 21/14 362/97.1 |
| 2016/0266456 A1* | 9/2016 | Park | .................. | G02F 1/136213 |
| 2017/0192284 A1* | 7/2017 | Yoon | ................. | G02F 1/134336 |
| 2020/0292894 A1 | 9/2020 | Liu et al. | | |
| 2021/0333657 A1* | 10/2021 | Xu | ........................ | G02F 1/1347 |

FOREIGN PATENT DOCUMENTS

| | | | | |
|---|---|---|---|---|
| CN | 110824740 A | * | 2/2020 | .......... G02F 1/1323 |
| CN | 112631029 A | * | 4/2021 | .......... G02F 1/1347 |
| JP | 2002-221730 A | | 8/2002 | |
| JP | 2007-310376 A | | 11/2007 | |

* cited by examiner

*Primary Examiner* — Alexander P Gross
(74) *Attorney, Agent, or Firm* — Keating & Bennett, LLP

(57) ABSTRACT

The display device includes: a color display element including pixels that are arranged in a row direction and in a column direction and each include sub-pixels of different colors; and a liquid crystal display panel stacked with the color display element, the liquid crystal display panel including a TFT substrate, a counter substrate, and a liquid crystal layer, the TFT substrate including first bus lines extending in a first direction, second bus lines extending in a second direction intersecting the first direction, and display electrodes each at a position corresponding to an intersection of one of the first bus lines and one of the second bus lines, at least one of the first bus lines and at least one of the second bus lines each overlapping at least some sub-pixels of all colors among the sub-pixels of different colors of the color display element in a plan view.

25 Claims, 60 Drawing Sheets

R G B R G B R G B R G B R G B R G B R G B

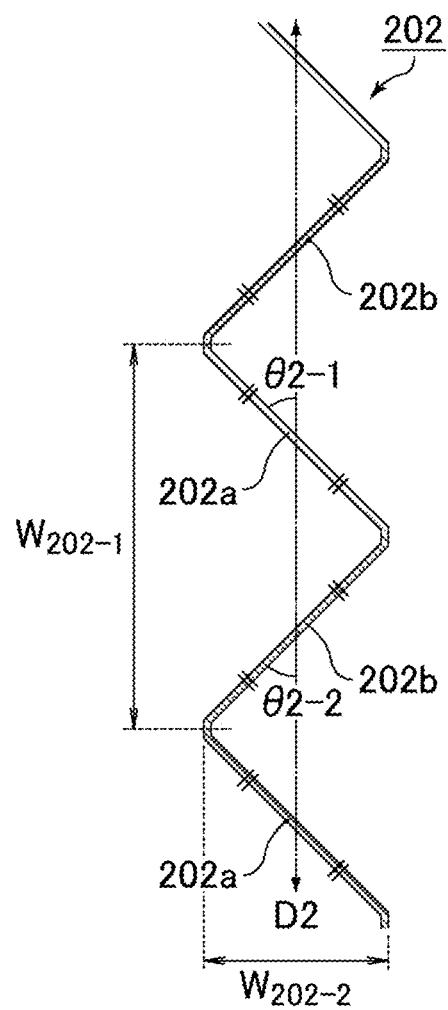

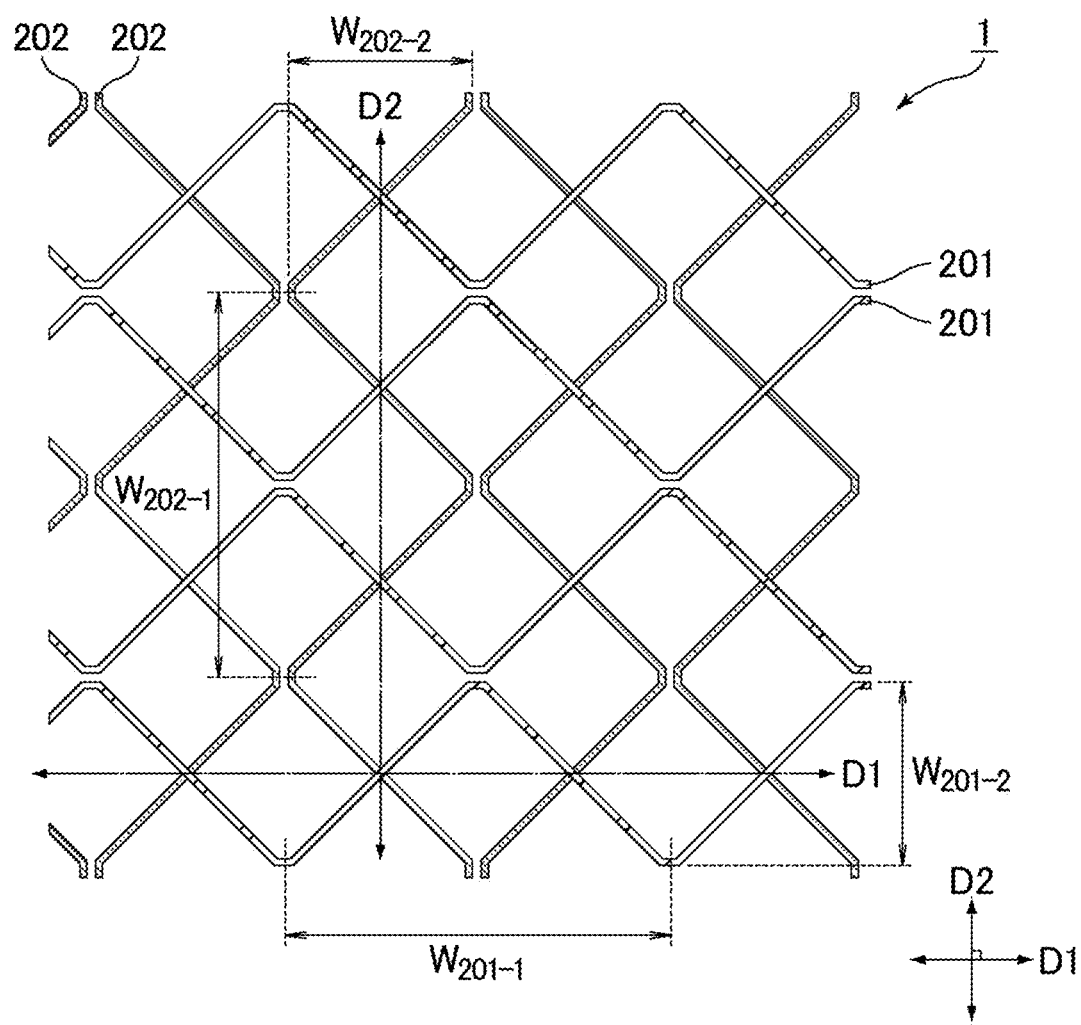

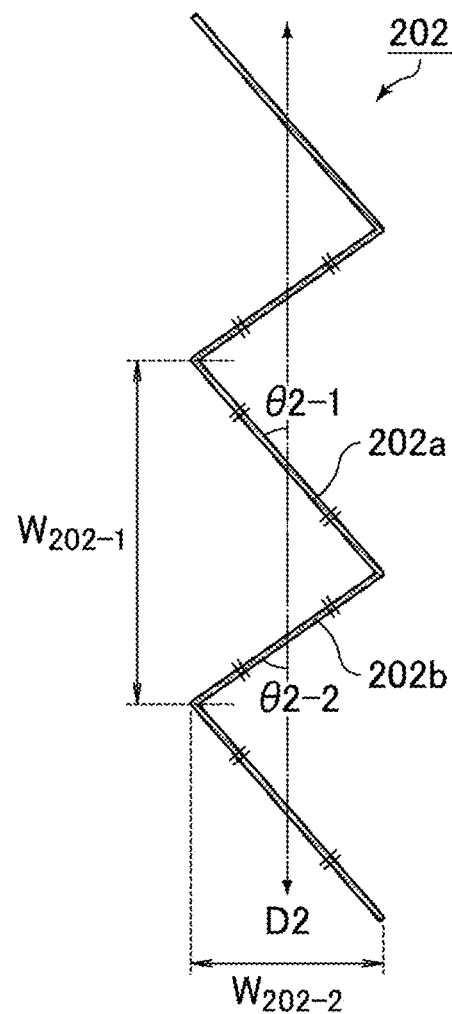

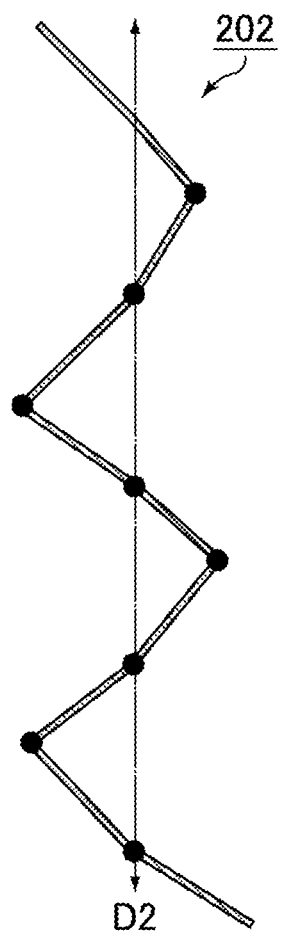

R G B R G B R G B R G B R G B R G B R G B

DISPLAY DEVICE

CROSS-REFERENCE TO RELATED APPLICATIONS

The present application claims priority under 35 U.S.C. § 119 to Japanese Patent Application No. 2021-101007 filed on Jun. 17, 2021, the contents of which are incorporated herein by reference in their entirety.

BACKGROUND OF THE INVENTION

Field of the Invention

The following disclosure relates to display devices. The following disclosure specifically relates to a display device provided with multiple display elements.

Description of Related Art

Liquid crystal display devices are display devices utilizing a liquid crystal composition to display images. In a typical display mode thereof, a liquid crystal panel containing a liquid crystal composition between a pair of substrates is irradiated with light from a backlight and voltage is applied to the liquid crystal composition to change the alignment of liquid crystal molecules, whereby the amount of light transmitted through the liquid crystal panel is controlled. Such liquid crystal display devices have advantageous features such as thin profile, light weight, and low power consumption, and are therefore used in electronic devices such as televisions, smartphones, tablet PCs, and automotive navigation systems.

Dual-cell displays including a stack of a front panel and a rear panel have been studied recently. For example, US 2020/0292894 A discloses a display panel including a liquid crystal display panel and a light control panel that are stacked, wherein the light control panel includes a plurality of signal lines; the plurality of signal lines includes a plurality of first signal lines extending along the first direction and a plurality of second signal lines extending along the second direction, and at least a part of the plurality of signal lines is a fold line.

JP 2007-310376 A discloses a liquid crystal display (LCD) device including: first and second LCD panels each including a pair of transparent substrates and a liquid crystal (LC) layer sandwiched therebetween, said first and second LCD panels being stacked one on another so that each pixel of said first LCD panel overlaps a corresponding pixel of said second LCD panel; a pair of first polarizing films sandwiching therebetween said stacked first and second LCD panels; and a light diffusion film having a light diffusing function and at least one polarizing film, which is interposed between said first LCD panel and said second LCD panel.

Although not being a technique concerning dual-cell displays, JP 2002-221730 A discloses a liquid crystal display device including two substrates that face to each other with a space and are each provided with pixel electrodes for defining pixels; and a liquid crystal layer in the space, each of the pixels being defined by the pixel electrodes and the liquid crystal layer in the space, each of the pixels having a peripheral shape of a triangle, a rhomboid, a parallelogram, a polygon with five or more sides, a circle, an ellipse, or an oval.

BRIEF SUMMARY OF THE INVENTION

Products such as a liquid crystal panel typically include a light-shielding component such as bus lines and a black matrix. In a dual-cell display device, two display elements such as liquid crystal panels are stacked. Thus, the overlapping state of a light-shielding component of a rear panel and a light-shielding component of a front panel varies according to viewing angles. Such a dual-cell display device thus has variation in transmittance depending on viewing angles and thereby tends to have moireé.

Hereinafter, occurrence of moiré in a conventional dual-cell display is described with reference to FIG. 45 to FIG. 48. FIG. 45 is a schematic cross-sectional view of an example of a conventional dual-cell display. As shown in FIG. 45, a display device 2001, which is a conventional dual-cell display, sequentially includes a front panel 2100, a rear panel 2200, and a backlight 300. The both surfaces of the front panel 2100 are individually provided with a first polarizing plate 2010 and a second polarizing plate 2020, and the both surfaces of the rear panel 2200 are individually provided with a third polarizing plate 2030 and a fourth polarizing plate 2040. Furthermore, the second polarizing plate 2020 and the third polarizing plate 2030 are attached with a diffusing optically clear adhesive (diffusing OCA) sheet 2050. As described below, the present inventor found that the haze value of the diffusing OCA 2050 for reducing or preventing moreé in such a structure is 88%. Accordingly, the dual-cell display as a whole has a haze value in white display of 88% or more. Herein, a component such as a diffusing OCA or a diffusing sheet is also referred to as a diffusing layer. The diffusing layer means a component having a haze value of 88% or more.

FIG. 46 is a schematic plan view of an example of a front panel used for a conventional dual-cell display. As shown in FIG. 46, the front panel 2100 is a color panel, for example, and includes sub-pixels 2105 in the row direction and in the column direction. Sub-pixels 2105 of the same color are arranged in the column direction. Regions surrounded by gate lines 2101 and source lines 2102 are each a sub-pixel 2105, and each sub-pixel 2105 is provided with a pixel electrode 2104 and a TFT 2103.

FIG. 47 is a schematic plan view of an example of a rear panel used for a conventional dual-cell display. As shown in FIG. 47, the rear panel 2200 includes gate lines G and source lines S, and includes a display electrode 2204 and a TFT 2203 in each of regions surrounded by the gate lines G and the source lines S. Auxiliary capacitance lines CS may be disposed in parallel to the gate lines G.

FIG. 48 is a schematic plan view of a conventional dual-cell display obtained by superimposing FIG. 46 with FIG. 47. As shown in FIG. 48, in the display device 2001, the column direction in which sub-pixels of the same color are arranged is parallel to the source lines S of the rear panel 2200. Thus, the overlapping amount between sub-pixels of each color and the source lines S varies according to viewing angles from the row direction, resulting in change in color tone perceived. Moreover, the overlapping amount between the aperture regions of the sub-pixels 2105 of the front panel 2100 and lines of the rear panel 2200, i.e., the gate lines G and the auxiliary capacitance lines CS, varies according to viewing angles from the column direction, resulting in change in brightness (luminance). Thus, in observation of the display device as a whole from a fixed viewpoint, the brightness and color tone periodically varies, resulting in perception of moreé.

In a conventional method for preventing moreé, as shown in FIG. 45, the front panel 2100 and the rear panel 2200 are attached with a diffusing OCA. Unfortunately, use of a diffusing OCA may reduce the transmittance of a display device by about 30%. In addition, use of a diffusing OCA increases the cost.

US 2020/0292894 A discusses reduction or prevention of moreé by using a rear panel provided with signal lines including fold line(s) at least in a part thereof. In the discussion, such bending line(s) is/are mainly provided for first signal lines extending in a first direction, while second signal lines extending in a second direction are preferably not to be bent (paragraph [0014]). Therefore, moreé in the first direction is insufficiently prevented. When the present inventor actually examined a display device employing the technique disclosed in US 2020/0292894 A for the same-color effective transmissive areas to be described in the later-described Embodiment 5, the transmittance varied according to the color, i.e., red R, green G, or blue B, of the sub-pixels in the left-right direction (first direction), resulting in perception of moreé.

In a device disclosed in JP 2007-310376 A, pixel display regions of a first liquid crystal display element and pixel display regions of a second liquid crystal display element correspond to each other, that is, their pixel pitches correspond to each other, and thus a reduction in transmittance is concerned. In addition, moreé caused by signal lines is insufficiently prevented.

The device disclosed in JP 2002-221730 A prevents moreé caused by signal lines alone or moreé caused by scanning lines alone. In addition, the device has a structure in which the signal lines and the scanning lines are hidden by a light-shielding film. Thus, a reduction in aperture is concerned. In particular, when this technique is applied to a dual-cell display, such a reduced transmittance acts disadvantageously. When two parallel scanning lines or two parallel signal lines are disposed between pixel electrodes, the lines may be short-circuited to reduce the yield. In order to prevent the lines from being short-circuited, the lines are to be arranged with a certain interval, possibly reducing the aperture. Moreover, horizontal lines and vertical lines are made jagged to possibly cause color blur when providing color display.

As described above, conventional dual-cell displays reduce or prevent moreé in only one of the row direction and the column direction and fail to reduce or prevent moreé in the entire surface of the display device. Such conventional dual-cell displays allow moreé to be less perceived by disposing a diffusing OCA between a front panel and a rear panel. Unfortunately, use of a diffusing OCA may reduce the transmittance and/or increase the production cost.

The following disclosure has been made in the current situation in the art, and aims to provide a dual-cell display device reducing or preventing moreé in the entire surface of the display screen and achieving a high transmittance.

(1) One embodiment of the present disclosure is directed to a display device including: a color display element including pixels that are arranged in a row direction and in a column direction and each include sub-pixels of different colors; and a liquid crystal display panel stacked with the color display element, the liquid crystal display panel including a TFT substrate, a counter substrate, and a liquid crystal layer between the TFT substrate and the counter substrate, the TFT substrate including first bus lines extending in a first direction, second bus lines extending in a second direction intersecting the first direction, and display electrodes each at a position corresponding to an intersection of one of the first bus lines and one of the second bus lines, at least one of the first bus lines and at least one of the second bus lines each overlapping at least some sub-pixels of all colors among the sub-pixels of different colors of the color display element in a plan view.

(2) In an embodiment of the present disclosure, the display device includes the structure (1), at least one of the first bus lines extend in the first direction with bending, and at least one of the second bus lines extend in the second direction with bending.

(3) In an embodiment of the present disclosure, the display device includes the structure (2), and the first direction is parallel to the row direction and the second direction is parallel to the column direction.

(4) In an embodiment of the present disclosure, the display device includes the structure (2) or (3), at least one of the first bus lines and at least one of the second bus lines each include linear portions, the first direction and at least one of the linear portions of the first bus line with bending form a bending angle within a range of $45°\pm15°$, and the second direction and at least one of the linear portions of the second bus line with bending form a bending angle within a range of $45°\pm15°$.

(5) In an embodiment of the present disclosure, the display device includes the structure (2) or (3), a sum of bending widths of the first bus lines in a direction perpendicular to the first direction is 0.75 or more and 1.25 or less times a length of a display region of the liquid crystal display panel in the direction perpendicular to the first direction, and a sum of bending widths of the second bus lines in a direction perpendicular to the second direction is 0.75 or more and 1.25 or less times a length of a display region of the liquid crystal display panel in the direction perpendicular to the second direction.

(6) In an embodiment of the present disclosure, the display device includes the structure (2) or (3), the liquid crystal display panel includes display units each provided with a corresponding one display electrode, the first bus line with bending has a bending period of three or less times a maximum length of one of the display units in the first direction, and the second bus line with bending has a bending period of three or less times a maximum length of one of the display units in the second direction.

(7) In an embodiment of the present disclosure, the display device includes the structure (2) or (3), two adjacent first bus lines among the first bus lines have a varying distance therebetween and a portion with a shortest distance between the two adjacent first bus lines is superimposed with one of the display electrodes in a plan view, or two adjacent second bus lines among the second bus lines have a varying distance therebetween and a portion with a shortest distance between the two adjacent second bus lines is superimposed with one of the display electrodes in a plan view.

(8) In an embodiment of the present disclosure, the display device includes the structure (2) or (3), the liquid crystal display panel includes display units each provided with a corresponding one display electrode, with a rectangular region whose short side corresponds to a bending width of one of the first bus lines in a direction perpendicular to the first direction and whose long side corresponds to a length of the first bus line in the first direction defined as a present region of the first bus line, and with a rectangular region whose short side corresponds to a bending width of one of the second bus lines in a direction perpendicular to the second direction and whose long side corresponds to a length of the second bus line in the second direction defined as a present region of the second bus line, two first bus lines adjacent in the direction perpendicular to the first direction have present regions satisfying one of the following relations A to C in a plan view: A: the present regions of the two adjacent first bus lines are in contact with each other; B: the present regions of the two adjacent first bus lines do not overlap each other and are spaced by a distance of 0.25 or less times a maximum length of one of the display units in the direction perpendicular to the first direction; and C: the present regions of the two adjacent first bus lines overlap each other and their overlapping width is 0.25 or less times a maximum length of one of the display units in the direction perpendicular to the first direction, and two second bus lines adjacent in the direction perpendicular to the second direction have present regions satisfying one of the following relations D to F in a plan view: D: the present regions of the two adjacent second bus lines are in contact with each other; E: the present regions of the two adjacent second bus lines do not overlap each other and are spaced by a distance of 0.25 or less times a maximum length of one of the display units in the direction perpendicular to the second direction; and F: the present regions of the two adjacent second bus lines overlap each other and their overlapping width is 0.25 or less times a maximum length of one of the display units in the direction perpendicular to the second direction.

(9) In an embodiment of the present disclosure, the display device includes any one of the structures (1) to (3), the liquid crystal display panel includes display units each provided with a corresponding one display electrode, the first bus lines each include bending points, a distance between two closest bending points of two adjacent first bus lines among the first bus lines in a direction perpendicular to the first direction is 0.25 or less times a maximum length of one of the display units in the direction perpendicular to the first direction, the second bus lines each include bending points, and a distance between two closest bending points of two adjacent second bus lines among the second bus lines in a direction perpendicular to the second direction is 0.25 or less times a maximum length of one of the display units in the direction perpendicular to the second direction.

(10) In an embodiment of the present disclosure, the display device includes any one of the structures (1) to (3), in the sub-pixels of different colors of the color display element, same-color effective transmissive areas of each color satisfy the following formula (1) and the following formula (2):

$$(S_{Max}-S_{Ave})/S_{Ave} \leq 0.25 \quad (1)$$

$$(S_{Ave}-S_{Min})/S_{Ave} \leq 0.25 \quad (2)$$

wherein $S_{Max}$ represents a maximum value of same-color effective transmissive areas of respective measurement points, $S_{Min}$ represents a minimum value of the same-color effective transmissive areas of the respective measurement points, and $S_{Ave}$ represents an average value of the same-color effective transmissive areas of the respective measurement points, wherein the same-color effective transmissive areas each mean a sum of all sub-pixel effective transmissive areas of a same color in $N^2$ pixels in a region consisting of N rows and N columns in the color display element, where N is an integer of 2 or greater, the sub-pixel effective transmissive areas each mean an area obtainable by subtracting an area of a portion overlapping any of the first bus lines and any of the second bus lines of the liquid crystal display panel from an area of an aperture region of one of the sub-pixels in a plan view, and the same-color effective transmissive areas are determined for the respective measurement points while the liquid crystal display panel is moved in the row direction and in the column direction with the color display element being fixed, wherein the measurement points are arranged in a grid pattern on the $N^2$ pixels with a certain width in the row direction and a certain width in the column direction.

(11) In an embodiment of the present disclosure, the display device includes any one of the structures (1) to (3), the liquid crystal display panel includes display units each provided with a corresponding one display electrode, and at least one of the display units has an area greater than one of the pixels of the color display element.

(12) In an embodiment of the present disclosure, the display device includes any one of the structures (1) to (3), the sub-pixels of the color display element each include a pixel electrode having an outline including at least one linear portion, and in a plan view, the linear portion of the pixel electrode extends in a direction intersecting each side forming the outline of the display electrode of the liquid crystal display panel.

(13) In an embodiment of the present disclosure, the display device includes the structure (12), and an extending direction of the linear portion of the pixel electrode and an extending direction of at least one side forming the outline of the display electrode form an angle of 30° or greater and 60° or smaller.

(14) In an embodiment of the present disclosure, the display device includes any one of the structures (1) to (3), (12), and (13), and the display electrodes each have a substantially tetragonal shape that can be within a rectangular frame whose long side has a length 1.5 or more and 2.5 or less times a length of its short side or within a rectangular frame whose long side has a length 1.25 or less times a length of its short side.

(15) In an embodiment of the present disclosure, the display device includes any one of the structures (1) to (3), in a plan view, at least one of the first bus lines and the second bus lines includes at least one electrode-overlapping portion that overlaps one of the display electrodes, and a total length of the at least one electrode-overlapping portion of one of the bus lines is 75% or more of a total length of the one of the bus lines.

(16) In an embodiment of the present disclosure, the display device includes any one of the structures (1) to (3) and (15), in a plan view, at least one of the first bus lines and the second bus lines includes at least one electrode-overlapping portion that overlaps one of the display electrodes, the at least one electrode-overlapping portion includes a first electrode-overlapping portion and a second electrode-overlapping portion, the first electrode-overlapping portion is a portion where at least one of the first bus lines overlaps one of the display electrodes, and the second electrode-overlapping portion is a portion where at least one of the second bus lines overlaps one of the display electrodes.

(17) In an embodiment of the present disclosure, the display device includes any one of the structures (1) to (3) and (15), in a plan view, at least one of the first bus lines and the second bus lines includes at least one electrode-overlapping portion that overlaps one of the display electrodes, the TFT substrate of the liquid crystal display panel further includes a transparent conductive layer and a third insulating layer, a support substrate, the first bus lines, a first insulating layer, the second bus lines, a second insulating layer, the transparent conductive layer, the third insulating layer, and the display electrodes are sequentially disposed, and in a plan view, the transparent conductive layer is superimposed with the electrode-overlapping portion.

(18) In an embodiment of the present disclosure, the display device includes any one of the structures (1) to (3), in a plan view, the liquid crystal display panel does not include a light-shielding component between two adjacent display electrodes among the display electrodes.

(19) In an embodiment of the present disclosure, the display device includes any one of the structures (1) to (18), with the liquid crystal layer of the liquid crystal display panel defined as a first liquid crystal layer, the color display element is a liquid crystal element that includes a second liquid crystal layer between paired substrates, and the display device includes a stack sequentially including a first polarizing plate, the color display element, a second polarizing plate, the liquid crystal display panel, and a third polarizing plate.

(20) In an embodiment of the present disclosure, the display device includes any one of the structures (1) to (18), with the liquid crystal layer of the liquid crystal display panel defined as a first liquid crystal layer, the color display element is a liquid crystal element that includes a second liquid crystal layer and a color filter substrate provided with a color filter, the second liquid crystal layer is sandwiched between the color filter substrate and the counter substrate of the liquid crystal display panel, the display device sequentially includes a first polarizing plate, the color filter substrate, the second liquid crystal layer, a polarizing layer, the counter substrate, the first liquid crystal layer, the TFT substrate, and a second polarizing plate, and the counter substrate includes, on a surface closer to the polarizing layer, switching elements for controlling voltage applied to the second liquid crystal layer.

(21) In an embodiment of the present disclosure, the display device includes any one of the structures (1) to (18), liquid crystal display panel is a front panel and the color display element is a rear panel, with the liquid crystal layer of the liquid crystal display panel defined as a first liquid crystal layer, the color display element is a liquid crystal element that includes a second liquid crystal layer between paired substrates, and a substrate constituting the paired substrates and located on a back surface side of the display device includes a reflector on a side facing the second liquid crystal layer.

(22) In an embodiment of the present disclosure, the display device includes any one of the structures (1) to (18), the color display element is a front panel and the liquid crystal display panel is a rear panel, and the display device sequentially includes the color display element, the liquid crystal display panel, and a backlight.

(23) In an embodiment of the present disclosure, the display device includes any one of the structures (1) to (18), the liquid crystal display panel is a front panel and the color display element is a rear panel, and the display device sequentially includes the liquid crystal display panel, the color display element, and a backlight.

(24) In an embodiment of the present disclosure, the display device includes any one of the structures (22) or (23), the backlight includes light-emitting elements of multiple colors, and the liquid crystal display panel provides color display by driving the light-emitting elements of multiple colors based on a field-sequential color system in which the light-emitting elements are turned on time-divisionally.

(25) In an embodiment of the present disclosure, the display device includes any one of the structures (1) to (18), the liquid crystal display panel is a front panel and the color display element is a rear panel, and the color display element includes a light-emitting layer.

The present disclosure can provide a dual-cell display device reducing or preventing moreé in the entire surface of the display screen and achieving a high transmittance.

BRIEF DESCRIPTION OF THE DRAWINGS

FIG. 7B is a schematic plan view of one second bus line shown in FIG. 4.

FIG. 8 is a schematic plan view of the first and second bus lines shown in FIG. 4.

FIG. 27B is a schematic plan view of one second bus line shown in FIG. 26A.

FIG. 33B is a schematic plan view of one second bus line shown in FIG. 32A.

DETAILED DESCRIPTION OF THE INVENTION

Hereinafter, display devices of embodiments of the present disclosure are described. The present disclosure is not limited to the following embodiments, and the designs of the present disclosure can be modified as appropriate within the range satisfying the configuration of the present disclosure. Also, like reference signs refer to portions having the same structure, and redundant description of already described portions is omitted.

Embodiment 1

(Display Device)

Figure 1:
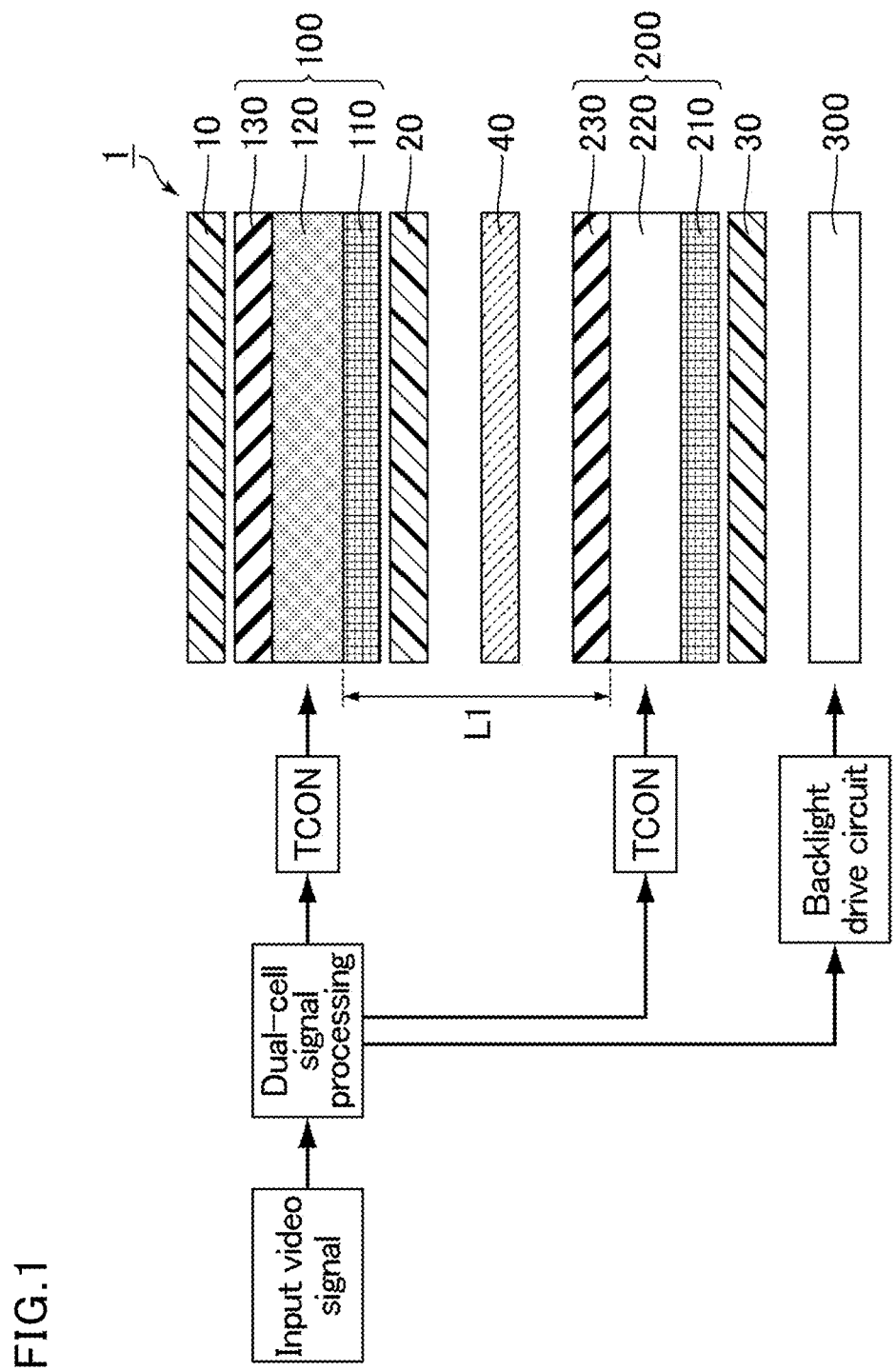
FIG. 1 is a schematic cross-sectional view of a display device of Embodiment 1.

FIG. 1 is a schematic cross-sectional view of a display device of Embodiment 1. As shown in FIG. 1, a display device 1 of Embodiment 1 includes a color display element 100 and a liquid crystal display panel 200 stacked with the color display element 100. Either the color display element 100 or the liquid crystal display panel 200 may be disposed on the viewer side. FIG. 1 shows the case where the color display element 100 serves as a front panel and the liquid crystal display panel 200 serves as a rear panel. The display device 1 sequentially includes the color display element 100, the liquid crystal display panel 200, and the backlight 300.

The display device 1 is a dual-cell display and includes a dual-cell signal processing system that generates a video displayed on the front panel and a video displayed on the rear panel in response to input signals. Dual cell signal processing is executed based on the input video signals. Then, a video signal is input to the color display element 100 and the liquid crystal display panel 200 from different timing controllers (TCONs), and a lighting signal is input to the backlight 300 from a backlight drive circuit. The color display element 100 is used as a front panel, and the liquid crystal display panel 200 is used as a rear panel and also as a dimming panel for controlling the luminance of a video displayed on the color display element 100 from a back surface. Thereby, display with a high contrast ratio can be provided.

The display device 1 includes a stack sequentially including a first polarizing plate 10, the color display element 100, a second polarizing plate 20, the liquid crystal display panel 200, and a third polarizing plate 30. The second polarizing plate 20 is shared between the color display element 100 and the liquid crystal display panel 200. The display device 1 employs a highly transparent OCA 40 instead of the diffusing OCA 2050 shown in FIG. 45. Use of the highly transparent OCA 40 can reduce adverse effects, such as polarization change and depolarization, on light during passing through the OCA sheet 40 and thus can eliminate a component corresponding to the third polarizing plate 2030 on the side closer to the rear panel 2200 of the conventional dual-cell display shown in FIG. 45. In Embodiment 1, the third polarizing plate 2030 is eliminated. Absence of one polarizing plate and a diffusing OCA achieves an increased transmittance as compared to a conventional dual-cell display. The highly transparent OCA 40 is an adhesive sheet having a haze value of 79% or lower, for example.

The second polarizing plate 20 may be in contact with the highly transparent OCA 40. Also, the highly transparent OCA 40 may be in contact with the liquid crystal display panel 200 (in FIG. 1, a counter substrate 230).

The first polarizing plate 10, the second polarizing plate 20, and the third polarizing plate 30 are each preferably a linearly polarizing plate. The linearly polarizing plate may be any product conventionally known in the field of liquid crystal display devices. Preferably, the transmission axis of the first polarizing plate 10 and the transmission axis of the second polarizing plate 20, and the transmission axis of the second polarizing plate 20 and the transmission axis of the third polarizing plate 30 are each arranged in the crossed Nicols.

The display device 1 can reduce or prevent moreé and thus, differently from a conventional display device, has no need for disposing a diffusing OCA between the color display element 100 and the liquid crystal display panel 200. With the structure without a diffusing OCA, the display device 1 as a whole has a haze value in white display of preferably 79% or lower, more preferably 50% or lower. The term "white display" means a state of display at the highest gray scale.

<Discussion of Haze Value>

The haze values and the total light transmittance values of diffusing layers employing different OCA sheets A to E were measured. The term "total light transmittance" means the transmittance to light including parallel light (light traveling straight without being diffused) and diffusion light, i.e., to light spreading at all azimuths. Relations between the haze value, the total light transmittance, the transmittance to parallel light (perfectly parallel light transmittance), and the transmittance to diffusion light (diffusion light transmittance) are defined by the following formulas (A) to (C). Haze values and total light transmittance values were measured with a turbidity meter "HazeMeter NDH2000" available from Nippon Denshoku Industries Co., Ltd., for example. Haze values were measured in accordance with the method shown in JIS K 7136. Total light transmittance values were measured in accordance with the method shown in JIS K 7361-1.

$$\text{Haze value} = \text{diffusion light transmittance}/\text{total light transmittance} \quad (A)$$

$$\text{Total light transmittance} = \text{diffusion light transmittance} + \text{perfectly parallel light transmittance} \quad (B)$$

$$\text{Perfectly parallel light transmittance} = \text{total light transmittance} \times (1 - \text{haze value}) \quad (C)$$

In determination of the transmittance of light passing through a display device, the following points should be considered: that light emitted from a backlight spreads to a certain extent; that a light receiver of a measurement device has a receiving angle with a certain spread; light distribution of the diffusing layer used; and the like. It is thus difficult to estimate the transmittance of light passing through a display device from the perfectly parallel light transmittance of the diffusing layer. Accordingly, the present inventor measured the transmittance of the diffusing layer by the same method as the below mentioned method for measuring the transmittance of light passing through a display device. Herein, the transmittance of a diffusing layer measured by the method for measuring the transmittance of light passing through a display device is also referred to as a "substantially parallel light transmittance".

(Method for Measuring Substantially Parallel Light Transmittance)

Figure 49:
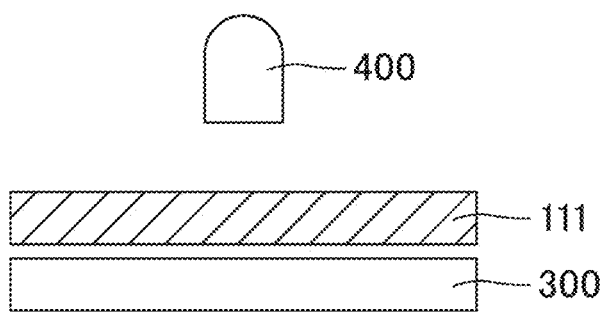
FIG. 49 is a first schematic view showing a method for measuring a substantially parallel light transmittance.
Figure 50:
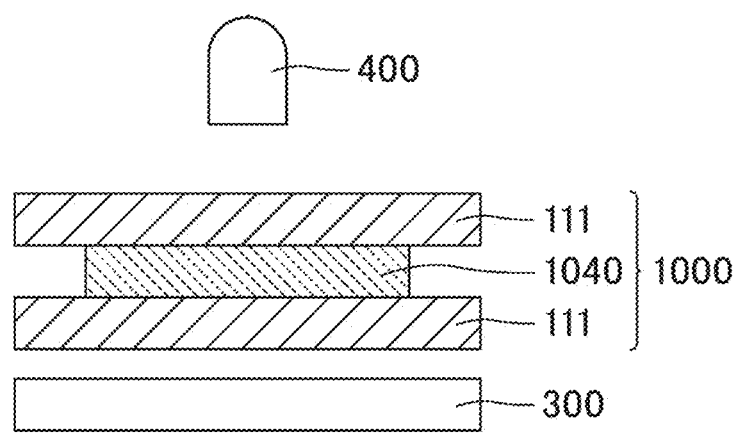
FIG. 50 is a second schematic view showing the method for measuring a substantially parallel light transmittance.

Hereinafter, a method for measuring a substantially parallel light transmittance is described with reference to FIG. 49 and FIG. 50. FIG. 49 is a first schematic view showing a method for measuring a substantially parallel light transmittance. FIG. 50 is a second schematic view showing the method for measuring a substantially parallel light transmittance. First, as shown in FIG. 49, a glass substrate 111 is placed on the backlight 300, and the amount of light passing through the glass substrate 111 is measured with a photometer 400 from the side opposite to the backlight 300. The obtained value is defined as T_Ref.

The backlight 300 is a backlight conventionally known in the field of liquid crystal display devices, as used in the embodiments of the present application. The support substrate 111 is a product similar to those used for the color filter substrate and the TFT substrate of the color display element 100 and the liquid crystal display panel 200, and is a glass plate, for example. The photometer 400 is a product used for evaluation of liquid crystal panels, and an example thereof is CA310 available from Konica Minolta, Inc.

Next, as shown in FIG. 50, sample pieces for transmittance evaluation are each produced by attaching two glass plates (support substrates 111) with one of OCA sheets A to E as a diffusing layer 1040. Each sample piece for transmittance evaluation is placed on the backlight 300, and the amount of light transmitted is measured with the photometer 400. The obtained value is defined as T_Sample of each sample. The substantially parallel light transmittance is defined by the following formula (D).

$$\text{Substantially parallel light transmittance} = T\_Sample / T\_Ref \quad (D)$$

<Discussion of Moreé Perception>

Dual-cell displays of Study Examples 1 to 6 were prepared by disposing different diffusing layers between the front panel 2100 and the rear panel 2200 of the conventional dual-cell display shown in FIG. 45 to FIG. 48, and moreé perception of each example was examined. Study Example 1 is an example without a diffusing layer between the front panel 2100 and the rear panel 2200. Study Examples 2 to 6 are examples in which the OCA sheets A to E are respectively used as a diffusing layer.

Each of the conventional dual-cell displays of Study Examples 1 to 6 was displayed in white display, and moreé perception was visually evaluated from various directions including the front direction at a distance of 1 m from the display. In the following table, the cases where no moreé was perceived were evaluated as good, the cases where moreé was slightly perceived were evaluated as fair, and the cases where moreé was clearly perceived were evaluated as poor.

Figure 53:
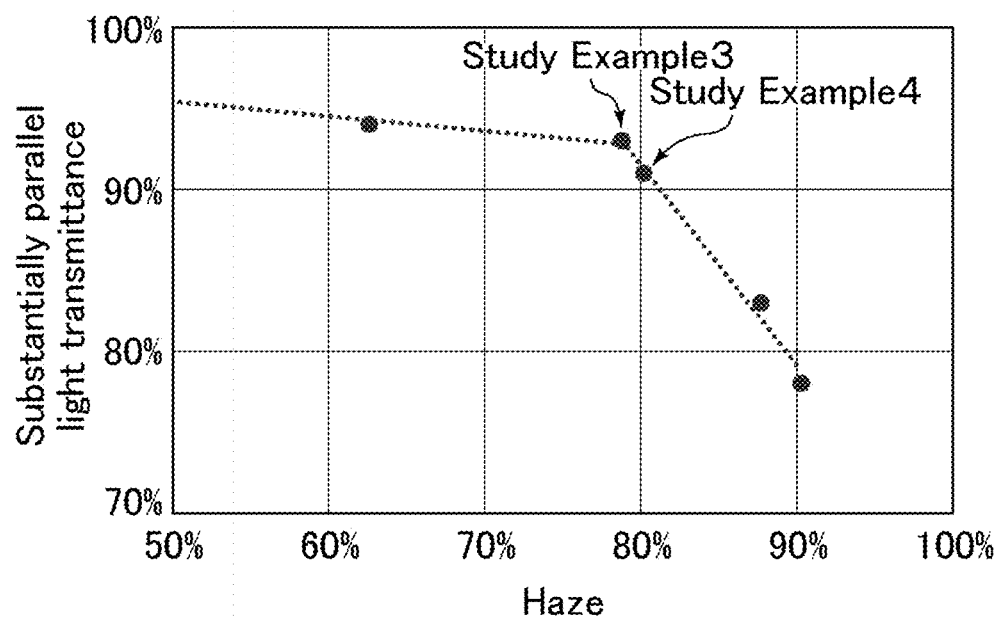
FIG. 53 is a graph showing relations between the haze value and the substantially parallel light transmittance of diffusing layers.

The following Table 1 summarizes the haze value, total light transmittance, perfectly parallel light transmittance, and substantially parallel light transmittance of each diffusing layer and moreé perception of each of Study Examples 1 to 6. In Study Example 1 in which no OCA sheet was used as a diffusing layer, the T_Sample value was made to be the same as the T_Ref value.

parallel light transmittance. As shown in FIG. 53, a diffusing layer having a higher haze value has a lower substantially parallel light transmittance, and strikingly, when the haze value exceeds 78.8%, which is the value of Study Example 3 and considered as a boundary, the substantially parallel light transmittance is sharply reduced.

Consideration of the results in FIG. 53 along with the moreé perception shown in Table 1 demonstrates that allowing the haze value of a diffusing layer to be 79% or lower can avoid a sharp reduction of the panel transmittance (substantially parallel light transmittance). In contrast, as described above, a conventional dual-cell display cannot reduce or prevent moreé when the haze of the diffusing layer is 79% or lower. The display device 1 of Embodiment 1, whose structure causes no perception of moreé, can employ a highly transparent OCA sheet whose haze value is 79% or lower, for example, to achieve both of reduction or prevention of moreé and improvement in transmittance.

The color display element 100 and the liquid crystal display panel 200 may be or may not be attached together, but are preferably attached together. This is because attaching the color display element 100 to the liquid crystal display panel 200 can eliminate interfacial reflection between an air layer and a glass substrate such as a base of the TFT substrate 110 or a base of the counter substrate 230 shown in FIG. 1, increasing the transmittance. In addition, attaching

TABLE 1

|  | Study Example 1 | Study Example 2 | Study Example 3 | Study Example 4 | Study Example 5 | Study Example 6 |
|---|---|---|---|---|---|---|
| Type of diffusing layer | Without OCA sheet | OCA sheet A | OCA sheet B | OCA sheet C | OCA sheet D | OCA sheet E |
| Haze | 0% | 62.60% | 78.80% | 80.20% | 87.70% | 90.30% |
| Total light transmittance | 100% | 91.00% | 90.80% | 90.80% | 90.70% | 88.80% |
| Perfectly parallel light transmittance | 0% | 34% | 19% | 18% | 11% | 9% |
| Substantially parallel light transmittance | 100% | 94% | 93% | 91% | 83% | 78% |
| Perception of moire | Poor | Poor | Poor | Fair | Good | Good |

Concerning moreé perception, the results of Study Examples 5 and 6 shown in Table 1 demonstrate that a diffusing layer having a haze value of 88% or more (87.70% or more) can prevent moreé. In other words, when moreé is to be prevented by use of a diffusing layer alone, the diffusing layer should have a haze value of 88% or more. Meanwhile, the results of Study Examples 1 to 3 demonstrate that a conventional dual-cell display, even when including a diffusing layer, cannot reduce or prevent moreé when the haze value is 79% or lower.

Figure 51:
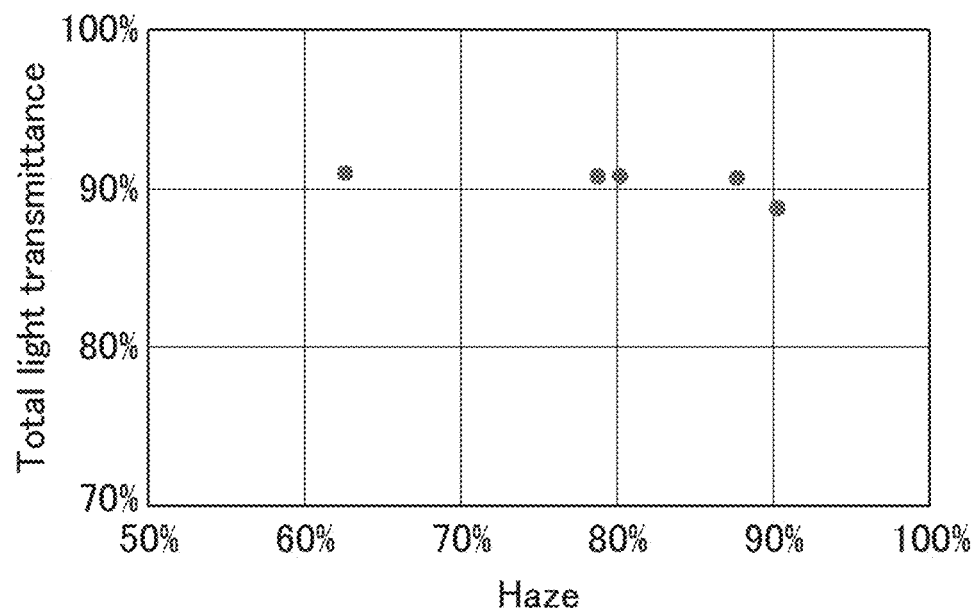
FIG. 51 is a graph showing relations between the haze value and the total light transmittance of diffusing layers.
Figure 52:
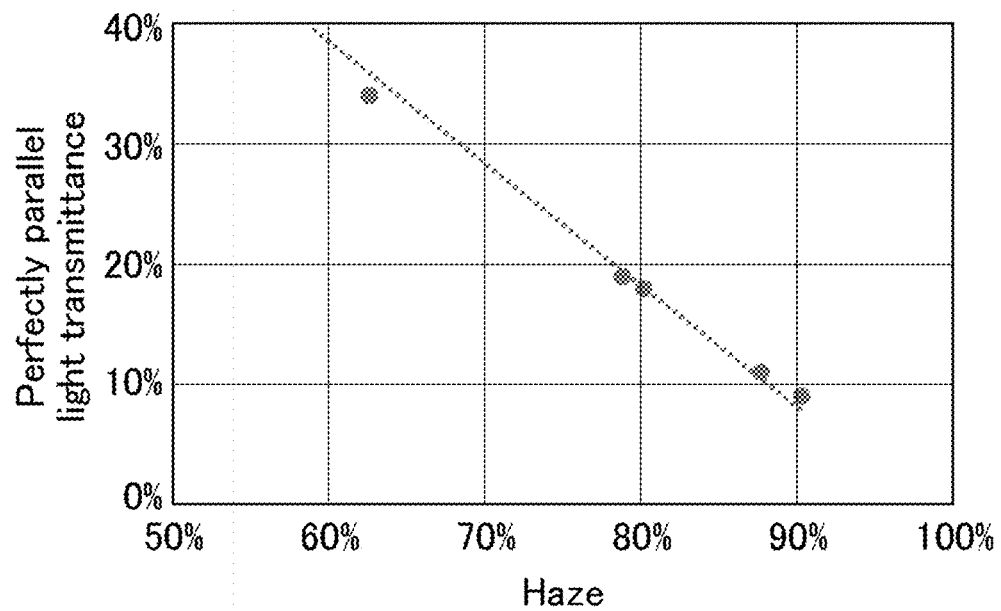
FIG. 52 is a graph showing relations between the haze value and the perfectly parallel light transmittance of diffusing layers.

The relation between the haze value and the total light transmittance, the relation between the haze value and the perfectly parallel light transmittance, and the relation between the haze value and the substantially parallel light transmittance are discussed below. FIG. 51 is a graph showing relations between the haze value and the total light transmittance of diffusing layers. FIG. 52 is a graph showing relations between the haze value and the perfectly parallel light transmittance of diffusing layers. FIG. 53 is a graph showing relations between the haze value and the substantially parallel light transmittance of diffusing layers.

As shown in FIG. 51, the haze value of a diffusing layer and the total light transmittance of the diffusing layer have no correlation. In contrast, as shown in FIG. 52, a diffusing layer having a higher haze value has a lower perfectly the color display element 100 to the liquid crystal display panel 200 can prevent positional misalignment between the pixels of the color display element 100 and the display units of the liquid crystal display panel 200, even when the color display element 100 or the liquid crystal display panel 200 is warped by heat or receives physical impact.

When the color display element 100 and the liquid crystal display panel 200 are attached together, either of a highly transparent OCA or a diffusing OCA may be used. In terms of improving the transmittance and reducing the cost, use of a highly transparent OCA is preferred. In addition, when the number of polarizing plates between the color display element 100 and the liquid crystal display panel 200 is one, ultraviolet light can efficiently reach the OCA by applying ultraviolet light from the side closer to the color display element 100 or the side closer to the liquid crystal display panel 200. Thus, a UV-curable OCA can be used, achieving curing in a short time. When the color display element 100 and the liquid crystal display panel 200 are not attached together, a diffusing sheet may be used. As described above, in the display device 1, the third polarizing plate 2030 is removed, which is disposed on the side closer to the rear panel 2200 of the conventional dual-cell display shown in FIG. 45. This is because removal of the third polarizing plate 2030 on the side closer to the rear panel 2200 can prevent the display device from receiving an influence of slight depolarization and scattering caused by a component such as a highly transparent OCA sheet, whereby a higher contrast ratio can be achieved than the case with removal of the second polarizing plate 2020 on the side closer to the front panel 2100.

Any backlight 300 conventionally known in the field of liquid crystal display devices may be used, and examples thereof include a direct-lit backlight and an edge-lit backlight. The backlight 300 may be configured to emit light to the entire surface or may be driven by local dimming in which the light-emitting surface of the backlight is divided into multiple light-emitting areas and the areas are separately driven. Local dimming driving of a direct-lit backlight can further improve the contrast ratio. The backlight 300 may include light-emitting elements of multiple colors, and the light-emitting elements of multiple colors may be driven based on a field-sequential color system in which the light-emitting elements are turned on time-divisionally to allow the liquid crystal display panel 200 to provide color display. Furthermore, in order to provide a clearer video, the whole of or part of the backlight 300 may be flickered periodically. Such a displaying method is also referred to as black frame insertion or impulse-driving. Specifically, the backlight 300 is turned off synchronously with a frame rate (e.g., 120 Hz), whereby the properties of video display can be improved.

Figure 2:
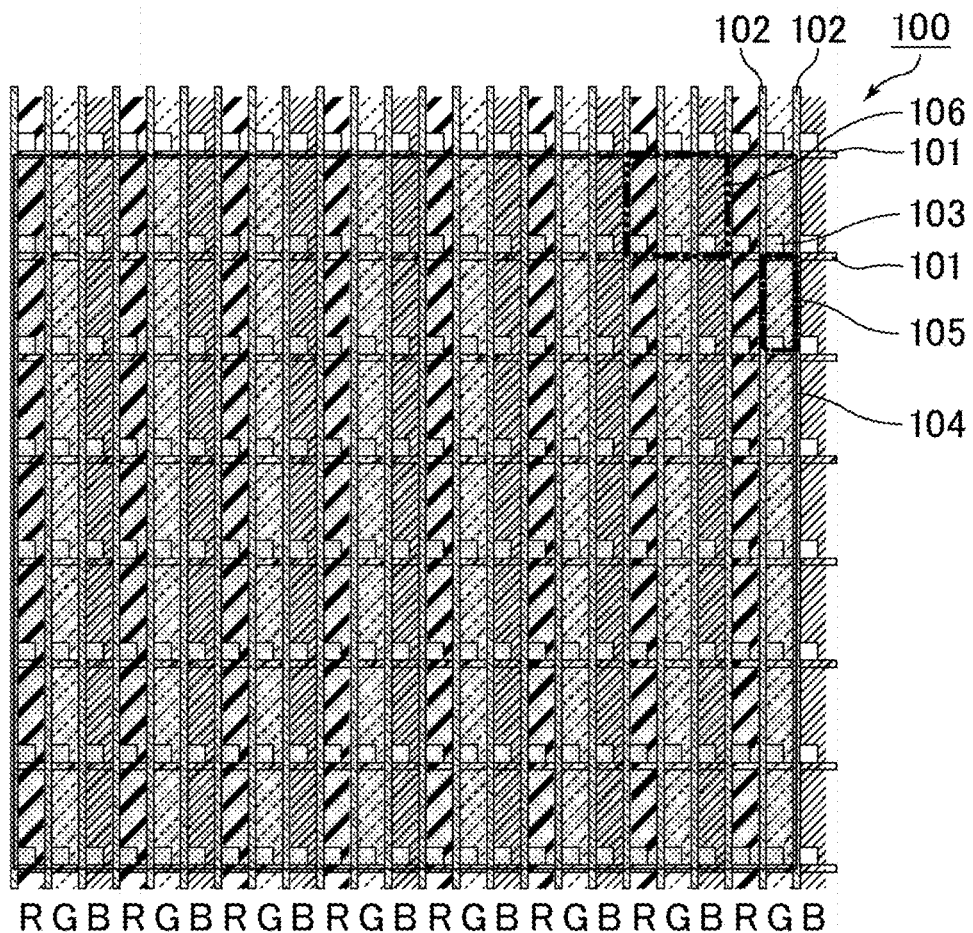
FIG. 2 is a schematic plan view of a color display element of Embodiment 1.
Figure 3:
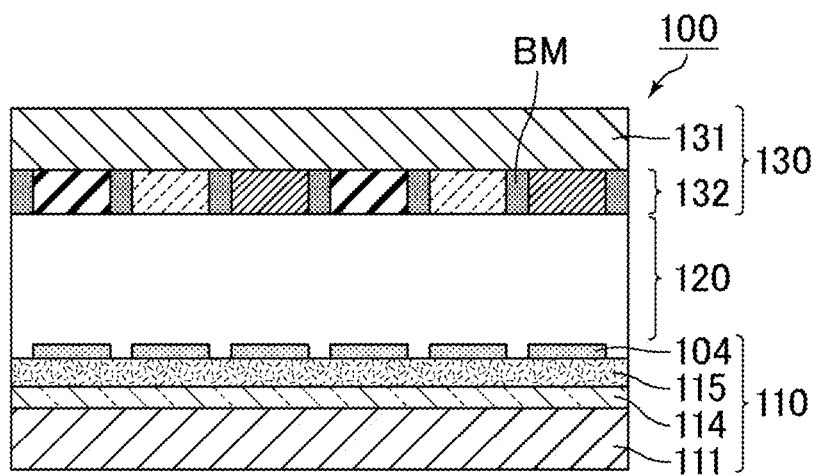
FIG. 3 is a schematic cross-sectional view of the color display element of Embodiment 1.

The following shows comparison of the transmittance and the contrast ratio (CR) between the display device of Embodiment 1 and a conventional dual-cell display. The following Table 2 and Table 3 summarize the transmittance, white luminance, black luminance, and CR of the conventional dual-cell display and those of the display device of Embodiment 1, respectively. The conventional dual-cell display had the structure shown in FIG. 45 and employed a liquid crystal display panel having the structure shown in FIG. 47 as a rear panel. As an example of the display device of Embodiment 1, a liquid crystal display panel having the structure shown in FIG. 1 and employing a rear panel having the structure shown in the later-described FIG. 4 and FIG. 5 was used. As for the front panel, each of the conventional dual-cell display and the display device of Embodiment 1 employed a conventionally known color display panel as shown in FIG. 2 and FIG. 3.

TABLE 2

| Conventional dual-cell display | Transmittance (%) | c White luminance (nit) | d Black luminance (nit) | CR = d/c |
|---|---|---|---|---|
| a Front panel | 5.0 | 1000 | 1.00000 | 1,000 |
| Diffusing OCA | 78.0 | — | — | — |
| Rear panel | 28.3 | — | — | — |
| b Entire dual-cell display | 2.4 | 479 | 0.00041 | 1,168,307 |
| Front panel ratio = b/a | 47.9% | 47.9% | 1/2,439 | 1,168 times |

TABLE 3

| Dual-cell display of Embodiment 1 | Transmittance (%) | c White luminance (nit) | d Black luminance (nit) | CR = d/c |
|---|---|---|---|---|
| a Front panel | 5.0 | 1000 | 1.00000 | 1,000 |
| Transparent OCA | 100.0 | — | — | — |
| Rear panel | 32.4 | — | — | — |
| b Entire dual-cell display | 3.5 | 704 | 0.00032 | 2,200,000 |
| Front panel ratio = b/a | 70.3% | 70.4% | 1/3,125 | 2,200 times |

As shown in Table 2, the conventional dual-cell display achieves a black luminance of 0.00041 nit which is extremely low and a CR of 1,168,307 which is extremely high. The black luminance corresponds to 1/2439 of that of the front panel alone, and the CR corresponds to about 1,168 times that of the front panel alone. Meanwhile, the conventional dual-cell display includes a diffusing OCA between the rear panel and the front panel in order to reduce perception of moreé. Accordingly, as shown in Table 2, the transmittance is as low as 2.4% and the white luminance is as low as 479 nit. These values correspond to about 47.9% of those of the front panel alone.

In contrast, the display device of Embodiment 1, having a structure unlikely causing moreé, has no need for using a diffusing OCA and thus can employ a highly transparent OCA instead. In addition, absence of a diffusing OCA can prevent phenomena such as polarization change and depolarization between the rear panel and the front panel, which can omit a polarizing plate between the rear panel and the front panel. Elimination of a diffusing OCA and one polarizing plate achieves a transmittance of 3.5% and a white luminance of 704 nit. These values correspond to about 70.4% of those of the front panel alone and achieve an improvement corresponding to 1.5 times the values of the conventional dual-cell display.

(Color Display Element)

The color display element 100 may be any product that can provide color display. FIG. 1 shows the case where the color display element 100 is a liquid crystal element. FIG. 2 is a schematic plan view of a color display element of Embodiment 1. FIG. 3 is a schematic cross-sectional view of the color display element of Embodiment 1.

As shown in FIG. 2, the color display element 100 includes pixels each including sub-pixels of different colors and being arranged in the row direction and in the column direction. Sub-pixels of the same color may be arranged in the row direction or the column direction. Hereinafter, such an arrangement is also referred to as a same-color striped arrangement. The sub-pixels of different colors include, for example, red sub-pixels R, green sub-pixels G, and blue sub-pixels B. A region including one red sub-pixel R, one green sub-pixel G, and one blue sub-pixel B is also referred to as a pixel 106.

As shown in FIG. 3, with the later-described liquid crystal layer 220 of the liquid crystal display panel 200 defined as a first liquid crystal layer 220, the color display element 100 may be a liquid crystal element including a second liquid crystal layer 120 between paired substrates. The paired substrates consist of the color filter substrate 130 and the TFT substrate 110, for example. FIG. 1 shows the case where the color filter substrate 130 is located on the viewer side. Alternatively, the TFT substrate 110 may be located on the viewer side.

As shown in FIG. 2, the TFT substrate 110 includes parallel gate lines 101 and parallel source lines 102, and the gate lines 101 and the source lines 102 intersect each other. The gate lines 101 and the source lines 102 are preferably perpendicular to each other. A region surrounded by two adjacent gate lines 101 and two adjacent source lines 102 corresponds to a sub-pixel 105. In a plan view, a switching element 103 such as a thin film transistor (TFT) is disposed in the vicinity of the intersection of a gate line 101 and a source line 102. Each sub-pixel is provided with a pixel electrode 104 and a TFT 103. When the voltage of a gate line is made ON-voltage, the semiconductor layer of each TFT 103 connected to the gate line is energized, whereby a source signal is input from each source line to the corresponding pixel electrode 104.

The color filter substrate 130 or the TFT substrate 110 may include a counter electrode for forming an electric field with the pixel electrodes 104. FIG. 3 shows the case where the TFT substrate 110 sequentially includes the support substrate 111 such as a glass substrate, a counter electrode 114, an insulating layer 115, and the pixel electrodes 104. Examples of the material for the counter electrode 114 and the pixel electrodes 104 include transmissive electrode materials such as indium tin oxide (ITO) and indium zinc oxide (IZO).

The second liquid crystal layer 120 and the liquid crystal layer 220 (first liquid crystal layer) of the later-described liquid crystal display panel 200 each include liquid crystal molecules. The liquid crystal molecules may have a positive anisotropy of dielectric constant ($\Delta \varepsilon$) (positive type) or a negative anisotropy of dielectric constant (negative type) defined by the following formula.

$$\Delta \varepsilon = \text{(dielectric constant of liquid crystal molecules in major axis direction)} - \text{(dielectric constant of liquid crystal molecules in minor axis direction)} \quad (L)$$

As described below, a distance L1 between the first liquid crystal layer 220 and the second liquid crystal layer 120 in the thickness direction of the display device 1 is preferably 0.1 or more times the maximum length of one display unit 205 in a first direction D1 or the maximum length of one display unit 205 in a second direction D2, whichever is longer. In FIG. 1, the distance L1 indicates the distance between the surface closer to the counter substrate 230 of the first liquid crystal layer 220 and the surface closer to the TFT substrate 110 of the second liquid crystal layer 120. When the distance L1 is less than 0.1 times the maximum length of one display unit 205 in the first direction D1 or the maximum length of one display unit 205 in the second direction D2, whichever is longer, moreé does not occur. Meanwhile, when the color display element 100 and the liquid crystal display panel 200 are spaced, an image displayed on the color display element 100 is misaligned from an image displayed on the liquid crystal display panel 200 in an oblique view even when the image displayed on the color display element 100 is superimposed with the image displayed on the liquid crystal display panel 200 in a front view. This may cause a phenomenon of double vision (double image). In order to prevent the double image phenomenon, the distance L1 is preferably 50 or less times the maximum length of one display unit 205 in the first direction D1 or the maximum length of one display unit 205 in the second direction D2, whichever is longer. Specifically, the distance L1 is preferably 5 mm or shorter, more preferably 1 mm or shorter.

The color filter substrate 130 may be any product conventionally known in the field of liquid crystal display devices. As shown in FIG. 3, the color filter substrate 130 may include a support substrate 131 such as a glass substrate and a color filter layer 132 formed on the support substrate. The color filter layer 132 may include red color filters superimposed with the red sub-pixels R, green color filters superimposed with the green sub-pixels G, blue color filters superimposed with the blue sub-pixels B, and a black matrix BM partitioning color filters of the respective colors.

(Liquid Crystal Display Panel)

As shown in FIG. 1, the liquid crystal display panel 200 includes the TFT substrate 210, the counter substrate 230, and the liquid crystal layer 220 sandwiched between the TFT substrate 210 and the counter substrate 230. FIG. 1 shows the case where the counter substrate 230 is located on the viewer side. Alternatively, the TFT substrate 210 may be located on the viewer side.

Figure 4:
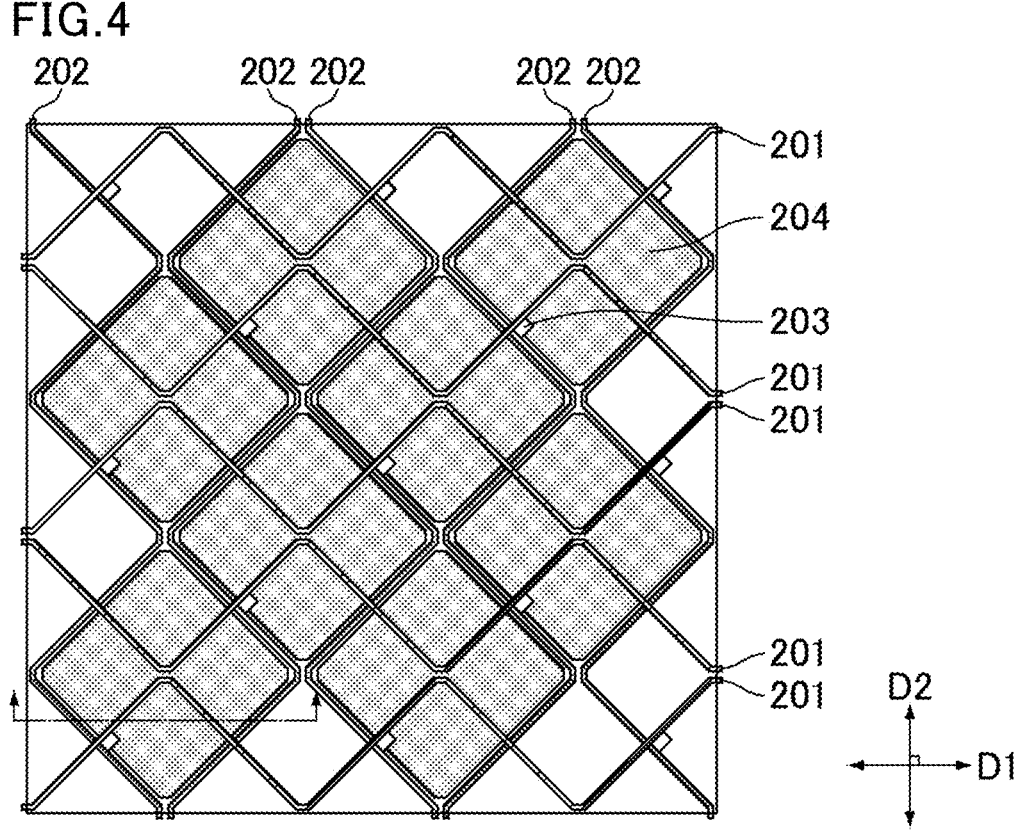
FIG. 4 is a schematic plan view of a TFT substrate included in a liquid crystal display panel of Embodiment 1.

FIG. 4 is a schematic plan view of the TFT substrate included in the liquid crystal display panel of Embodiment 1. As shown in FIG. 4, the TFT substrate 210 includes first bus lines 201 extending in the first direction D1 and second bus lines 202 extending in the second direction D2 that intersects the first direction D1. The first direction D1 corresponds to a comprehensive extending direction of the first bus lines 201 in observation of the display device as a whole. The second direction D2 corresponds to a comprehensive extending direction of the second bus lines 202 in observation of the display device as a whole. Even when the first bus lines 201 and the second bus lines 202 each include bending portion(s), any of the first direction D1 and the second direction D2 do not correspond to the extending direction of a line segment forming the bending portion(s).

The TFT substrate 210 includes display electrodes 204 disposed at positions corresponding to the intersections of the first bus lines 201 and the second bus lines 202. The switching elements 203 may be disposed in the vicinity of the respective intersections of the first bus lines 201 and the second bus lines 202. The switching elements 203 are each a thin film transistor (TFT), for example. One TFT 203 is disposed for each display electrode 204. For example, in one display electrode 204 disposed at a position corresponding to an intersection of one first bus line 201 and one second bus line 202, when the voltage of the first bus line 201 is made ON-voltage, the semiconductor layer of the TFT 203 is energized, whereby a source signal is input from the second bus line 202 to the display electrode 204. As described above, one first bus line 201 and one second bus line 202 that are controlled by one switching element 203 to switch between on and off of an input signal to be input to one display electrode 204 are also referred to as a first bus line 201 and a second bus line 202 related to one display electrode 204 through a TFT 203.

The display electrodes 204 are preferably arranged in the row direction and in the column direction. Display electrodes 204 on the same row may receive a gate signal from the same first bus line 201 to turn on the corresponding TFTs 203. The display electrodes 204 on the same row may receive a source signal from the same second bus line 202 at the timings when the corresponding TFTs 203 are turned on. This arrangement achieves high compatibility with video signals used in a typical liquid crystal panel.

The number of the first bus lines 201 or the number of the second bus lines 202 between adjacent display electrodes 204 is preferably one. When two or more bus lines are disposed between adjacent display electrodes 204, the lines may be short-circuited to reduce the yield, and thus a certain distance is to be made between the lines in order to prevent the short-circuit of the lines. As a result, the aperture may be reduced, or parasitic capacitance with the display electrodes 204 may be increased.

Preferably, the first direction is parallel to the row direction and the second direction is parallel to the column direction. The term "parallel" herein means that an angle formed by two directions is 0° or greater and 10° or smaller, more preferably 5° or smaller, still more preferably 0°. The angle formed by the first direction D1 and the second direction D2 is preferably 45° or greater and 90° or smaller. A more preferred lower limit thereof is 60° and a still more preferred lower limit thereof is 80°. Particularly preferably, the first direction D1 and the second direction D2 are perpendicular to each other.

Preferably, the liquid crystal display panel 200 does not include a light-shielding component between adjacent display electrodes 204 in a plan view. Absence of a light-shielding component can further increase the transmittance of the display device 1. An example of the light-shielding component is a black matrix.

The counter substrate 230 may or may not include color filters. When the counter substrate 230 does not include color filters, the liquid crystal display panel 200 may be a monochrome panel. The monochrome panel can provide single-color gray scale display by controlling the amount of light passing through the panel. Even when the liquid crystal display panel 200 is a monochrome panel, color display can be provided by driving the backlight 300 based on the field-sequential color system.

Figure 5:
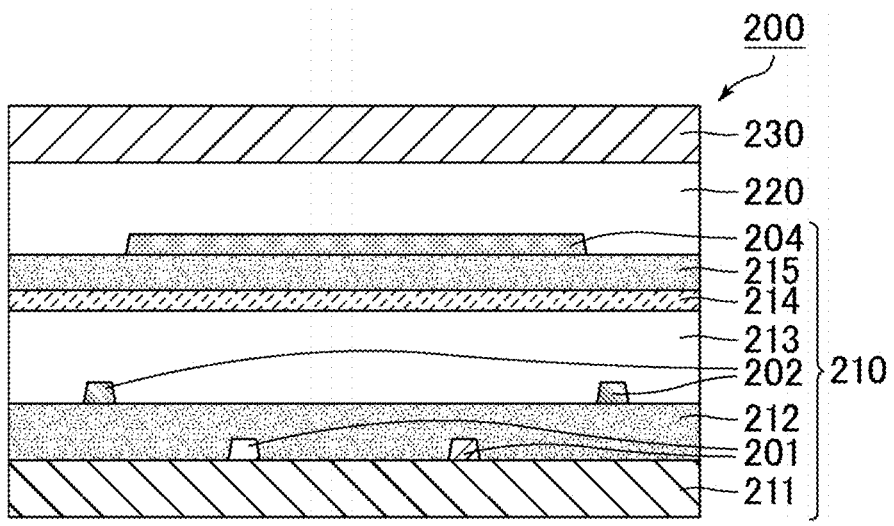
FIG. 5 is a schematic cross-sectional view taken along the dash-dotted line in FIG. 4.

FIG. 5 is a schematic cross-sectional view taken along the dash-dotted line in FIG. 4. As shown in FIG. 5, the TFT substrate 210 may sequentially include a support substrate 211, the first bus lines 201, a first insulating layer 212, the second bus lines 202, a second insulating layer 213, and the display electrodes 204. The structure in which the first bus lines 201, the second bus lines 202, and the display electrodes 204 are disposed in different layers allows a more flexible design in arranging the first bus lines 201 and the second bus lines 202.

Preferably, between the second insulating layer 213 and the display electrodes 204, a transparent conductive layer 214 and a third insulating layer 215 are sequentially disposed from the side closer to the second insulating layer 213. The transparent conductive layer 214 shields the first bus lines 201 from the display electrodes 204 and shields the second bus lines 202 from the display electrodes 204, whereby the first bus lines 201 or the second bus lines 202 can be disposed at positions overlapping the display electrodes 204 in a plan view, for example. In addition, this structure can prevent the bus line voltage from affecting the liquid crystal layer through parasitic capacitance, improving the display quality and the reliability. Examples of the material for the transparent conductive layer 214 include transmissive electrode materials such as ITO and IZO. The transparent conductive layer 214 is disposed at least in a region superimposed with the display electrodes 204, and may be disposed on the entire surface of the TFT substrate 210.

The conductive layer 214 may be connected to the power source to serve as a common electrode, and the display electrodes 204 may be provided with slits or openings, whereby a fringe field switching (FFS) mode can be achieved in which a transverse electric field is formed in the liquid crystal layer 220 to drive liquid crystal molecules. In the case of employing the FFS mode, the display electrodes 204, which are connected to the TFTs 203, are preferably provided with slits or openings.

The display mode of the liquid crystal display panel 200 may be a vertical electric field mode such as the twisted nematic (TN) mode or the vertical alignment (VA) mode. In the case of the vertical electric field mode, the common electrode may be disposed on the counter substrate 230. In the case of vertical electric field mode, the display electrodes 204 may each be a solid electrode without slits or openings, or may be provided with slits or openings. Furthermore, the transparent conductive layer 214 may be connected to the power source, and the voltage of the power source may be set at the same voltage as that of the common electrode.

Figure 6:
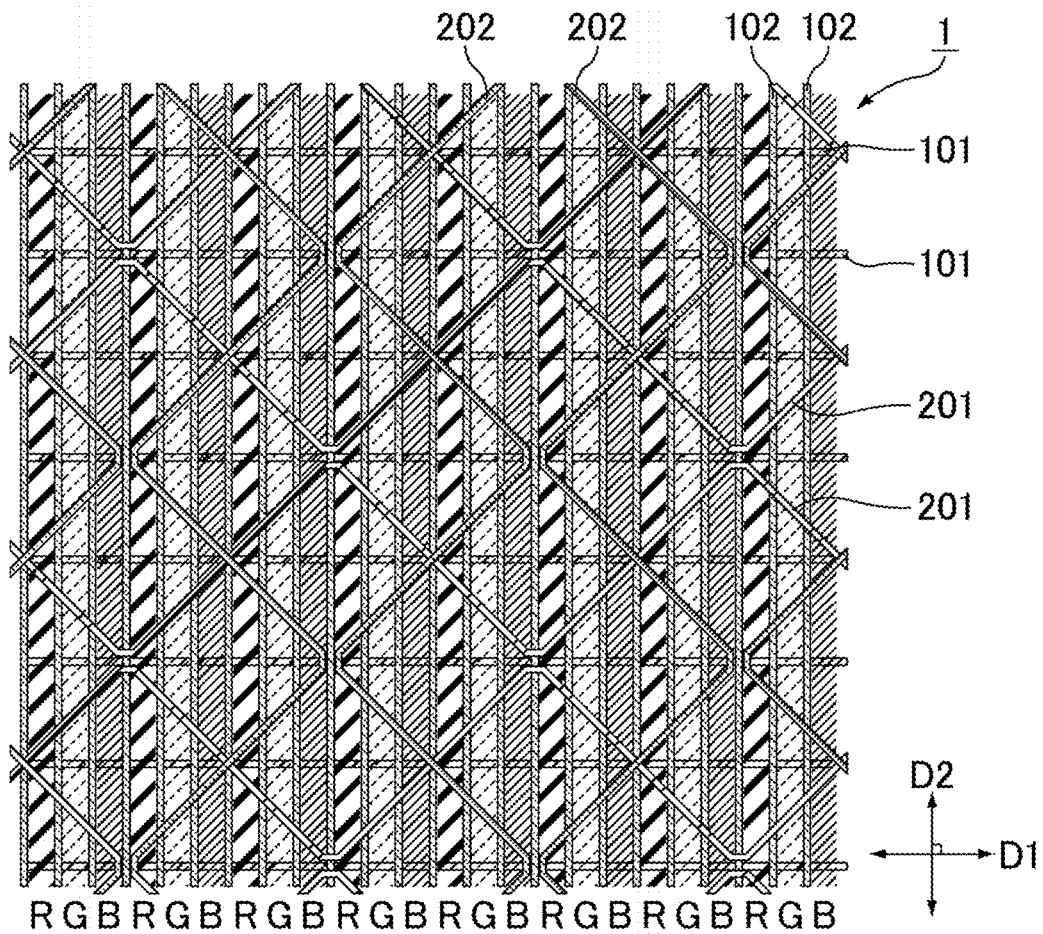
FIG. 6 is a schematic plan view obtained by superimposing the color display element shown in FIG. 2 with the first and second bus lines shown in FIG. 4.

FIG. 6 is a schematic plan view obtained by superimposing the color display element shown in FIG. 2 with the first and second bus lines shown in FIG. 4. FIG. 6 omits the TFTs 103 shown in FIG. 2 and the TFTs 203 shown in FIG. 4. At least one of the first bus lines 201 and at least one of the second bus lines 202 each overlap sub-pixels of all colors of the color display element 100 in a plan view. As shown in FIG. 6, the first bus lines 201 and the second bus lines 202 each overlap red sub-pixels R, green sub-pixels G, and blue sub-pixels B in a plan view. The structure in which at least one of the first bus lines 201 and at least one of the second bus lines 202 each overlap sub-pixels of all colors of the color display element 100 can average the influences caused by the overlapping between the first bus lines 201 and sub-pixels of the respective colors and caused by the overlapping between the second bus lines 202 and sub-pixels of the respective colors between the respective colors, leading to less occurrence of moreé.

Figure 7A:
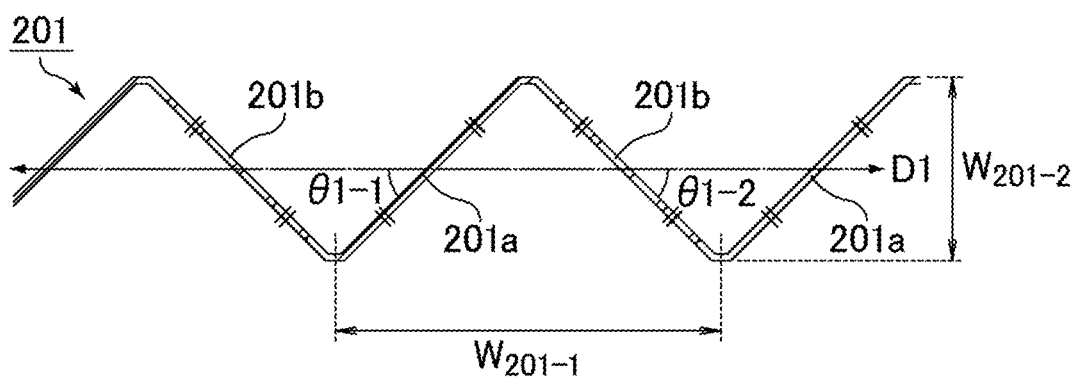
FIG. 7A is a schematic plan view of one first bus line shown in FIG. 4.

Hereinafter, arrangement of bus lines is described. FIG. 7A is a schematic plan view of one first bus line shown in FIG. 4. Preferably, the first bus lines 201 each extend in the first direction D1 while periodically bending. Herein, the term "periodically bend" means that bending portions are repeated with a certain width and a certain length. In FIG. 7A, a bending period $W_{201-1}$ indicates the length of one bending period of a first bus line 201. A bending width $W_{201-2}$ indicates the width of one bending period of a first bus line 201 in the direction perpendicular to the first direction.

As shown in FIG. 7A, at least one of the first bus lines 201 includes linear portions. Linear portions 201a and linear portions 201b having different extending directions may be combined to form one first bus line 201. The first direction D1 may correspond to a direction obtained by connecting the middle points of the linear portions 201a and 201b. Preferably, the first bus line 201 has a wave form including two or more linear portions having different extending directions.

Preferably, the first direction D1 and at least one of the linear portions form a bending angle within the range of 45°±15°. Herein, in observation of a display device from the viewer side, a counterclockwise angle is defined to be a positive angle (+), and a clockwise angle is defined to be a negative angle (−). In the case of the display device shown in FIG. 1, the viewer side corresponds to the side closer to the first polarizing plate 10. With the bending angle falling within the range of 45°±15°, the structure in which the bending width $W_{201-2}$ has a half length of the bending period $W_{201-1}$ as in the present embodiment enables the bus line to have a short length and a reduced resistance. With a bending angle of 45°, the bus line can have the shortest length and the lowest resistance. When a first bus line includes the liner portions 201a and 201b having different extending directions, at least one of the bending angle formed by the first direction D1 and the linear portion 201a or the bending angle formed by the first direction D1 and the linear portion 201b should fall within the range of 45°±15°. FIG. 7A shows the case where the length of the linear portion 201a and the length of the linear portion 201b are the same, and each of the bending angle θ1-1 formed by the first direction D1 and the linear portion 201a and the bending angle θ1-2 formed by the first direction D1 and the linear portion 201b is 45°.

Preferably, the sum of the bending widths $W_{201-2}$ of the first bus lines 201 in the direction perpendicular to the first direction D1 is 0.75 or more and 1.25 or less times the length of the display region of the liquid crystal display panel 200 in the direction perpendicular to the first direction D1. With the structure in which the sum of the bending widths $W_{201-2}$ of the first bus lines 201 is 0.75 or more and 1.25 or less times the length of the display region of the liquid crystal display panel 200 in the direction perpendicular to the first direction D1, areas where the first bus lines 201 overlap sub-pixels are uniformed in the sub-pixels in the display region, whereby the variability of the same-color effective transmissive area can be reduced. The display region of the liquid crystal display panel 200 indicates a region transmitting light from the back surface and capable of displaying an image, and does not include the frame region.

In the direction perpendicular to the first direction D1, the sum of the bending widths $W_{201-2}$ is more preferably 0.9 or more and 1.1 or less times, still more preferably substantially equal to, the length of the display region of the liquid crystal display panel 200. With the structure in which the sum of the bending widths $W_{201-2}$ of the first bus lines 201 is substantially equal to the length of the display region of the liquid crystal display panel 200 in the direction perpendicular to the first direction D1, areas where the first bus lines 201 overlap sub-pixels are substantially the same as each other in the sub-pixels in the display region, whereby the variability of the same-color effective transmissive area can be the smallest.

One bending width $W_{201-2}$ may be 0.4 or more and 1.2 or less times the maximum length of one display unit 205 in the direction perpendicular to the first direction D1.

FIG. 7B is a schematic plan view of one second bus line shown in FIG. 4. Preferably, the second bus lines 202 each extend in the second direction D2 while periodically bending. In FIG. 7B, a bending period $W_{202-1}$ indicates the length of one bending period of a second bus line 202. A bending width $W_{202-2}$ indicates the width of one bending period of a second bus line 202 in the direction perpendicular to the second direction.

As shown in FIG. 7B, at least one of the second bus lines 202 includes linear portions. Linear portions 202a and linear portions 202b having different extending directions may be combined to form one second bus line 202. The second direction D2 may correspond to a direction obtained by connecting the middle points of the linear portions 202a and 202b. Preferably, the second bus line 202 has a wave form including two or more linear portions having different extending directions.

Preferably, the second direction D2 and at least one of the linear portions form a bending angle within the range of 45°±15°. With the bending angle falling within the range of 45°±15°, the structure in which the bending width $W_{202-2}$ has a half length of the bending period $W_{202-1}$ as in the present embodiment enables the bus line to have a short length and a reduced resistance. With a bending angle of 45°, the bus line can have the shortest length and the lowest resistance. When the second bus line includes the liner portions 202a and 202b having different extending directions, at least one of the bending angle formed by the second direction D2 and the linear portion 202a or the bending angle formed by the second direction D2 and the linear portion 202b should fall within the range of 45°±15°. FIG. 7B shows the case where the length of the linear portion 202a and the length of the linear portion 202b are the same, and each of the bending angle θ2-1 formed by the second direction D2 and the linear portion 202a and the bending angle θ2-2 formed by the second direction D2 and the linear portion 202b is 45°.

Preferably, the sum of the bending widths $W_{202-2}$ of the second bus lines 202 in the direction perpendicular to the second direction D2 is 0.75 or more and 1.25 or less times the length of the display region of the liquid crystal display panel 200 in the direction perpendicular to the second direction D2. With the structure in which the sum of the bending widths $W_{202-2}$ of the second bus lines 202 is 0.75 or more and 1.25 or less times the length of the display region of the liquid crystal display panel 200 in the direction perpendicular to the second direction D2, areas where the second bus lines 202 overlap sub-pixels are uniformed in the sub-pixels in the display region, whereby the variability of the same-color effective transmissive area can be reduced. In the direction perpendicular to the second direction D2, the sum of the bending widths $W_{202-2}$ is more preferably 0.9 or more and 1.1 or less times, still more preferably substantially equal to, the length of the display region of the liquid crystal display panel 200.

One bending width $W_{202-2}$ may be 0.4 or more and 1.2 or less times the maximum length of one display unit 205 in the direction perpendicular to the second direction D2.

FIG. 8 is a schematic plan view of the first and second bus lines shown in FIG. 4. More preferably, at least one of the first bus lines 201 extends in the first direction D1 with bending, and at least one of the second bus lines 202 extends in the second direction D2 with bending. Also more preferably, the bending angle formed by the first direction D1 and each of the linear portions 201a and 201b of the first bus line 201 is within the range of 45°±15°, and the bending angle formed by the second direction D2 and each of the linear portions 202a and 202b of the second bus line 202 is within the range of 45°±15°.

In order to reduce or prevent moreé, preferably, at least one of the first bus lines 201 includes linear portions 201a and 201b each forming an angle with the first direction D1, and at least one of the second bus lines 202 includes linear portions 202a and 202b each forming an angle with the second direction D2. Here, when the extending direction of a bus line is different from the row direction and the column direction, the compatibility with video signals assuming matrix driving is deteriorated. Accordingly, a bus line structure is preferably employed in which bus lines are each folded at regular intervals to form a rhombic grid pattern such that the average extending direction (first direction D1) of the first bus lines 201 and the average extending direction (second direction D2) of the second bus line 202 correspond to the row direction or the column direction. As shown in FIG. 4, with the structure in which the TFTs 203 and the display electrodes 204 are arranged in a matrix pattern, the compatibility with video signals of a typical liquid crystal panel can be increased, whereby the cost for the signal processing system can be reduced.

More preferably, the sum of the bending widths $W_{201-2}$ of the first bus lines 201 in the direction perpendicular to the first direction D1 is 0.75 or more and 1.25 or less times the length of the display region of the liquid crystal display panel 200 in the direction perpendicular to the first direction D1, and the sum of the bending widths $W_{202-2}$ of the second bus lines 202 in the direction perpendicular to the second direction D2 is 0.75 or more and 1.25 or less times the length of the display region of the liquid crystal display panel 200 in the direction perpendicular to the second direction D2. The sum of the bending widths $W_{201-2}$ is still more preferably 0.9 or more and 1.1 or less, particularly preferably substantially equal to, the length of the display region of the liquid crystal display panel 200 in the direction perpendicular to the first direction D1. Similarly, the sum of the bending widths $W_{202-2}$ is still more preferably 0.9 or more and 1.1 or less, particularly preferably substantially equal to, the length of the display region of the liquid crystal display panel 200 in the direction perpendicular to the second direction D2.

Hereinafter, arrangement of the sub-pixels of the color display element and the display electrodes of the liquid crystal display panel is described with reference to FIG. 9 to FIG. 11. Each display electrode 204 may have a tetragonal shape. Examples of the tetragonal shape include squares, rectangles, rhomboids, parallelograms, and trapezoids. The display electrodes 204 may be formed from a transmissive electrode material such as ITO or IZO.

Figure 9:
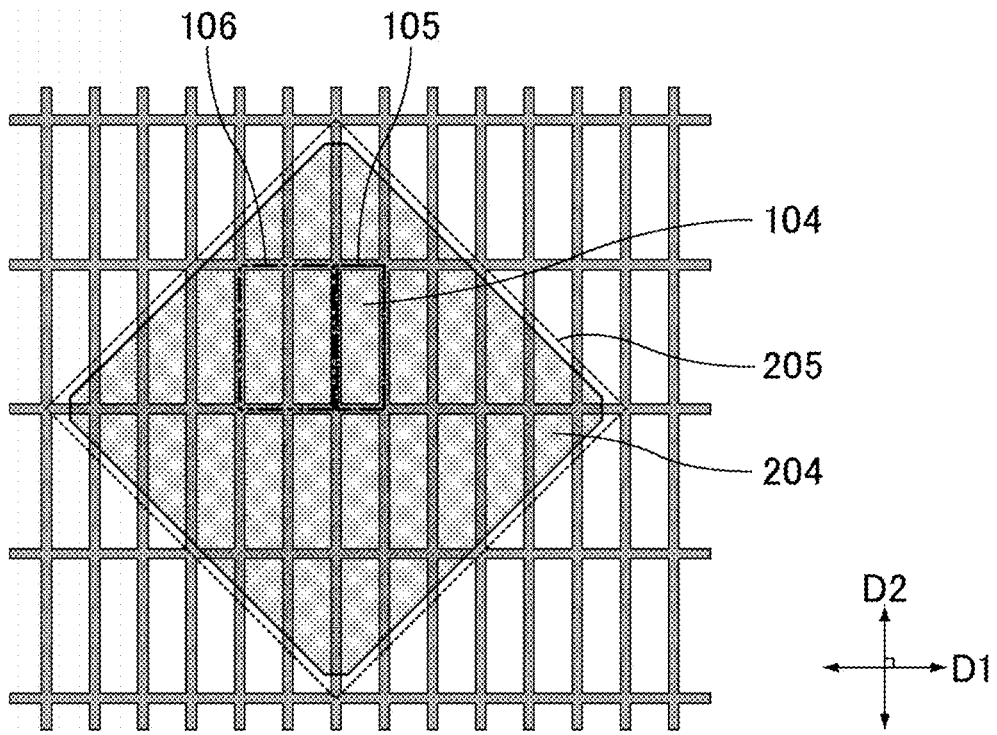
FIG. 9 is a schematic plan view obtained by superimposing a rhombic display electrode shown in FIG. 4 with a color display element.

FIG. 9 is a schematic plan view obtained by superimposing a rhombic display electrode shown in FIG. 4 with a color display element. In FIG. 9, the display electrode 204 has a rhombic shape and the two diagonal lines thereof have the same length. FIG. 9 shows the case where one of the two diagonal lines is parallel to the first direction D1 and the other is parallel to the second direction D2. FIG. 9 shows the case where the outline of the pixel electrode 104 of the color display element and the outline of the display electrode 204 form an angle of 45°. In FIG. 9, the display unit 205 also has a rhombic shape, and the two diagonal lines thereof have the same length. One of the two diagonal lines of the display unit 205 is parallel to the first direction D1, and the other is parallel to the second direction D2. Preferably, the display unit 205 has a width and a height corresponding to an integer multiple of those of the pixel 106 of the color display element. The shown case is a specific example in which the display unit 205 has a width and a height respectively being four times the width and the height of the pixel 106. Also, in the shown case, the area of the display unit 205 is eight times the area of the pixel 106.

Figure 10:
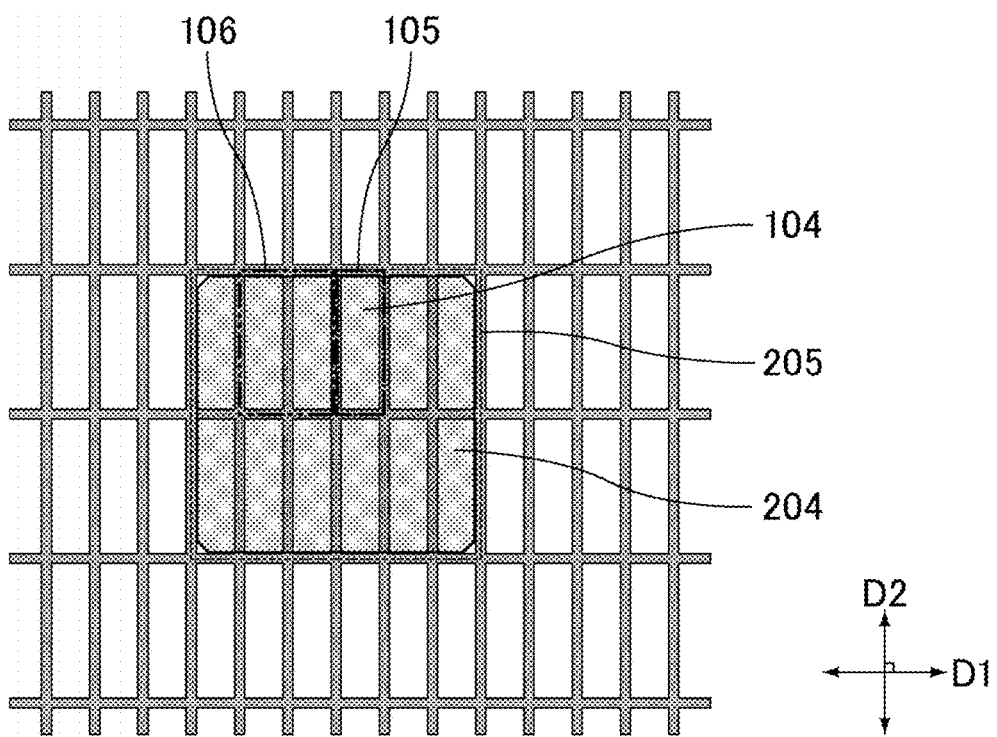
FIG. 10 is a schematic plan view obtained by superimposing a square display electrode of Modified Example 1 with a color display element.

FIG. 10 is a schematic plan view obtained by superimposing a square display electrode of Modified Example 1 with a color display element. FIG. 10 shows the case where the display electrode 204 has a square shape in which a first side and a second side perpendicular to the first side are parallel to the first direction D1 and the second direction D2, respectively. FIG. 10 shows the case where the outline of the pixel electrode 104 of the color display element is parallel to the outline of the display electrode 204. In FIG. 10, the display unit 205 also has a square shape, and the lateral and vertical sides thereof are parallel to the first direction D1 and the second direction D2, respectively. Preferably, the display unit 205 has a width and a height corresponding to an integer multiple of those of the pixel 106 of the color display element. The shown case is a specific example in which the display unit 205 has a width and a height respectively being two times the width and the height of the pixel 106. Also, in the shown case, the area of the display unit 205 is four times the area of the pixel 106. In FIG. 10, the outline of the pixel electrode 104 of the color display element is parallel to the outline of the display electrode 204. Fortunately, the area of the display unit 205 is ½ of that of FIG. 9 and the number of the display units is two times that of FIG. 9, whereby the resolution can be increased.

Figure 11:
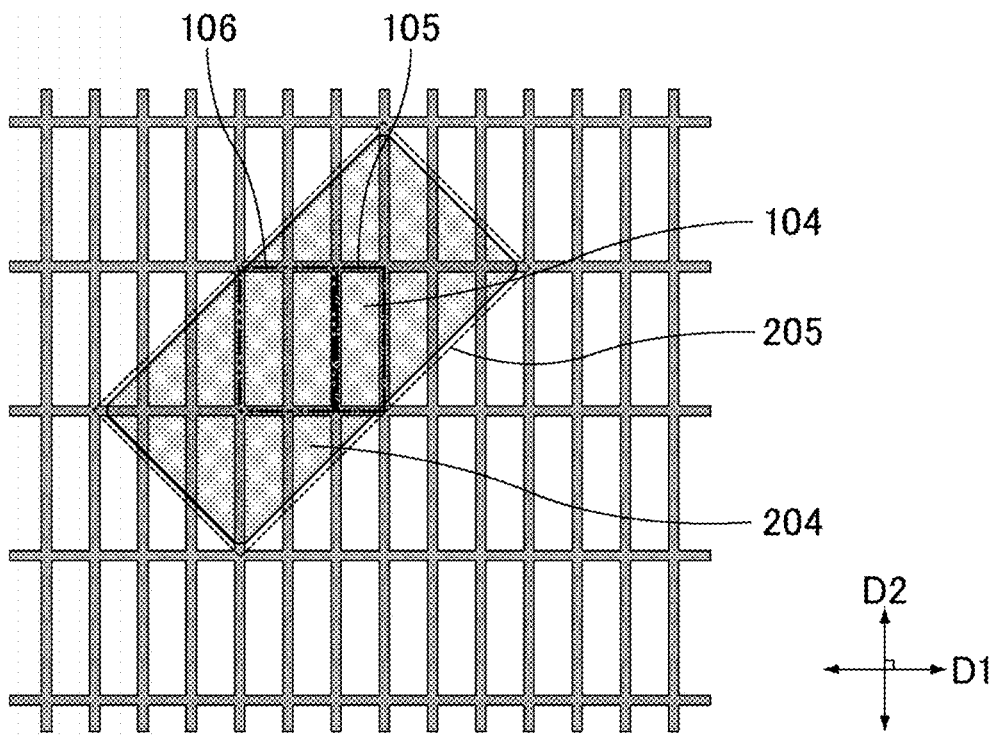
FIG. 11 is a schematic plan view obtained by superimposing a rectangular display electrode of Modified Example 2 with a color display element.

FIG. 11 is a schematic plan view obtained by superimposing a rectangular display electrode of Modified Example 2 with a color display element. FIG. 11 shows the case where the display electrode 204 is a rectangle whose longer side and shorter side each extend in a direction forming an angle of 45° with the first direction D1 and the second direction D2, respectively. In FIG. 11, the display unit 205 also has a rectangular shape. In FIG. 11, preferably, the display unit 205 has a maximum width parallel to the first direction D1 and a maximum height parallel to the second direction D2 respectively corresponding to an integer multiple of the width and height of the pixel 106 of the color display element. The shown case is a specific example in which the display unit 205 has a maximum width and a maximum height respectively being three times the width and the height of the pixel 106. Also, in the shown case, the area of the display unit 205 is four times the area of the pixel 106. In FIG. 11, similarly to FIG. 10, the area of the display unit 205 is ½ of that of FIG. 9 and the number of the display units is two times that of FIG. 9 while the outline of the pixel electrode 104 of the color display element forms an angle of 45° with the outline of the display electrode 204. Thereby, the resolution can be increased. Furthermore, the total numbers of the first and second bus lines in FIG. 11 are the same as those in FIG. 9 and FIG. 10, and thus the aperture in FIG. 11 is also substantially the same as those in FIG. 9 and FIG. 10. The merit of the structure in which the outline of the pixel electrode 104 of the color display element forms an angle of 45° with the outline of the display electrode 204 is described later.

As shown in FIG. 9 to FIG. 11, preferably, the liquid crystal display panel 200 includes display units 205 each including a display electrode 204, and the area of one display unit 205 is greater than the area of one pixel 106 of the color display element 100. Thereby, the aperture of the display units 205 can be increased and the transmittance of the display device 1 can be improved.

As shown in FIG. 9 and FIG. 11, in a plan view, the extending direction of at least one linear portion of the pixel electrode 104 preferably intersects the extending direction of at least one side forming the outline of the display electrode 204 of the liquid crystal display panel 200. More preferably, the linear portion intersects the extending direction of each side forming the outline of the display electrode 204 of the liquid crystal display panel 200. As shown in FIG. 9 to FIG. 11, the pixel electrode 104 disposed for each sub-pixel 105 has a rectangular outline whose short side extends in a direction parallel to the first direction D1 and whose long side extends in a direction parallel to the second direction D2.

With the sub-pixels 105 of the color display element 100 being arranged in a same-color striped arrangement, the case where the liquid crystal display panel 200 displays a tetragonal window pattern, for example, is considered. In the case where the window pattern displayed on the liquid crystal display panel 200 has an outline parallel to the outlines of the pixel electrodes 104 of the color display element 100, sub-pixels 105 of one color may be arranged along the outline of the window pattern depending on the viewing angle, possibly causing the color to be visually perceived. With the outline of the window pattern appearing to be colored by one color, when visual targets are changed or when the window pattern is moved, a trouble is caused in which the color of the outline of the window pattern periodically changes or the like, resulting in perception of linear color blur. In a conventional dual-cell display that includes a diffusing layer such as a diffusing OCA, the outline of the window pattern appears blurring and thus the color blur is not perceived and does not cause a serious trouble. In contrast, the present embodiment is preferred not to include a diffusing layer such as a diffusing OCA in order to improve the transmittance, and thus this structure causes a trouble of the color blur.

Here, in a plan view, the structure in which the extending direction of a linear portion of the pixel electrode 104 intersects the extending direction of at least one side forming the outline of the display electrode 204 of the liquid crystal display panel 200 can reduce the linear color blur, and the structure in which the extending direction of a linear portion of the pixel electrode 104 intersects the extending direction of each side forming the outline of the display electrode 204 of the liquid crystal display panel 200 can more effectively reduce the linear color blur.

Preferably, the extending direction of a linear portion of the pixel electrode 104 and the extending direction of at least one side forming the outline of the display electrode 204 form an angle of 30° or greater and 60° or smaller. More preferably, the extending direction of a linear portion of the pixel electrode 104 and the extending direction of each side forming the outline of the display electrode 204 form an angle of 30° or greater and 60° or smaller.

In each of the rhombic display electrode shown in FIG. 9 and the diagonally arranged rectangular display electrode shown in FIG. 11, the extending direction of each linear portion of the pixel electrode 104 intersects the extending direction of each side forming the outline of the display electrode. Such a structure can reduce or prevent the linear color blur. The extending direction of each linear portion of the pixel electrode 104 and the extending direction of each side forming the outline of the rhombic display electrode 204 shown in FIG. 9 form an angle of 45°. Also, the extending direction of each linear portion of the pixel electrode 104 and the extending direction of each side forming the outline of the diagonally arranged rectangular display electrode 204 shown in FIG. 11 form an angle of 45°. Still more preferably, the extending direction of each linear portion of the pixel electrode 104 and the extending direction of each side forming the outline of the display electrode 204 form an angle of 45°. Such a structure can effectively reduce or prevent the linear color blur.

Figure 12A:
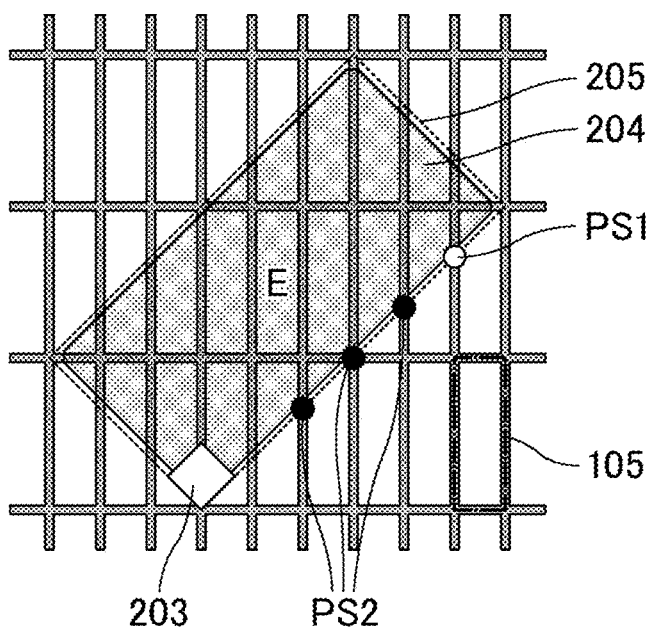
FIG. 12A is a schematic plan view showing positions of spacers disposed in one display unit.
Figure 12B:
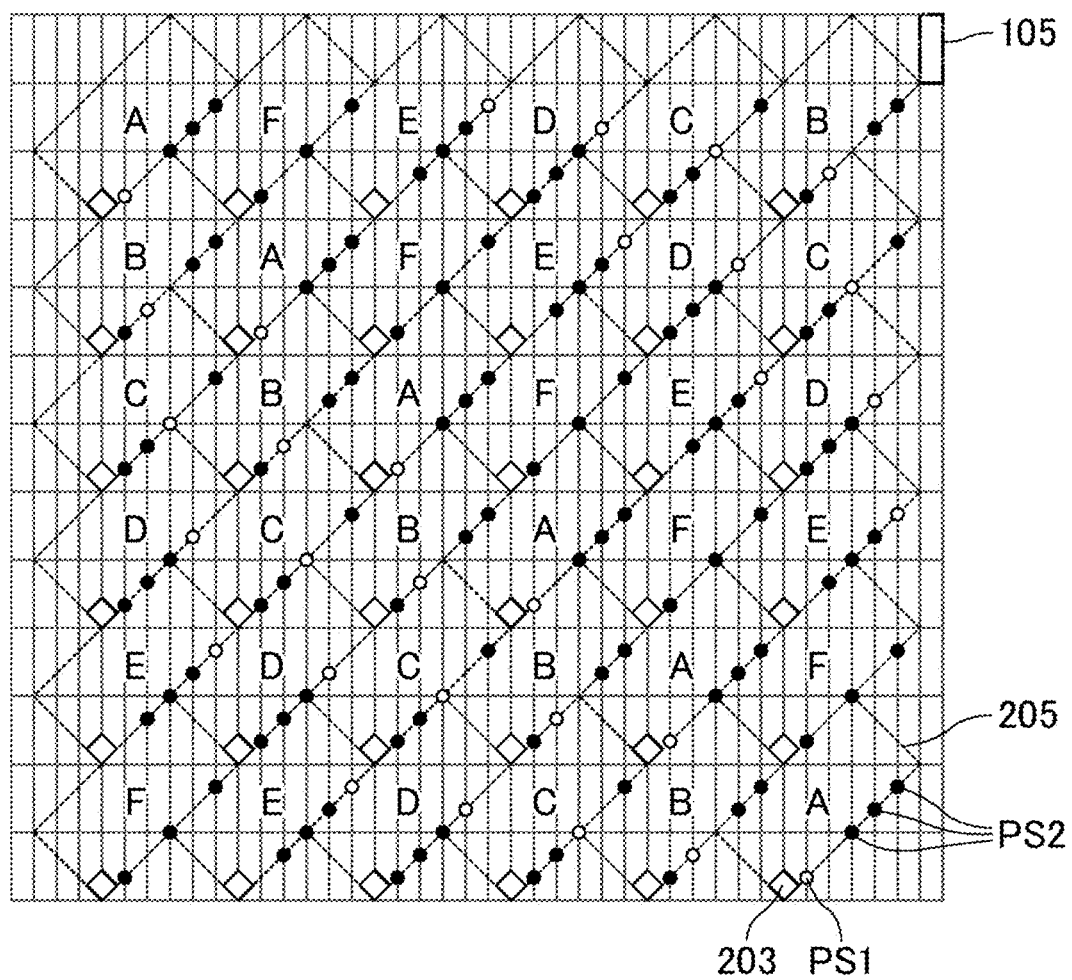
FIG. 12B is a schematic plan view showing arrangement of spacers disposed in a liquid crystal display panel.

Hereinafter, arrangement of spacers in the liquid crystal display panel 200 is described with reference to FIG. 12A and FIG. 12B. The liquid crystal display panel 200 may include spacers formed from a material such as resin in order to maintain the thickness of the liquid crystal layer 220. FIG. 12A is a schematic plan view showing positions of spacers disposed in one display unit. FIG. 12B is a schematic plan view showing arrangement of spacers disposed in a liquid crystal display panel. FIG. 12A is an enlarged schematic plan view of a part of FIG. 12B. In FIG. 12A and FIG. 12B, PS1 indicates main pillars, and PS2 indicates sub-pillars.

As shown in FIG. 12A, preferably, each of the main pillar(s) PS1 and the sub-pillars PS2 is disposed at a boundary between adjacent display units 205 (periphery of a display electrode 204). The structure in which the main pillar(s) PS1 and the sub-pillars PS2 are disposed on the periphery of a display electrode 204 allows disposition of pillars not in a central portion of the display electrode 204, where the alignment of liquid crystal molecules is uniformed, but on the periphery of the display electrode 204 (a boundary between the display units 205), where the possibility of alignment disorder of liquid crystal molecules is originally present. This structure thereby can intend the maximum transmittance. Preferably, each of the main pillar(s) PS1 and the sub-pillars PS2 is disposed at the boundary between sub-pixels 105 of the color display element 100.

In FIG. 12A and FIG. 12B, the alphabet letters A to F shown in a central part of each display unit 205 mean arrangement patterns of the main pillars PS1 and the sub-pillars PS2. Combination of multiple arrangement patterns can control the density of the main pillars PS1 and the density of the sub-pillars PS2 to provide desired densities of those in the entire liquid crystal display panel 200.

Hereinafter, arrangement of the first and second bus lines and the display electrodes is described with reference to FIG. 13A to FIG. 15B.

Figure 13A:
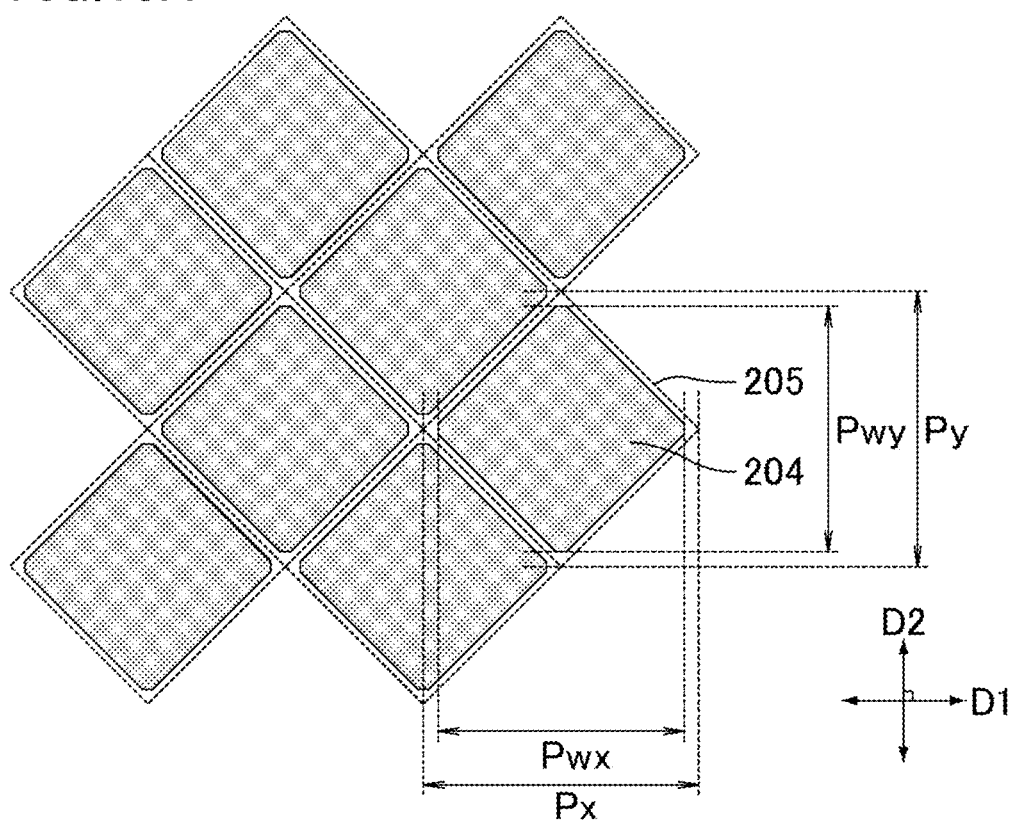
FIG. 13A is a schematic plan view showing the rhombic display electrodes and display units shown in FIG. 4.
Figure 13B:
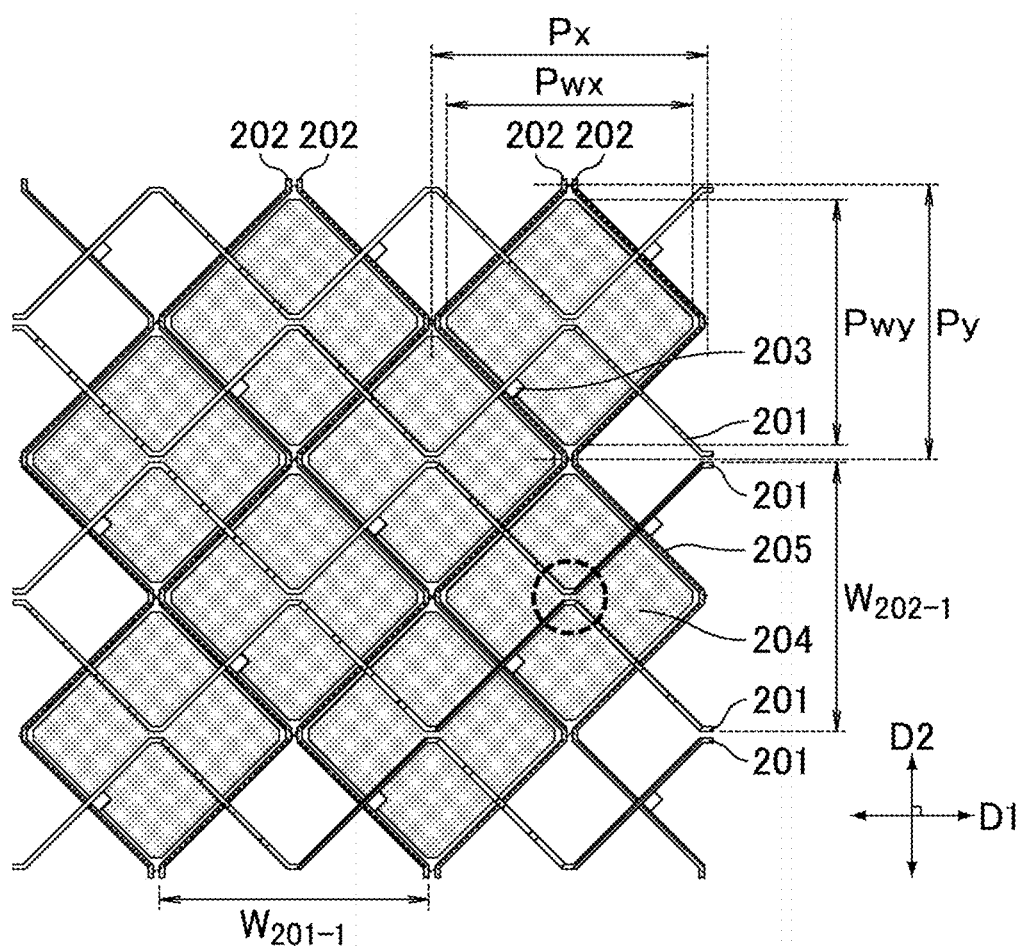
FIG. 13B is a schematic plan view obtained by superimposing FIG. 13A with the first and second bus lines.
Figure 13C:
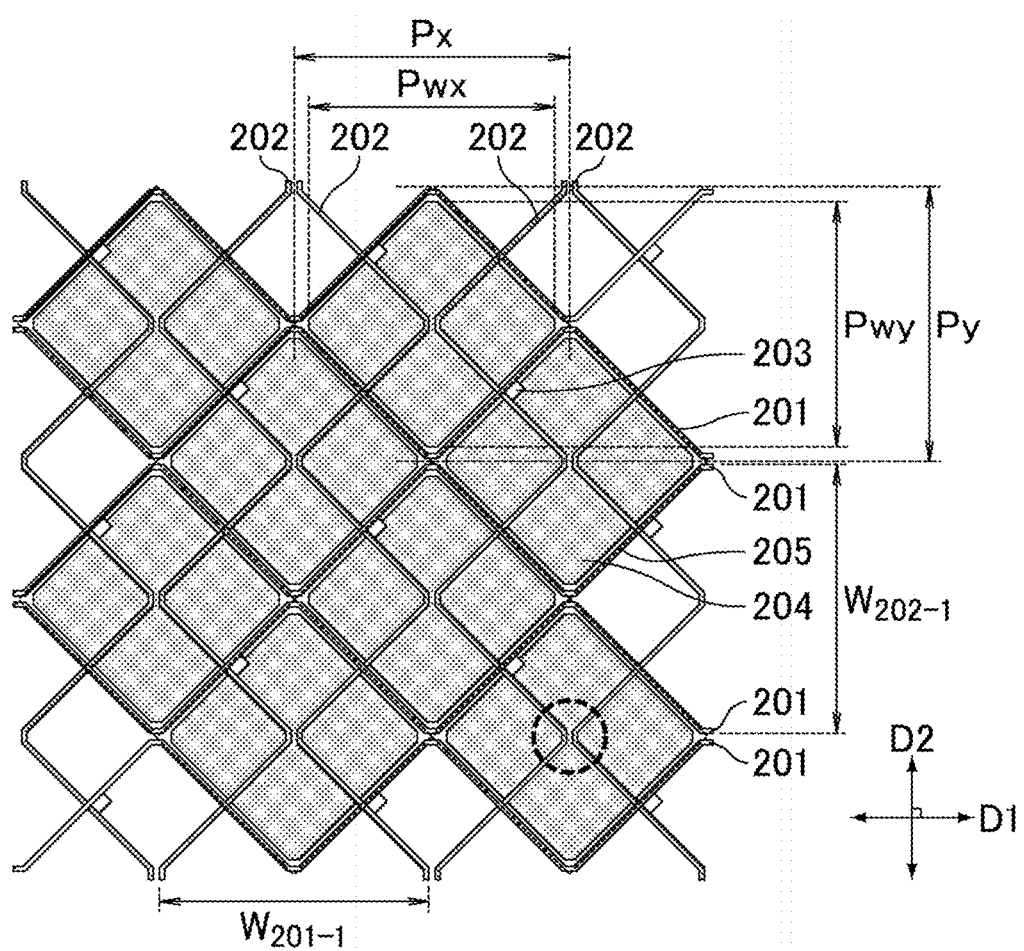
FIG. 13C shows a different example with different arrangement of the display electrodes shown in FIG. 13B.

FIG. 13A is a schematic plan view showing the rhombic display electrodes and display units shown in FIG. 4. FIG. 13B is a schematic plan view obtained by superimposing FIG. 13A with the first and second bus lines. FIG. 13C shows a different example with different arrangement of the display electrodes shown in FIG. 13B.

Figure 14A:
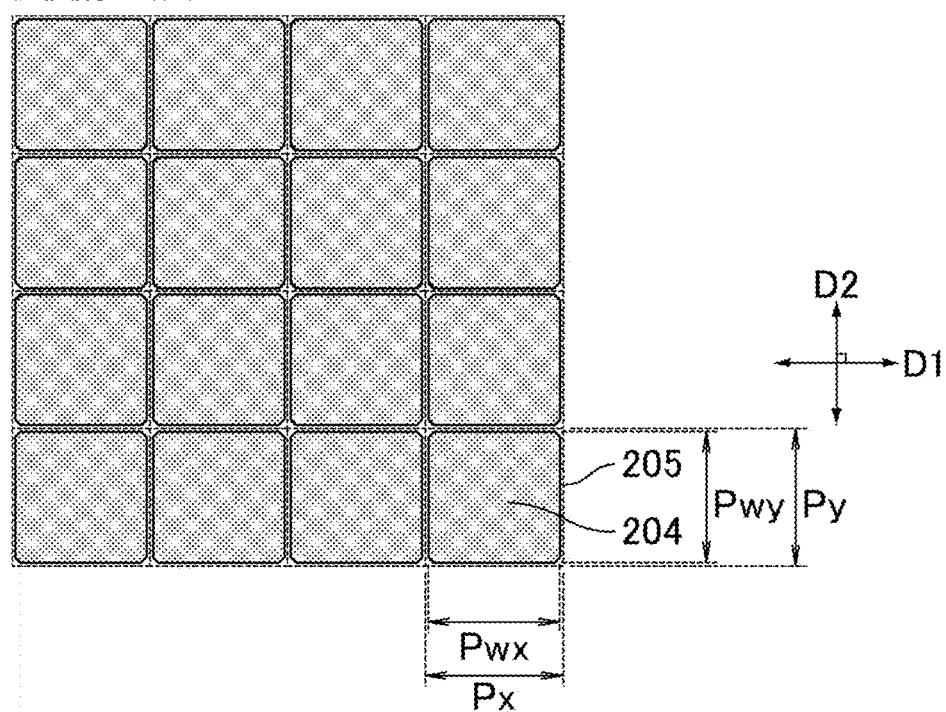
FIG. 14A is a schematic plan view showing the square display electrode and display unit shown in FIG. 10.
Figure 14B:
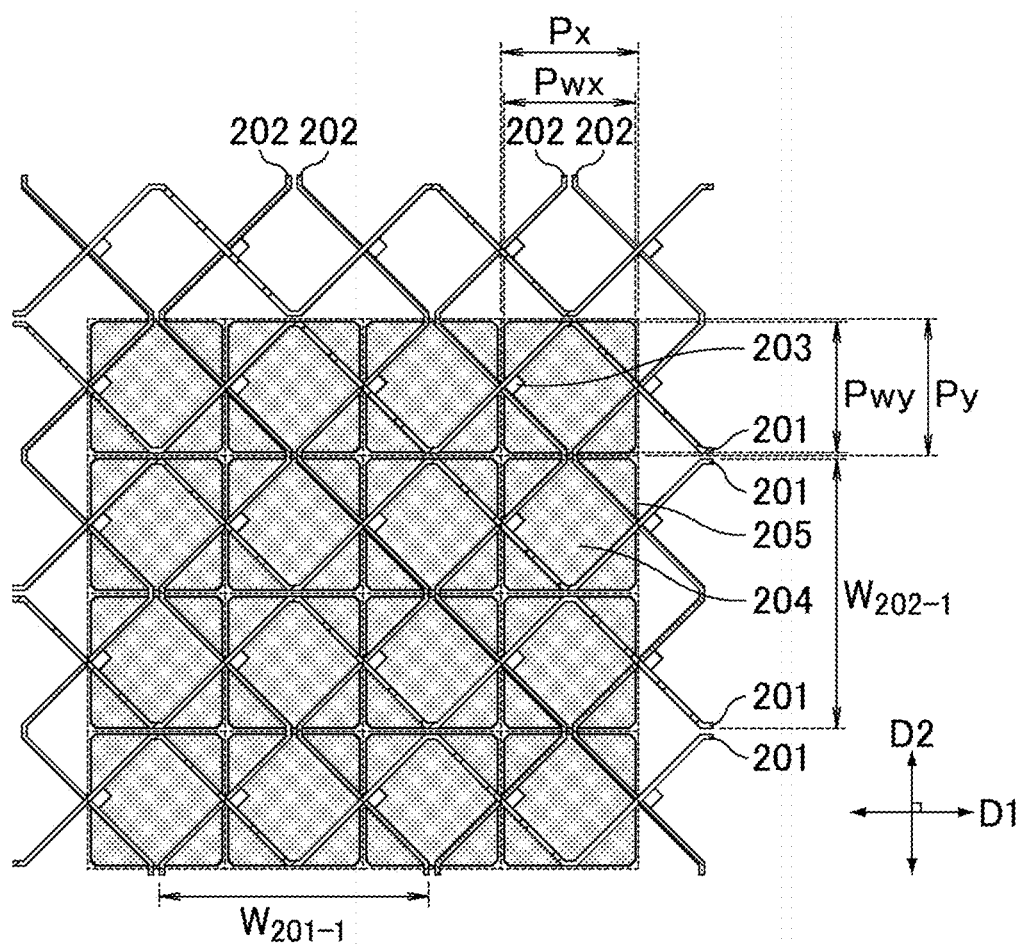
FIG. 14B is a schematic plan view obtained by superimposing FIG. 14A with the first and second bus lines.

FIG. 14A is a schematic plan view showing the square display electrode and display unit shown in FIG. 10. FIG. 14B is a schematic plan view obtained by superimposing FIG. 14A with the first and second bus lines. As compared to the rhombic display electrodes shown in FIG. 13A, the number of display units can be doubled.

Figure 15A:
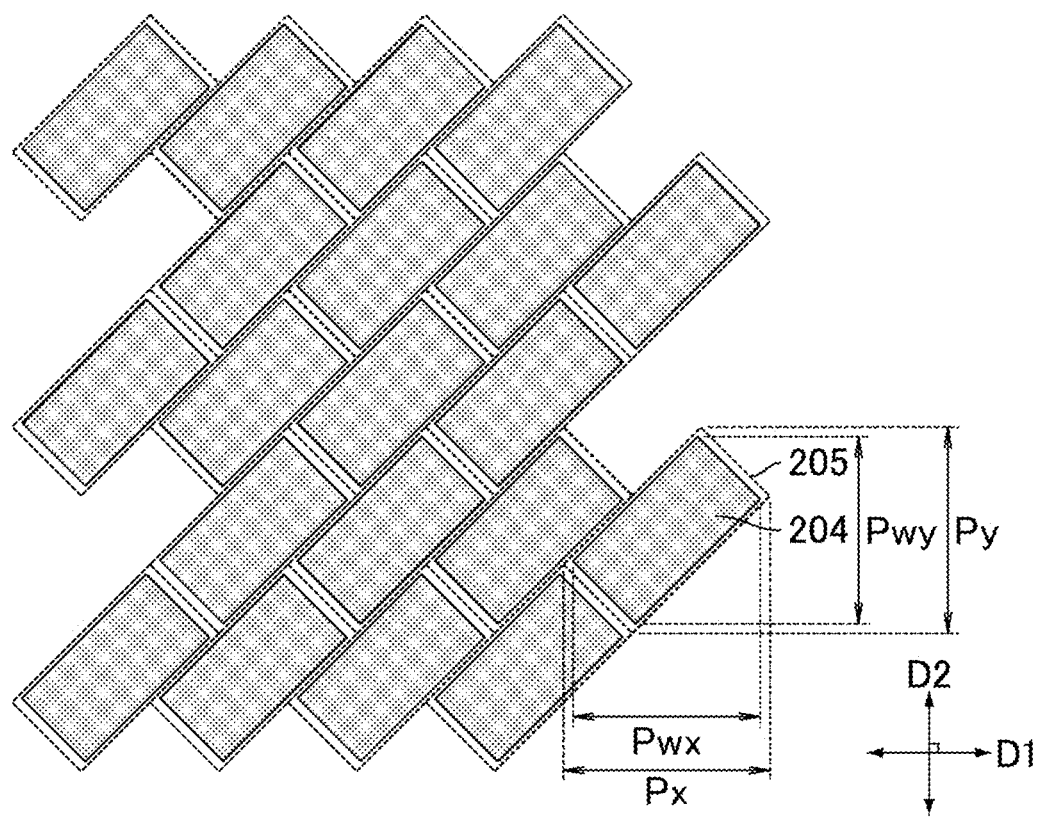
FIG. 15A is a schematic plan view showing the rectangular display electrode and display unit shown in FIG. 11.
Figure 15B:
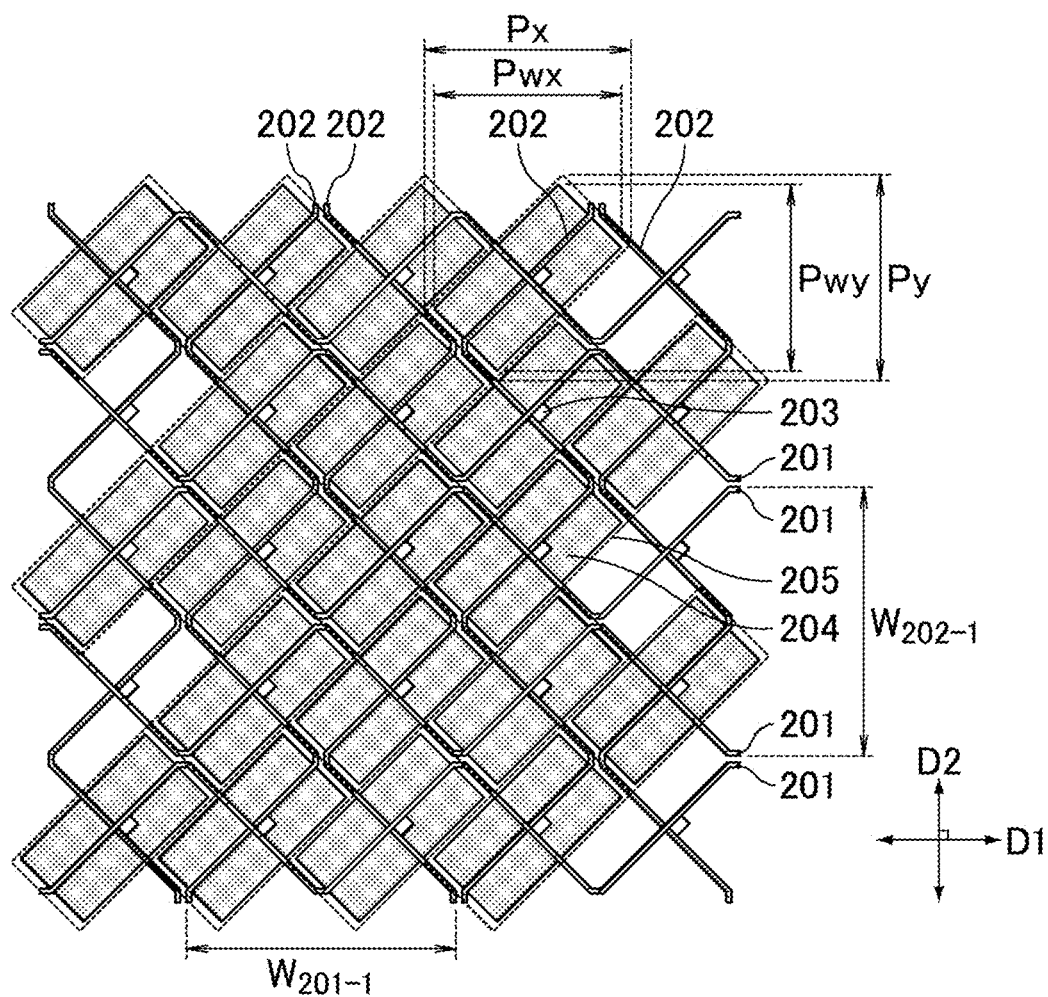
FIG. 15B is a schematic plan view obtained by superimposing FIG. 15A with the first and second bus lines.
Figure 15C:
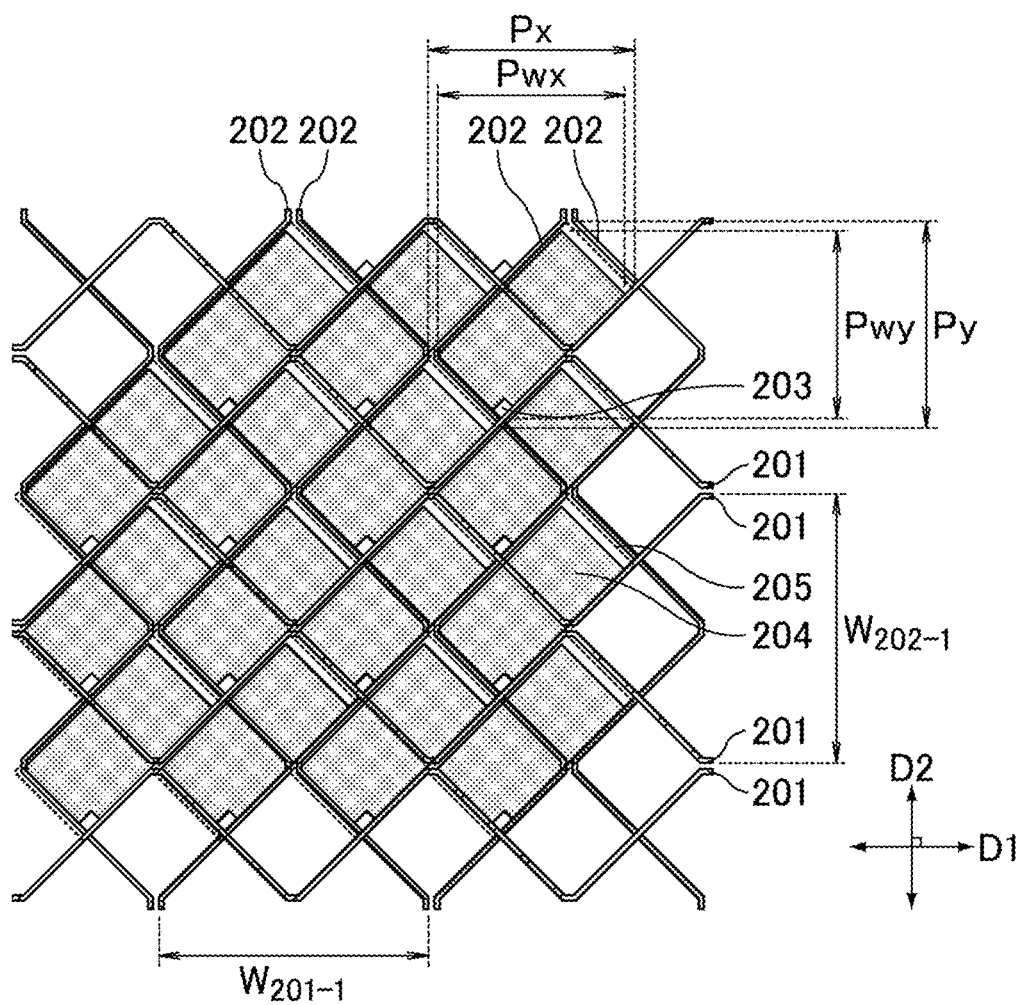
FIG. 15C shows a different example with different arrangement of the display electrodes shown in FIG. 15B.

FIG. 15A is a schematic plan view showing the rectangular display electrode and display unit shown in FIG. 11. FIG. 15B is a schematic plan view obtained by superimposing FIG. 15A with the first and second bus lines. FIG. 15C shows a different example with different arrangement of the display electrodes shown in FIG. 15B. As compared to the rhombic display electrodes shown in FIG. 13A, the number of display units can be doubled. Preferably, the display electrode 204 has a rectangular shape whose long side has a length 1.5 or more and 2.5 or less times the length of the short side. More preferably, the long side has a length two times the length of the short side. The structure in which the long side has a length two times the length of the short side allows that identical rectangles with a diagonal rotation of 45° to fill the entire plan surface of the liquid crystal display panel 200.

Preferably, two adjacent first bus lines 201 have a varying distance therebetween, and a portion with the shortest distance between the two adjacent first bus lines 201 is superimposed with one of the display electrodes 204 in a plan view. The portion surrounded by the dotted line in FIG. 13B indicates the portion with a shortest distance between two adjacent first bus lines 201. The distance between two adjacent first bus lines 201 may periodically change. Two adjacent first bus lines 201 have the same bending width, bending period, and bending angle and are parallel to each other with their bending periods misaligned by a half period in the first direction D1.

Preferably, two adjacent second bus lines 202 have a varying distance therebetween, and a portion with the shortest distance between the two adjacent second bus lines 202 is superimposed with one of the display electrodes 204 in a plan view. The portion surrounded by the dotted line in FIG. 13C indicates the portion with the shortest distance between two adjacent second bus lines 202. The distance between two adjacent second bus lines 202 may periodically change. Two adjacent second bus lines 202 have the same bending width, bending period, and bending angle and are parallel to each other with their bending periods misaligned by a half period in the second direction D2.

As shown in FIG. 13B, FIG. 14B, and FIG. 15B, in a plan view, at least one of the first bus lines 201 preferably includes at least one first electrode-overlapping portion in which the bus line(s) overlap(s) one of the display electrodes 204. More preferably, in one first bus line 201, the sum of the first electrode-overlapping portions is 75% or more of the total length of the first bus line 201. One first bus line 201 which is related to one display electrode 204 via a TFT 203 preferably overlaps the display electrode 204. With the structure in which display electrodes 204 arranged in the same row in the first direction D1 overlap the same first bus line 201, when the voltage of the first bus line 201 is changed, the influence on the display electrodes 204 through parasitic capacitance can be uniformed, whereby the deterioration of the display quality can be reduced or prevented.

As shown in FIG. 13C, FIG. 14B, and FIG. 15B, in a plan view, at least one of the second bus lines 202 preferably includes at least one second electrode-overlapping portion in which the bus line(s) overlap(s) one of the display electrodes 204. More preferably, in one second bus line 202, the sum of the second electrode-overlapping portions is 75% or more of the total length of the second bus line 201. Preferably, one display electrode 204 overlaps two adjacent second bus lines 202. Still more preferably, the overlapping areas between the display electrode 204 and the two respective adjacent second bus lines are substantially the same. With the structure in which one display electrode 204 overlaps two adjacent second bus lines 202 and the overlapping areas between the display electrode 204 and the two respective adjacent bus lines are substantially the same, when the voltages of the second bus lines 201 are changed, the influence on the display electrode 204 through parasitic capacitance can be reduced, more preferably can be eliminated, whereby the deterioration of the display quality can be reduced or prevented.

As shown in FIG. 14B and FIG. 15B, in a plan view, at least one of the first bus lines 201 preferably includes at least one first electrode-overlapping portion in which the bus line(s) overlap(s) one of the display electrodes 204, and in a plan view, at least one of the second bus lines 202 preferably includes at least one second electrode-overlapping portion in which the bus line(s) overlap(s) one of the display electrodes 204. More preferably, in one first bus line 201, the sum of the first electrode-overlapping portions is 75% or more of the total length of the first bus line 201, and in one second bus line 202, the sum of the first electrode-overlapping portions is 75% or more of the total length of the second bus line 202.

In FIG. 14B, each display electrode 204 overlaps first bus line(s) 201 and second bus line(s) 202. Display electrodes 204 arranged in the same row in the first direction D1 overlap the same first bus line 201, and the display electrodes 204 each overlap two adjacent second bus lines 202. The two adjacent second bus lines 202 have the same overlapping amount in one display electrode 204.

Accordingly, the influence on display by the bus lines through parasitic capacitance can be minimized.

In FIG. 15B, in all the display electrodes 204, display electrodes 204 arranged in the same row in the first direction D1 overlap the same first bus line 201. Accordingly, the influence on display by signal lines (first bus lines) through parasitic capacitance can be reduced. However, the effect of reducing the influence on display by signal lines through parasitic capacitance is weaker than in FIG. 14B. Therefore, still more preferably, the influence on display by signal lines through parasitic capacitance is eliminated by the structure in which the transparent conductive layer 214 shown in FIG. 5 is disposed to shield between the first bus lines 201 and the display electrodes 204 and between the second bus lines 202 and the display electrodes 204.

The first bus lines 201 shown in FIG. 5 correspond to the first electrode-overlapping portion in which the first bus lines 201 are superimposed with the display electrode 204, and the transparent conductive layer 214 is superimposed with the first electrode-overlapping portion. In an example in which the transparent conductive layer 214 is disposed in a region superimposed with at least the display electrodes 204, when the display electrodes 204 are arranged as shown in FIG. 13C, the transparent conductive layer 214 is superimposed with the second electrode-overlapping portions.

In a plan view, preferably, at least one of the first bus lines 201 includes at least one first electrode-overlapping portion overlapping one of the display electrodes 204, at least one of the second bus lines 202 includes at least one second electrode-overlapping portion overlapping one of the display electrodes 204, and the transparent conductive layer 214 is superimposed with the first and second electrode-overlapping portions. In the case where the transparent conductive layer 214 is disposed in a region superimposed with at least the display electrodes 204, when the display electrodes 204 are arranged as shown in FIG. 14B, FIG. 15B, or FIG. 15C, the transparent conductive layer 214 is superimposed with the first and second electrode-overlapping portions.

The liquid crystal display panel 200 includes display units 205 each provided with a display electrode 204. Each display unit 205 is a unit in which one display electrode 204 controls the amount of light transmitted, and corresponds to a "sub-pixel" of the color display element 100. Typically, one display unit 205 is provided with one display electrode 204. As shown in FIG. 13A, FIG. 14A, and FIG. 15A, with one display electrode 204 being focused, one display unit 205 has boundary lines each being a line connecting points each of which halves the distance between the focused display electrode 204 and a display electrode 204 adjacent to the focused display electrode 204. The region inside (the side the focused display electrode 204 is disposed) of the boundary lines is the display unit of the focused display electrode 204. The distance between the focused display electrode 204 and the adjacent display electrode 204 can be determined as follows. A circle is drawn which is in contact with the outline of the focused display electrode 204 and with the outline of a display electrode 204 adjacent to the focused display electrode 204. With the contact between the circle and the focused display electrode 204 defined as P1 and the contact between the circle and the display electrode 204 adjacent to the focused display electrode 204 defined as P2, the distance between P1 and P2 indicates the distance between the focused display electrode 204 and the adjacent display electrode 204.

In the drawings of the present application, Pwx indicates the maximum length of one display electrode 204 in the first direction D1, and Pwy indicates the maximum length of one display electrode 204 in the second direction D2. In addition, Px indicates the maximum length of one display unit 205 in the first direction D1, and Py indicates the maximum length of one display unit 205 in the second direction D2.

As shown in FIG. 13B, FIG. 13C, FIG. 14B, and FIG. 15B, the first bus line 201 may have a bending period $W_{201-1}$ of three or less or two or less times the maximum length Px of one display unit 205 in the first direction D1. The bending period $W_{201-1}$ of the first bus line 201 is one time in FIG. 13B and FIG. 13C, two times in FIG. 14B, and 4/3 times in FIG. 15B, the maximum length Px of one display unit 205 in the first direction D1. With reference to one display electrode 204, the bending period $W_{201-1}$ of the first bus line 201 may be 3.6 or less or 2.4 or less times the maximum length Pwx of the focused display electrode 204 in the first direction D1.

The second bus line may have a bending period $W_{202-1}$ of three or less or two or less times the maximum length Py of one display unit 205 in the second direction D2. The ratio of the bending period $W_{202-1}$ of the second bus line to the maximum length Py of one display unit 205 in the second direction D2 is one in FIG. 13B and FIG. 13C, two in FIG. 14B, and 4/3 in FIG. 15B. With reference to one display electrode 204, the bending period $W_{202-1}$ of the second bus line may be 3.6 or less or 2.4 or less times the maximum length Pwy of the focused display electrode 204 in the second direction D2.

More preferably, the bending period $W_{201-1}$ of the first bus line 201 is three or less times the maximum length Px of one display unit 205 in the first direction, and the bending period $W_{202-1}$ of the second bus line 202 is three or less times the maximum length Py of one display unit 205 in the second direction D2. Still more preferably, the bending period $W_{201-1}$ of the first bus line 201 is two or less times the maximum length Px of one display unit 205 in the first direction D1, and the bending period $W_{202-1}$ of the second bus line is two or less times the maximum length Py of one display unit 205 in the second direction D2.

With reference to one display electrode 204, more preferably, the bending period $W_{201-1}$ of the first bus line 201 is 3.6 or less times the maximum length Pwx of one display electrode 204 in the first direction, and the bending period $W_{202-1}$ of the second bus line 202 is 3.6 or less times the maximum length Pwy of one display electrode 204 in the second direction D2. Still more preferably, the bending period $W_{201-1}$ of the first bus line 201 is 2.4 or less times the maximum length Pwx of one display electrode 204 in the first direction D1, and the bending period $W_{202-1}$ of the second bus line 202 is 2.4 or less times the maximum length Pwy of one display electrode 204 in the second direction D2.

Figure 16A:
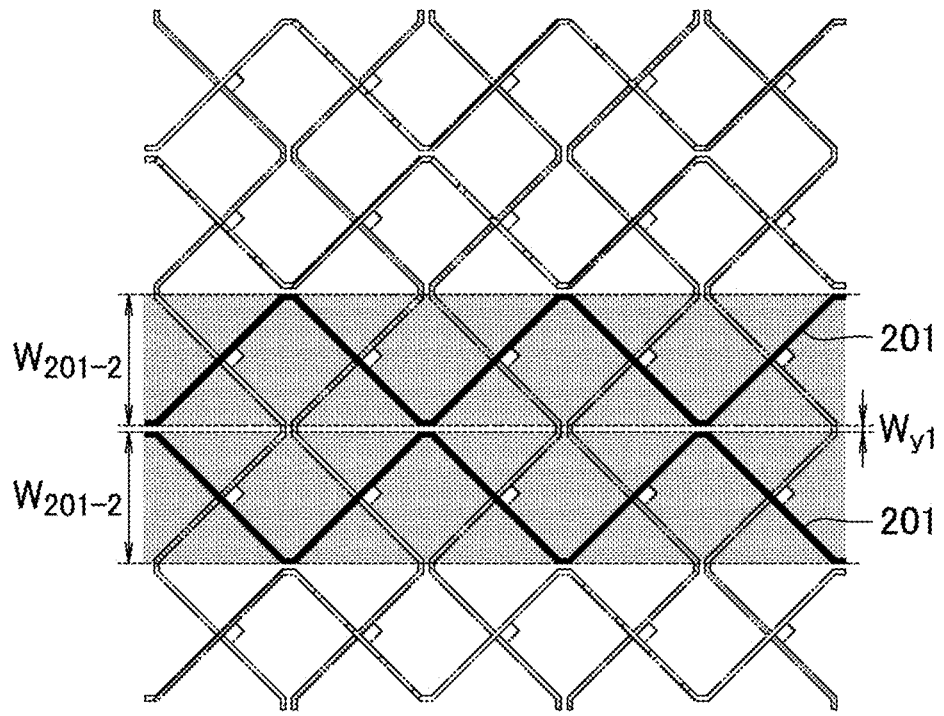
FIG. 16A is a schematic plan view showing arrangement of the first bus lines of Embodiment 1.
Figure 16B:
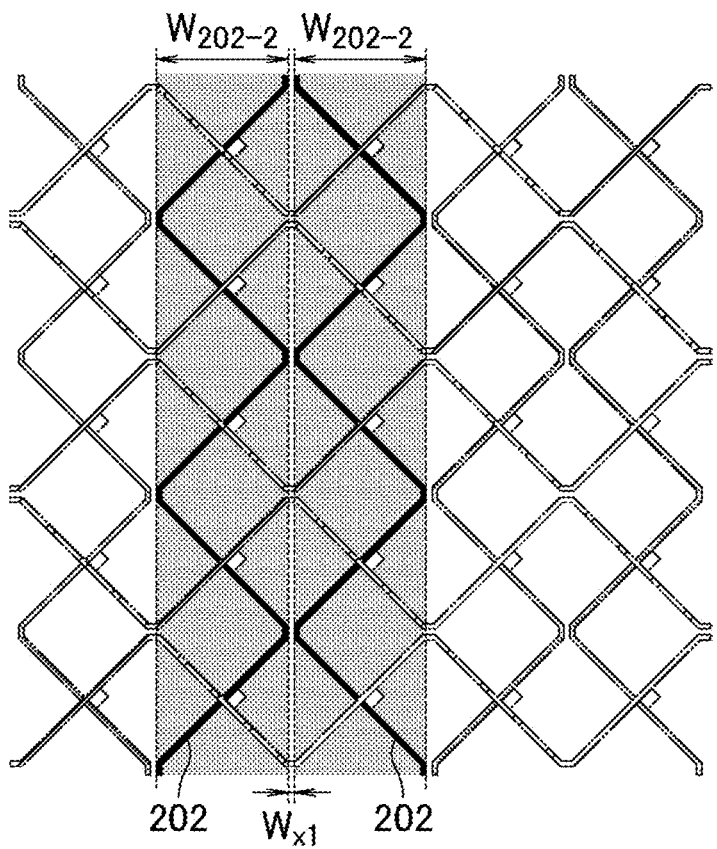
FIG. 16B is a schematic plan view showing arrangement of the second bus lines of Embodiment 1.

Hereinafter, arrangement of adjacent first or second bus lines is described with reference to FIG. 16A and FIG. 16B. FIG. 16A is a schematic plan view showing arrangement of the first bus lines of Embodiment 1. FIG. 16B is a schematic plan view showing arrangement of the second bus lines of Embodiment 1. FIG. 16A and FIG. 16B are each a schematic plan view of the TFT substrate 210 of the liquid crystal display panel 200.

FIG. 16A includes a hatched portion showing a present region of one first bus line 201 indicated by a bold line. The present region of one first bus line 201 is defined as a rectangular region whose short side corresponds to the bending width of the first bus line 201 in the direction perpendicular to the first direction D1 and whose long side corresponds to the length of the first bus line 201 in the first direction D1. FIG. 16A shows present regions of two adjacent first bus lines 201.

In FIG. 16A, the present regions of two adjacent first bus lines 201 do not overlap each other in a plan view. Preferably, a distance $W_{y1}$ between the present regions of two adjacent first bus lines in the direction perpendicular to the first direction D1 is 0.25 or less times the maximum length Py of one display unit 205 in the direction perpendicular to the first direction D1. More preferably, the distance $W_{y1}$ is 0.1 or less times the length Py. With reference to one display electrode 204, the distance $W_{y1}$ may be 0.3 or less times the maximum length Pwy of the display electrode 204 in the direction perpendicular to the first direction D1.

FIG. 16B includes a hatched portion showing a present region of one second bus line 202 indicated by a bold line. The present region of one second bus line 202 is defined as a rectangular region whose short side corresponds to the bending width of the second bus line 202 in the direction perpendicular to the second direction D2 and whose long side corresponds to the length of the second bus line 202 in the second direction D2. FIG. 16B shows present regions of two adjacent second bus lines 202.

In FIG. 16B, the present regions of two adjacent second bus lines 202 do not overlap each other in a plan view. Preferably, a distance $W_{x1}$ between the present regions of two adjacent second bus lines 202 in the direction perpendicular to the second direction D2 is 0.25 or less times the maximum length Px of one display unit 205 in the direction perpendicular to the second direction. More preferably, the distance $W_{x1}$ is 0.1 or less times the length Px. With reference to one display electrode 204, the distance $W_{x1}$ may be 0.3 or less times the maximum length Pwx of the display electrode 204 in the direction perpendicular to the second direction.

The structure shown in FIG. 16A and the structure shown in FIG. 16B may be combined. Preferably, the present regions of two adjacent first bus lines 201 do not overlap each other in a plan view, the present regions of two adjacent second bus line 202 do not overlap each other in a plan view, the distance $W_{y1}$ is 0.25 or less times the length Py, and the distance $W_{x1}$ is 0.25 or less times the length Px. More preferably, the distance $W_{y1}$ is 0.1 or less times the length Py, and the distance $W_{x1}$ is 0.1 or less times the length Px.

With reference to one display electrode 204, preferably, the distance $W_{y1}$ is 0.3 or less times the length Pwy, and the distance $W_{x1}$ is 0.3 or less times the length Pwx. More preferably, the distance $W_{y1}$ is 0.12 or less times the length Pwy, and the distance $W_{x1}$ is 0.12 or less times the length Pwx.

Figure 17:
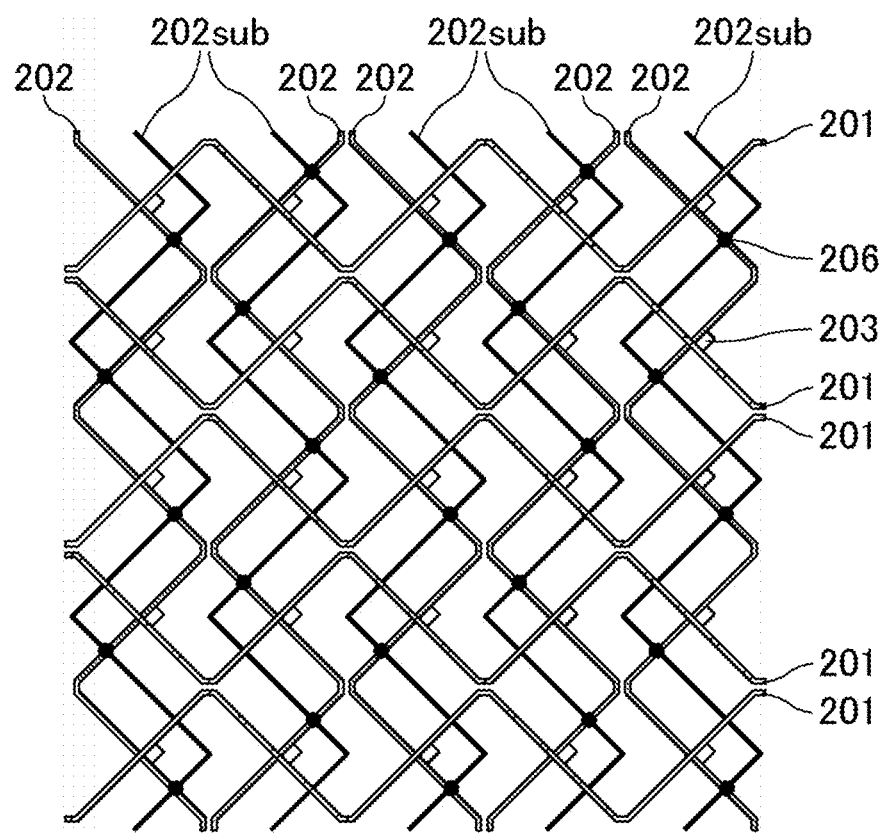
FIG. 17 is a schematic plan view of a TFT substrate included in a liquid crystal display panel of Modified Example 5, additionally including redundant lines.
Figure 18:
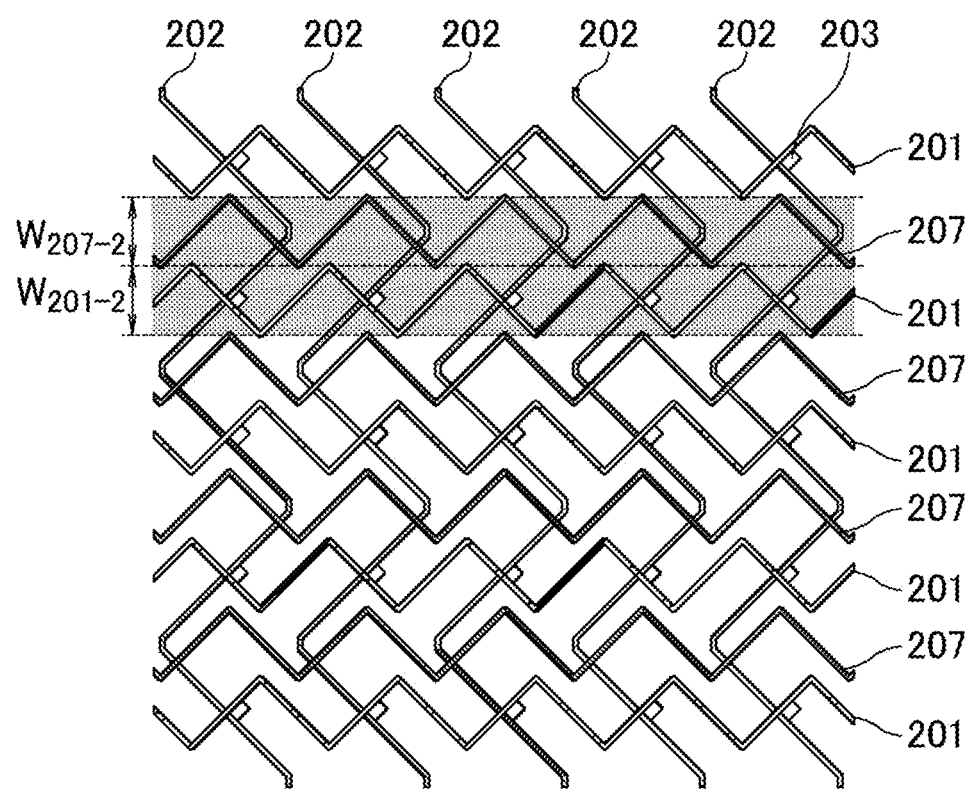
FIG. 18 is a schematic plan view of a TFT substrate included in a liquid crystal display panel of Modified Example 6, additionally including auxiliary capacitance lines.
Figure 19:
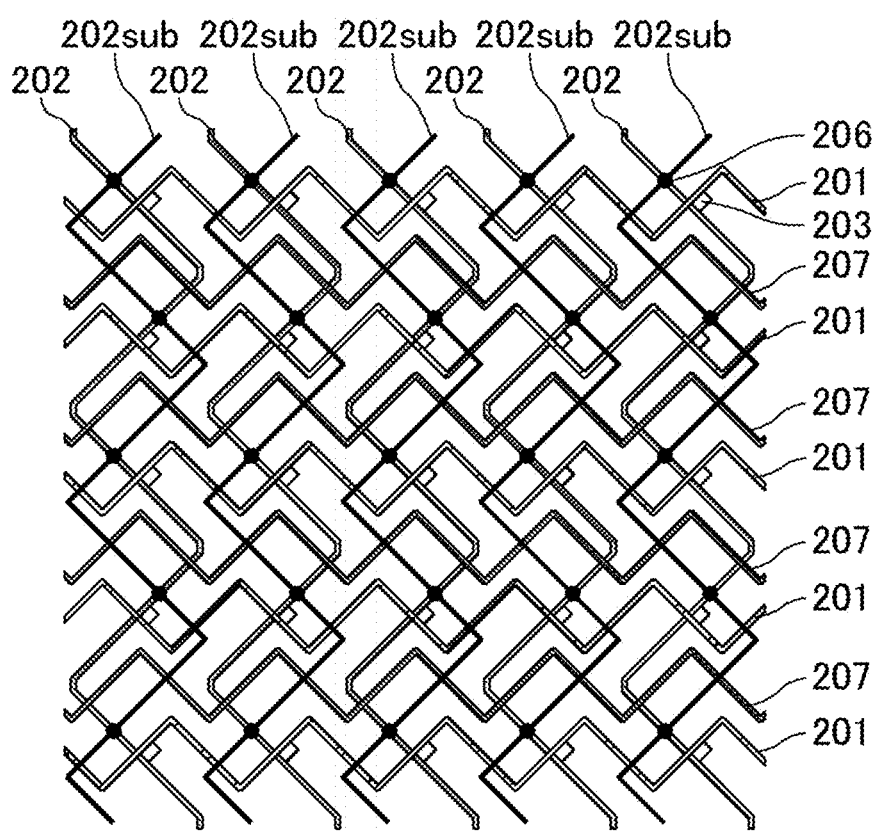
FIG. 19 is a schematic plan view of Modified Example 7 obtained by combining Modified Example 5 shown in FIG. 17 and Modified Example 6 shown in FIG. 18.

The TFT substrate 210 of the liquid crystal display panel 200 may include redundant lines and/or auxiliary capacitance lines in addition to the first and second bus lines. FIG. 17 is a schematic plan view of a TFT substrate included in a liquid crystal display panel of Modified Example 5, additionally including redundant lines. FIG. 18 is a schematic plan view of a TFT substrate included in a liquid crystal display panel of Modified Example 6, additionally including auxiliary capacitance lines. FIG. 19 is a schematic plan view of Modified Example 7 obtained by combining Modified Example 5 shown in FIG. 17 and Modified Example 6 shown in FIG. 18.

As shown in FIG. 17, in Modified Example 5, redundant lines 202*sub* are added to the second bus lines 202. Each redundant line 202*sub* is connected to a second bus line 202 at connecting points 206. Provision of the redundant lines 202*sub* allows the second bus lines 202 to be double-linear. Thus, even when part of a second bus line 202 is open-circuited due to a defect during production or the like, electric current can pass through a redundant line 202*sub*, which can improve the yield.

The redundant lines 202*sub* may be disposed in any way. In FIG. 17, each redundant line 202*sub* has the same bending width, bending period, and bending angle as the second bus lines 202. Each redundant line 202*sub* is moved parallel to a second bus line 202 in the second direction D2 and is connected to the second bus line 202 at the intersections of the second bus line 202 and the redundant line 202*sub*. Redundant lines 202*sub* having the same shape as the second bus lines 202 can prevent moreé and improve the yield while unlikely causing moreé.

As shown in FIG. 18, Modified Example 6 includes auxiliary capacitance lines 207. In Modified Example 6, each auxiliary capacitance line 207 has the same bending width, bending period, and bending angle as the first bus lines 201 and is moved parallel to a first bus line 201 in the first direction D1. The first bus line 201 and the auxiliary capacitance line 207 may be alternately arranged in the second direction D2. Concerning two adjacent auxiliary capacitance lines 207 sandwiching one first bus line 201, preferably, the distance between one auxiliary capacitance line 207 and the first bus line 201 and the distance between the other adjacent auxiliary capacitance line 207 and the first bus line 201 are preferably the same.

With a rectangular region whose short side corresponds to the bending width of one of the auxiliary capacitance lines 207 in a direction perpendicular to the first direction D1 and whose long side corresponds to the length of the auxiliary capacitance line 207 in the first direction D1 defined as a present region of the auxiliary capacitance line 207, in a plan view, most preferably, the present region of the auxiliary capacitance line 207 is in contact with the present region of an adjacent first bus line 201. When the present region of the adjacent first bus line 201 and the present region of the auxiliary capacitance line 207 are not in contact with and do not overlap each other, the distance between the present regions is preferably 0.25 or less times, more preferably 0.1 or less times, the maximum length Py of one display unit 205 in the direction perpendicular to the first direction. When these present regions overlap each other, the overlapping width between these present regions is preferably 0.25 or less times, more preferably 0.1 or less times, the maximum length Py of one display unit 205 in the direction perpendicular to the first direction.

With the display electrodes 204 being focused, the distance between the present regions is preferably 0.3 or less times, more preferably 0.12 or less times, the maximum length Pwy of one display electrode 204 in the direction perpendicular to the first direction. When these present regions overlap each other, the overlapping width between these present regions is preferably 0.3 or less times, more preferably 0.12 or less times, the maximum length Pwy of one display electrode 204 in the direction perpendicular to the first direction.

Figure 25A:
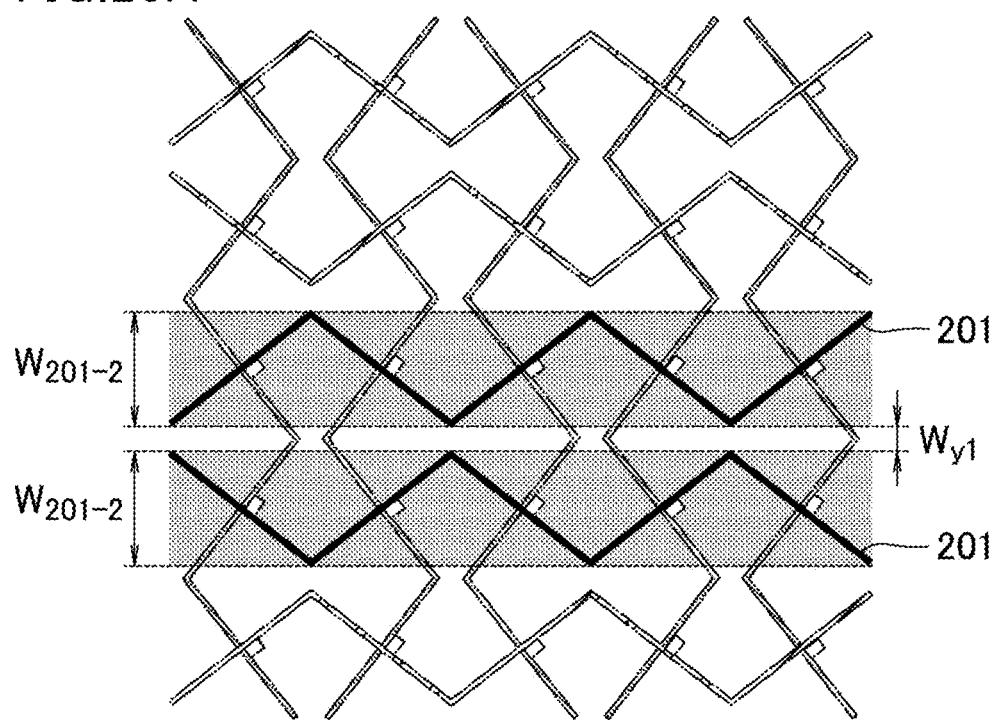
FIG. 25A is a schematic plan view showing arrangement of the first bus lines of Embodiment 2.
Figure 31A:
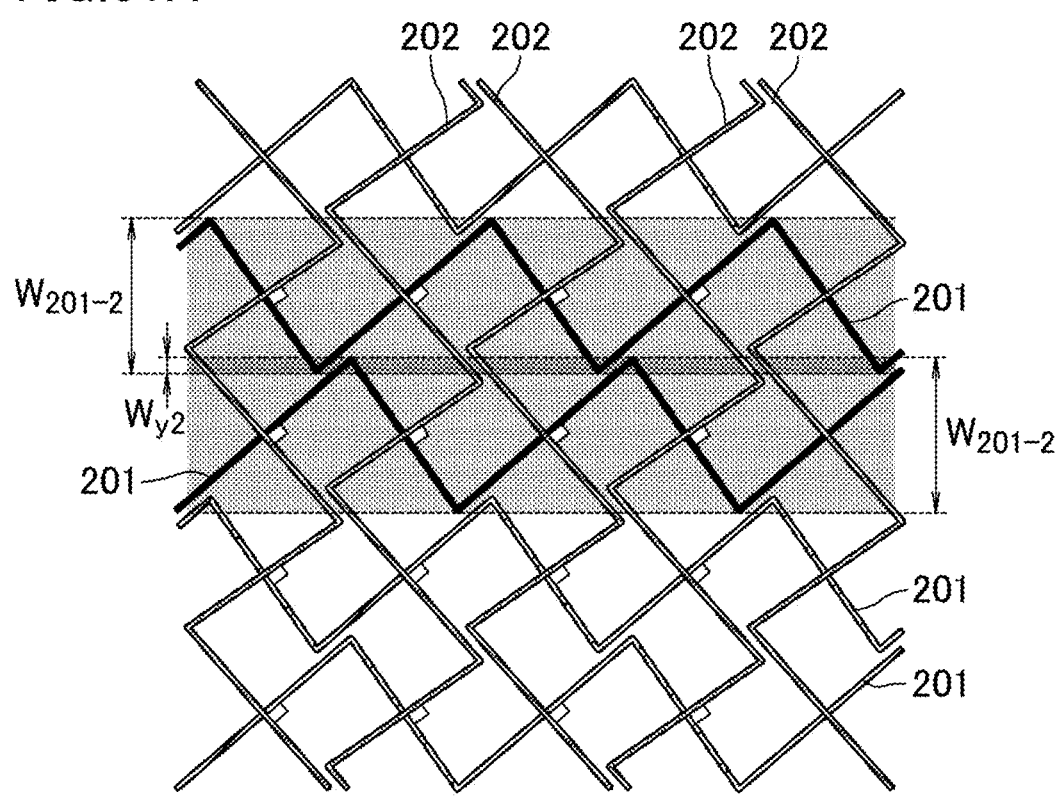
FIG. 31A is a schematic plan view showing arrangement of the first bus lines of Embodiment 3.

The structure in which the auxiliary capacitance lines 207 and the first bus lines 201 as a whole form a pattern unlikely causing moreé, such as a pattern as shown in FIG. 16A, FIG. 25A, or FIG. 31A can reduce the resistance of the common electrode (the conductive layer 214 in Embodiment 1) and stabilize the display quality while reducing or preventing moreé due to the auxiliary capacitance lines 207. Also, the auxiliary capacitance lines 207 may be used as electrodes for an in-cell touch panel. Incorporating the function of a touch panel in the liquid crystal display panel can intend cost-cutting of the whole system.

As shown in FIG. 19, provision of the redundant lines 202sub can allow the second bus lines 202 to be double-linear and improve the yield, and provision of the auxiliary capacitance lines 207 can reduce the resistance of the common electrode and stabilize the display quality.

Embodiment 2

Figure 20A:
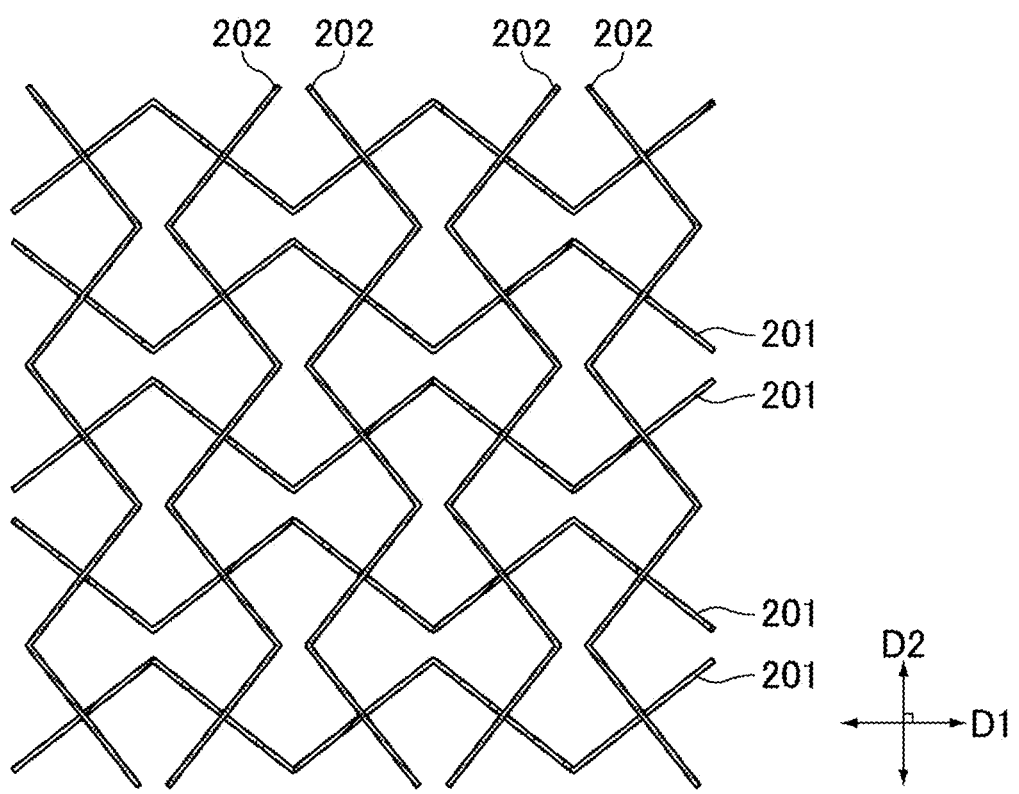
FIG. 20A is a schematic plan view of first and second bus lines of a liquid crystal display panel of Embodiment 2.
Figure 20B:
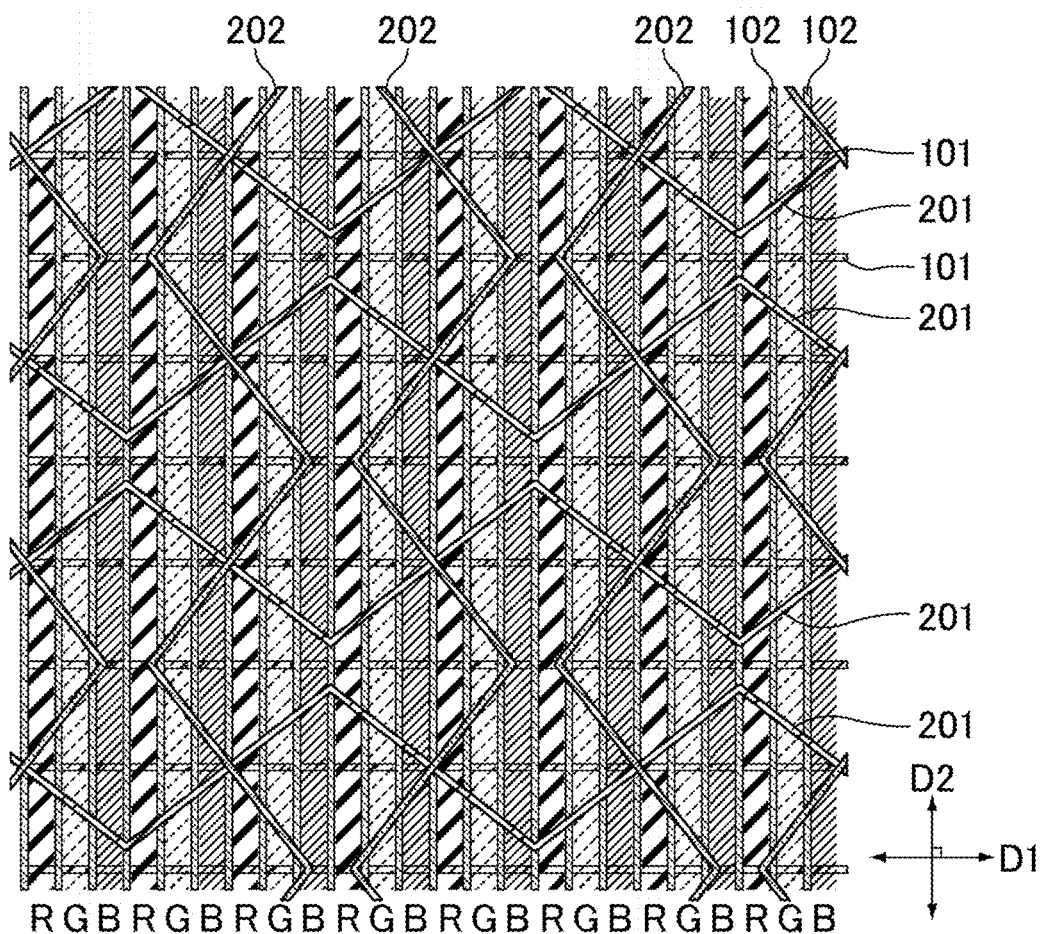
FIG. 20B is a schematic plan view obtained by superimposing the color display element shown in FIG. 2 with the first and second bus lines shown in FIG. 20A.
Figure 21A:
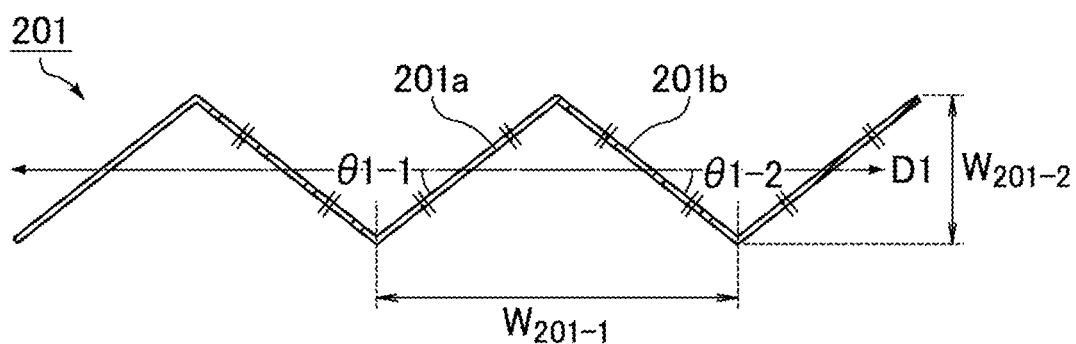
FIG. 21A is a schematic plan view of one first bus line shown in FIG. 20A.
Figure 21B:
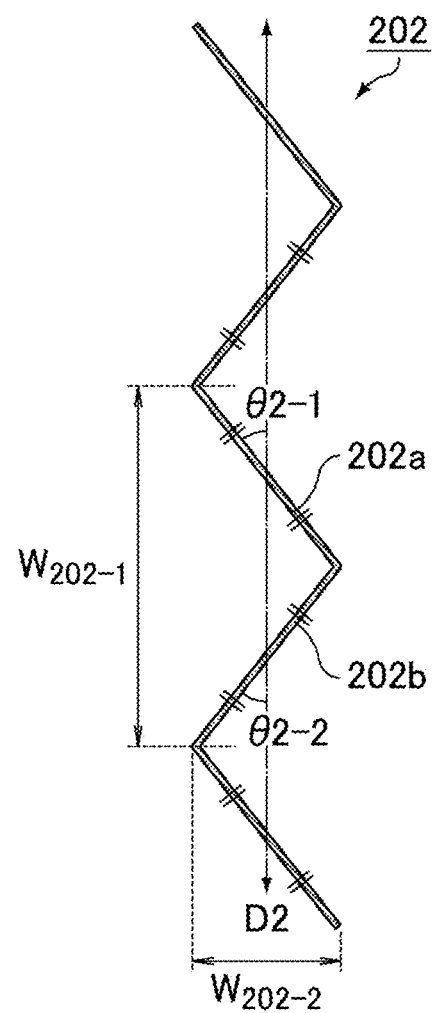
FIG. 21B is a schematic plan view of one second bus line shown in FIG. 20A.

In Embodiment 2, first and second bus lines have different shapes from those of Embodiment 1 and periodically bend. FIG. 20A is a schematic plan view of first and second bus lines of a liquid crystal display panel of Embodiment 2. FIG. 21A is a schematic plan view of one first bus line shown in FIG. 20A. FIG. 21B is a schematic plan view of one second bus line shown in FIG. 20A

As shown in FIG. 21A, linear portions 201a and linear portions 201b having different extending directions are combined to form one first bus line 201. FIG. 21A shows the case where the length of the linear portion 201a and the length of the linear portion 201b are the same, and each of the bending angle $\theta$1-1 formed by the first direction D1 and the linear portion 201a and the bending angle $\theta$1-2 formed by the first direction D1 and the linear portion 201b is 38°.

As shown in FIG. 21B, linear portions 202a and linear portions 202b having different extending directions are combined to form one second bus line 202. FIG. 21B shows the case where the length of the linear portion 202a and the length of the linear portion 202b are the same, and each of the bending angle $\theta$2-1 formed by the second direction D2 and the linear portion 202a and the bending angle $\theta$2-2 formed by the second direction D2 and the linear portion 202b is 38°.

Figure 22A:
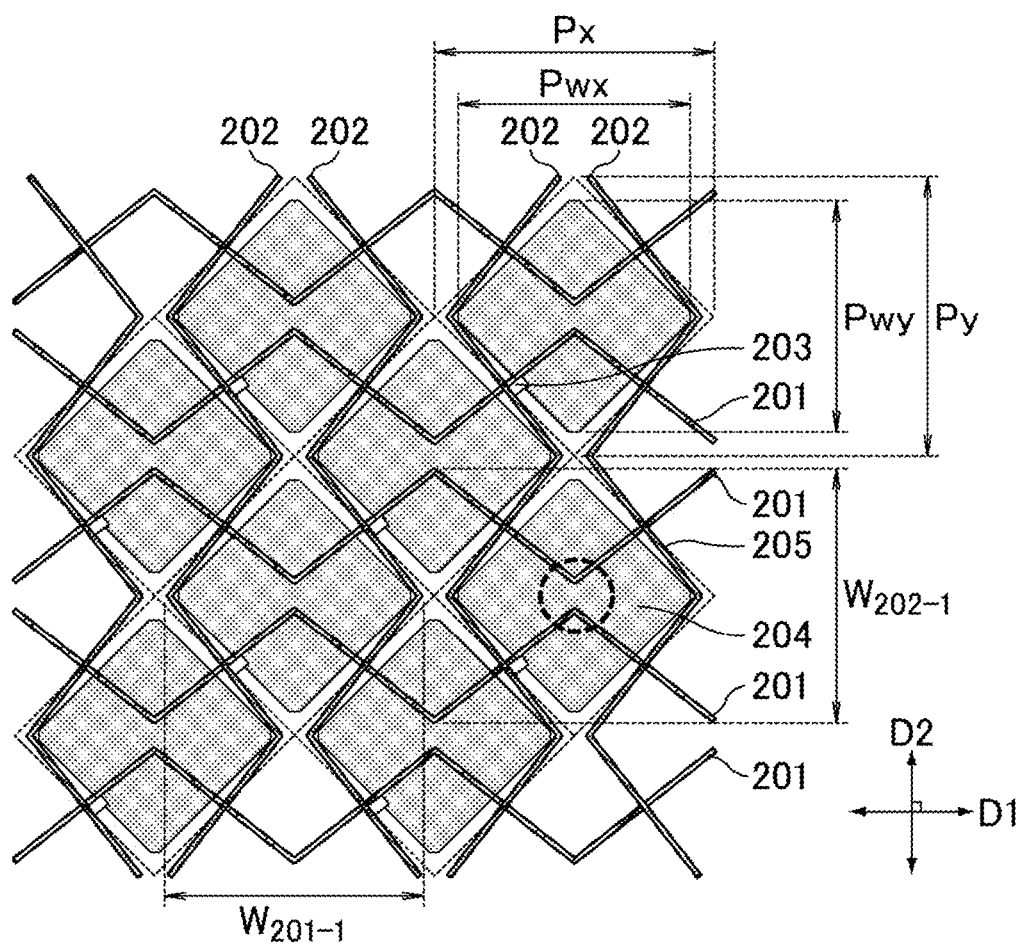
FIG. 22A is a schematic plan view obtained by superimposing the rhombic display electrodes shown in FIG. 13A with the first and second bus lines of Embodiment 2.
Figure 22B:
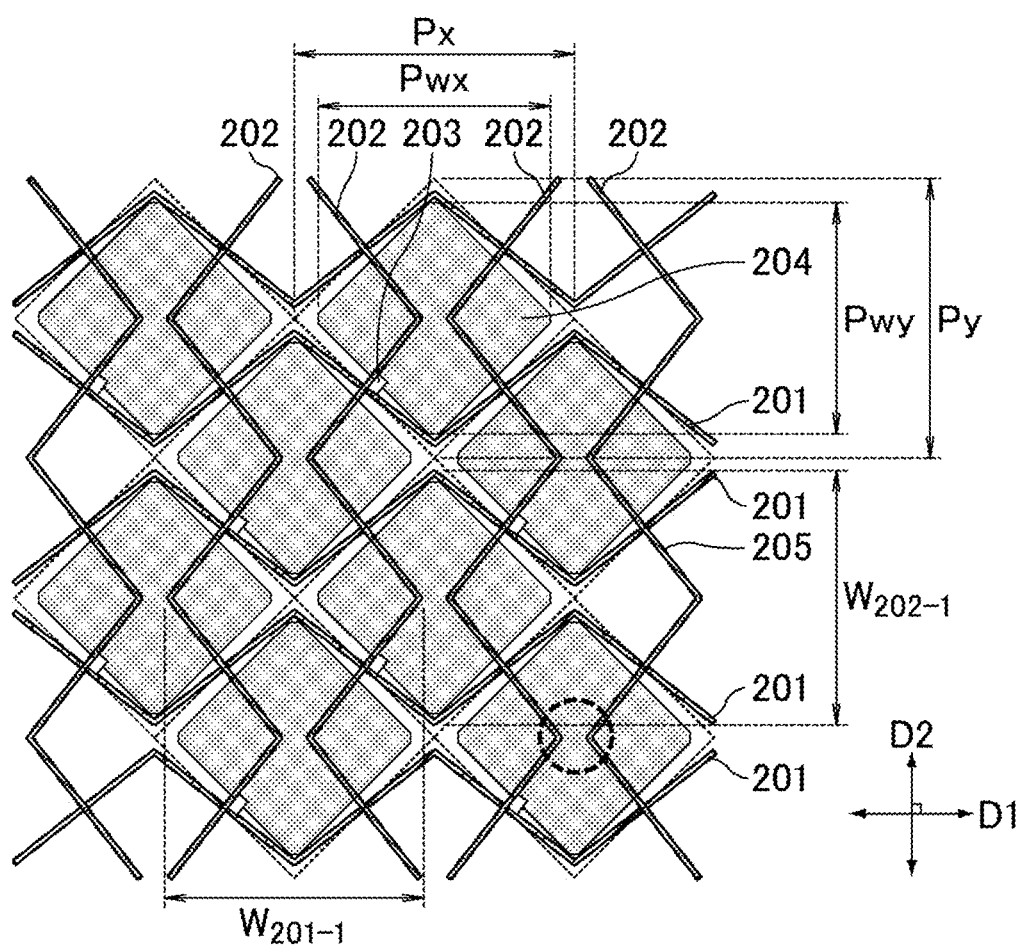
FIG. 22B shows a different example with different arrangement of the display electrodes shown in FIG. 22A.
Figure 23:
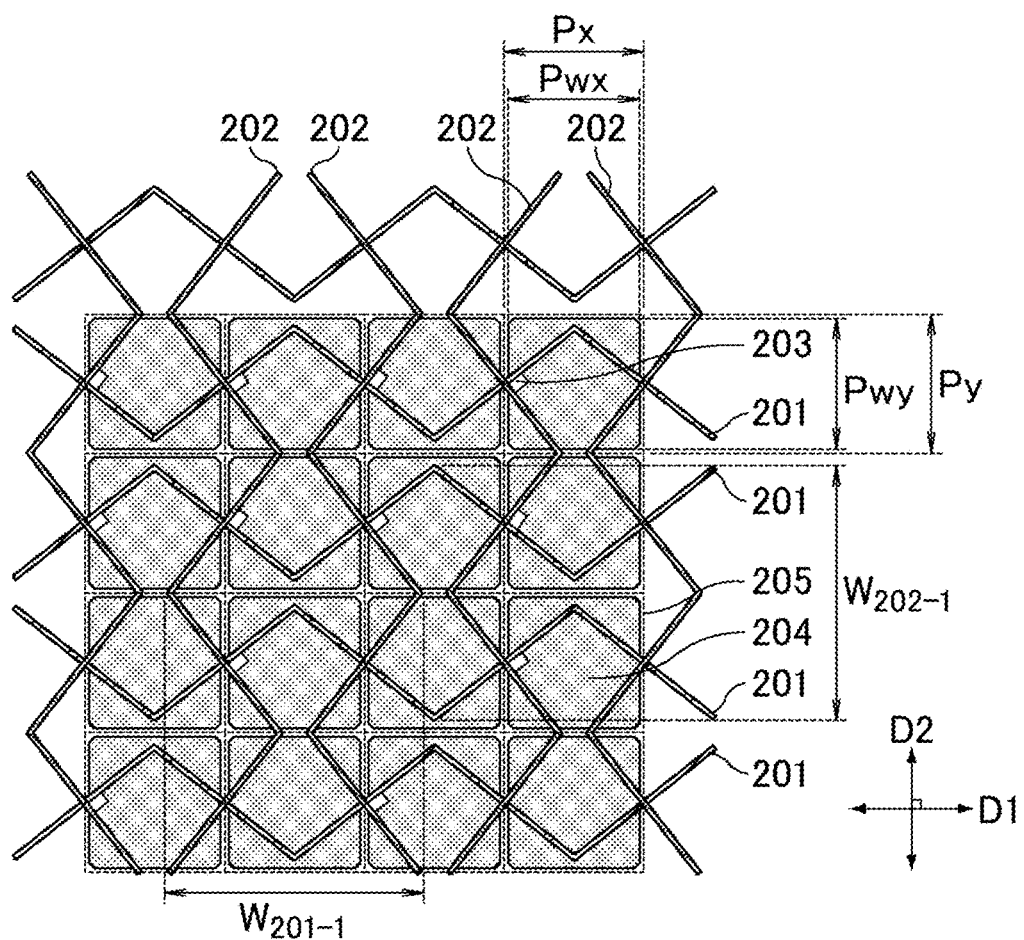
FIG. 23 is a schematic plan view obtained by superimposing the square display electrodes shown in FIG. 14A with the first and second bus lines of Embodiment 2.
Figure 24:
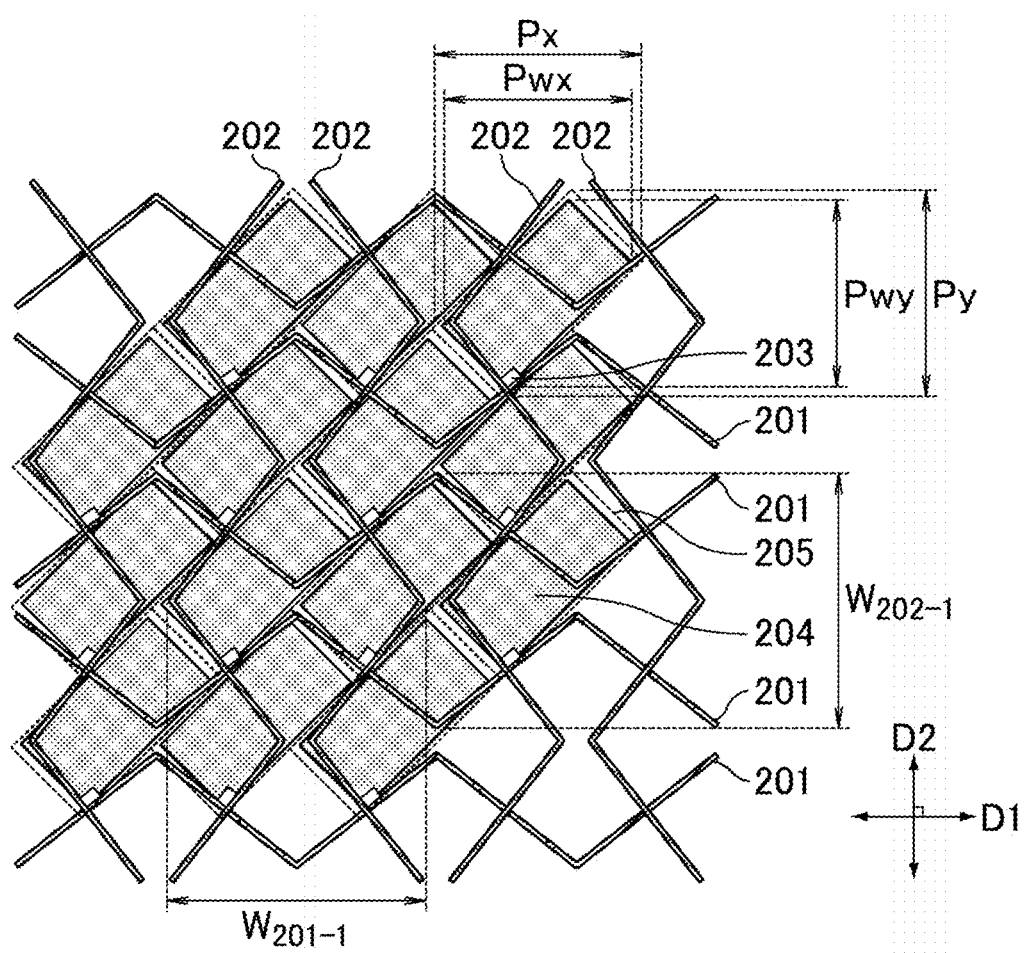
FIG. 24 is a schematic plan view obtained by superimposing the rectangular display electrodes shown in FIG. 15A with the first and second bus lines of Embodiment 2.

FIG. 22A is a schematic plan view obtained by superimposing the rhombic display electrodes shown in FIG. 13A with the first and second bus lines of Embodiment 2. FIG. 22B shows a different example with different arrangement of the display electrodes shown in FIG. 22A. FIG. 23 is a schematic plan view obtained by superimposing the square display electrodes shown in FIG. 14A with the first and second bus lines of Embodiment 2. FIG. 24 is a schematic plan view obtained by superimposing the rectangular display electrodes shown in FIG. 15A with the first and second bus lines of Embodiment 2. A portion surrounded by a dotted line in FIG. 22A and a portion surrounded by a dotted line in FIG. 22B respectively indicate a portion with the shortest distance between two adjacent first bus lines 201 and a portion with the shortest distance between two adjacent second bus lines 202. As shown in FIG. 22A to FIG. 24, the first and second bus lines of Embodiment 2 may also be combined with the rhombic, square, or rectangular display electrodes described in Embodiment 1. In order to eliminate the influence on display by signal lines through parasitic capacitance, preferably, the transparent conductive layer 214 shown in FIG. 5 is disposed and thereby shields between the first bus lines 201 and the display electrodes 204 and between the second bus lines 202 and the display electrodes 204.

Figure 25B:
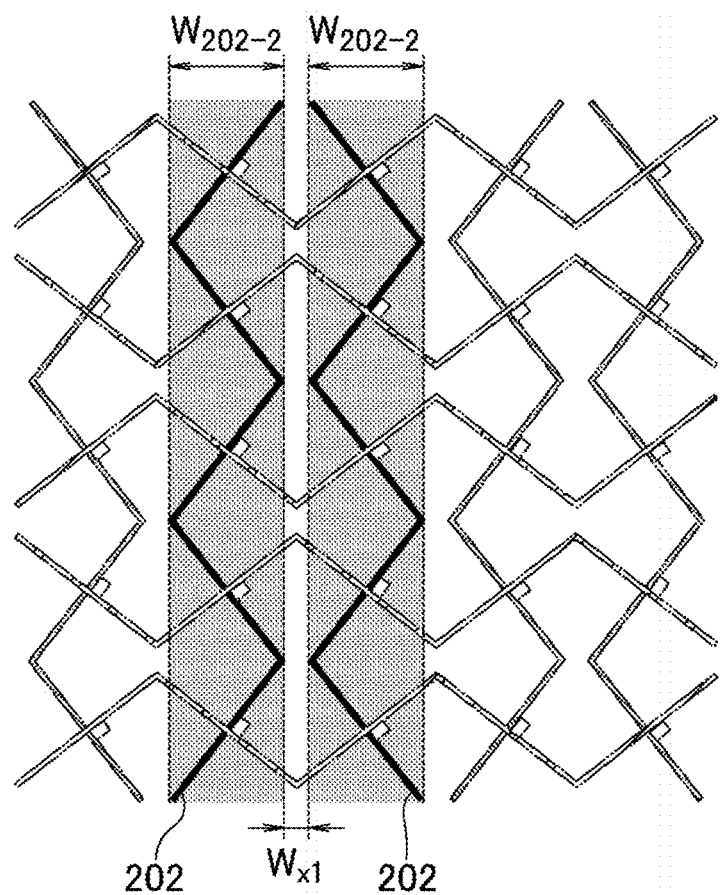
FIG. 25B is a schematic plan view showing arrangement of the second bus lines of Embodiment 2.

Hereinafter, arrangement of adjacent first or second bus lines is described with reference to FIG. 25A and FIG. 25B. FIG. 25A and FIG. 25B are each a schematic plan view of the TFT substrate 210 of the liquid crystal display panel 200.

FIG. 25A is a schematic plan view showing arrangement of the first bus lines of Embodiment 2. FIG. 25A includes a hatched portion showing a present region of one first bus line 201 indicated by a bold line, and shows present regions of two adjacent first bus lines 201. In FIG. 25A, the present regions of two adjacent first bus lines 201 do not overlap each other in a plan view. Preferably, a distance $W_{y1}$ between the present regions of two adjacent first bus lines in the direction perpendicular to the first direction D1 is 0.25 or less times the maximum length Py of one display unit 205 in the direction perpendicular to the first direction D1. More preferably, the distance $W_{y1}$ is 0.1 or less times the length Py.

With reference to one display electrode 204, the distance $W_{y1}$ is preferably 0.3 or less times, more preferably 0.12 or less times, the maximum length Pwy of the display electrode 204 in the direction perpendicular to the first direction D1.

FIG. 25B is a schematic plan view showing arrangement of the second bus lines of Embodiment 2. FIG. 25B includes a hatched portion showing a present region of one second bus line 202 indicated by a bold line, and shows present regions of two adjacent second bus lines 202. In FIG. 25B, the present regions of two adjacent second bus lines 202 do not overlap each other in a plan view. Preferably, a distance $W_{x1}$ between the present regions of two adjacent second bus lines 202 in the direction perpendicular to the second direction is 0.25 or less times the maximum length Px of one display unit 205 in the direction perpendicular to the second direction D2. More preferably, the distance $W_{x1}$ is 0.1 or less times the length Px.

With reference to one display electrode 204, the distance $W_{x1}$ is preferably 0.3 or less times, more preferably 0.12 or less times, the maximum length Pwx of the display electrode 204 in the direction perpendicular to the second direction.

The structure shown in FIG. 25A and the structure shown in FIG. 25B may be combined. Preferably, the present regions of two adjacent first bus lines 201 do not overlap each other in a plan view, the present regions of two adjacent second bus line 202 do not overlap each other in a plan view, the distance $W_{y1}$ is 0.25 or less times the length Py, and the distance $W_{x1}$ is 0.25 or less times the length Px. More preferably, the distance $W_{y1}$ is 0.1 or less times the length Py, and the distance $W_{x1}$ is 0.1 or less times the length Px.

Embodiment 3

Figure 26A:
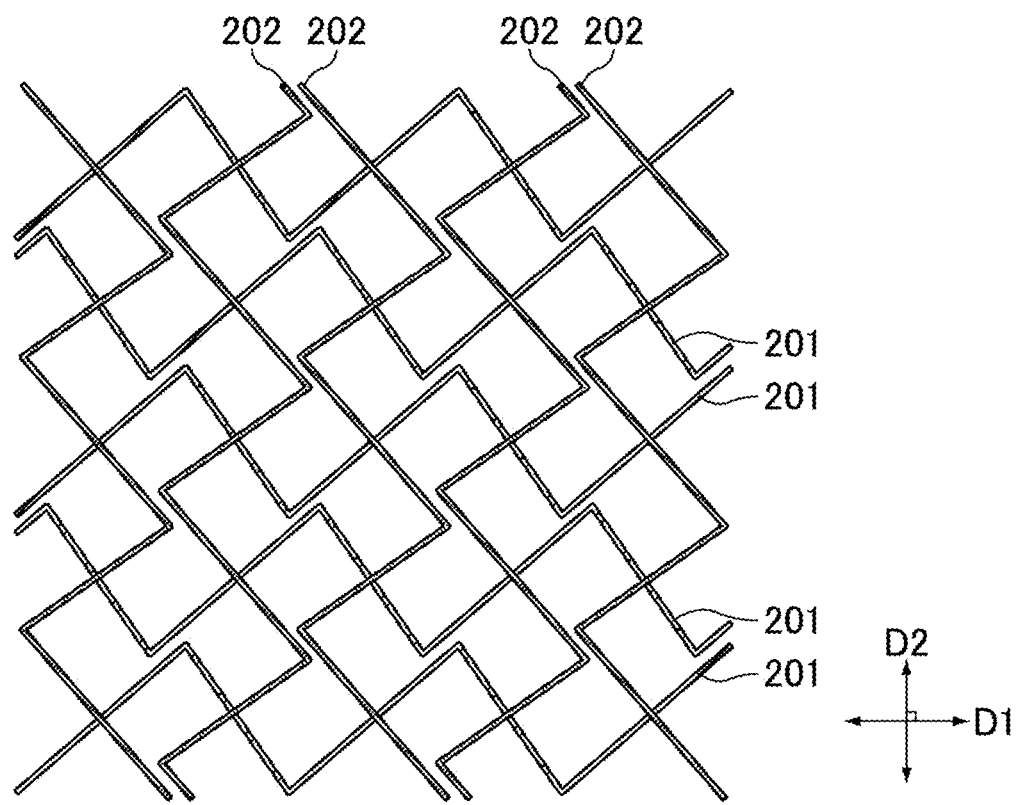
FIG. 26A is a schematic plan view of first and second bus lines of a liquid crystal display panel of Embodiment 3.
Figure 26B:
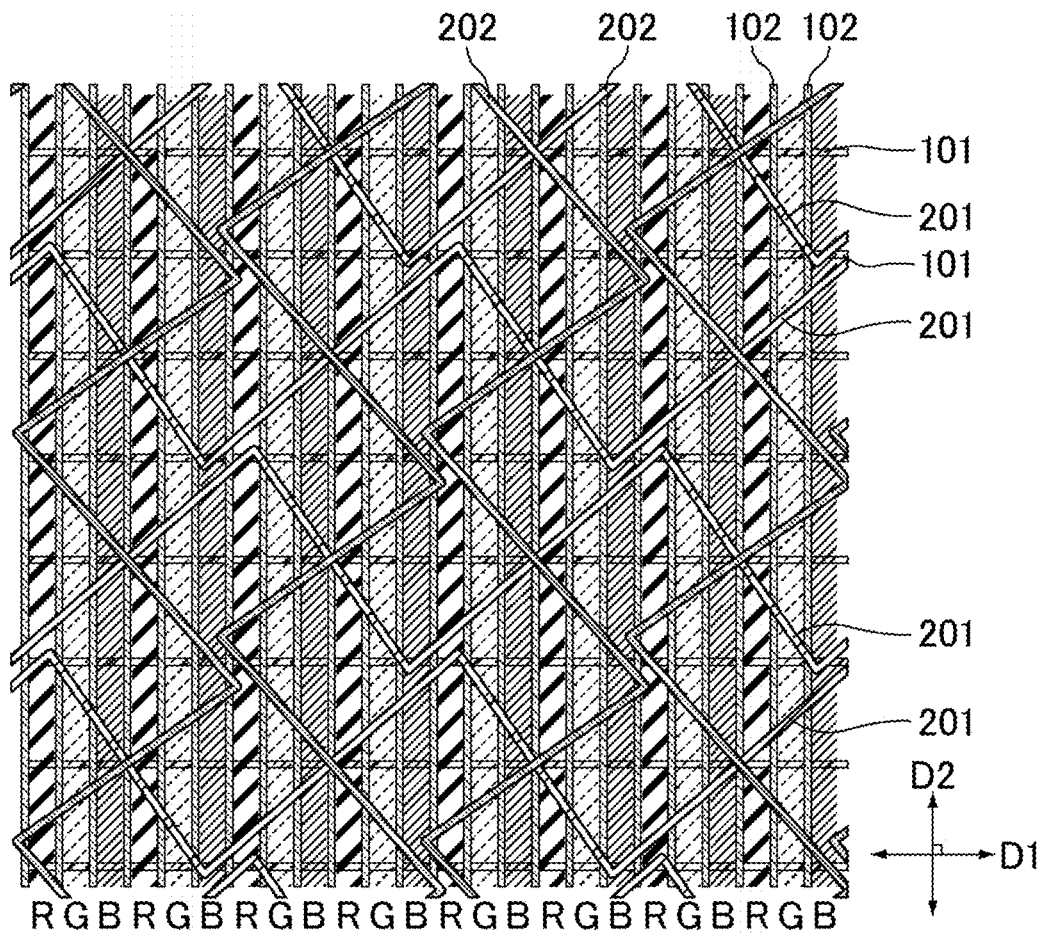
FIG. 26B is a schematic plan view obtained by superimposing the color display element shown in FIG. 2 with the first and second bus lines shown in FIG. 26A.
Figure 27A:
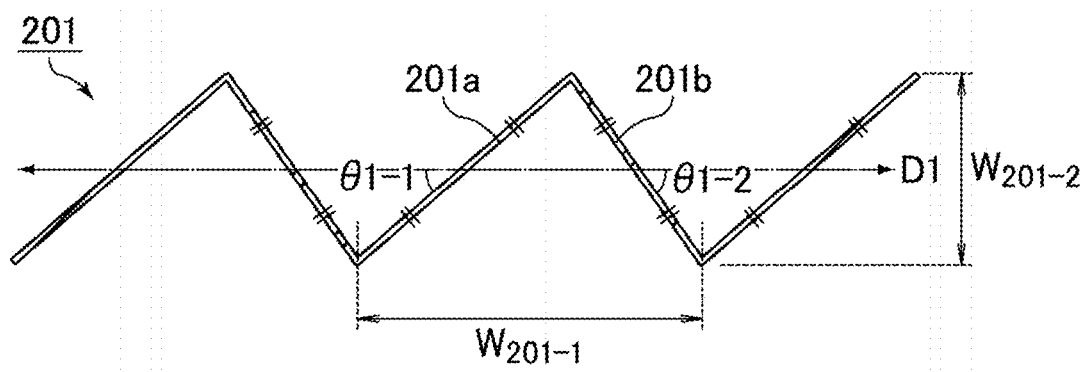
FIG. 27A is a schematic plan view of one first bus line shown in FIG. 26A.

In Embodiment 3, first and second bus lines have different shapes from those of Embodiment 1 and periodically bend. FIG. 26A is a schematic plan view of first and second bus lines of a liquid crystal display panel of Embodiment 3. FIG. 27A is a schematic plan view of one first bus line shown in FIG. 26A. FIG. 27B is a schematic plan view of one second bus line shown in FIG. 26A.

As shown in FIG. 27A, linear portions 201a and linear portions 201b having different extending directions are combined to form one first bus line 201. FIG. 27A shows the case where the length of the linear portion 201a and the length of the linear portion 201b are different from each other, the bending angle θ1-1 formed by the first direction D1 and the linear portion 201a is 55°, and the bending angle θ1-2 formed by the first direction D1 and the linear portion 201b is 41°.

As shown in FIG. 27B, linear portions 202a and linear portions 202b having different extending directions are combined to form one second bus line 202. FIG. 27B shows the case where the length of the linear portion 202a and the length of the linear portion 202b are different from each other, the bending angle θ2-1 formed by the second direction D2 and the linear portion 202a is 55°, and the bending angle θ2-2 formed by the second direction D2 and the linear portion 202b is 41°.

Figure 28A:
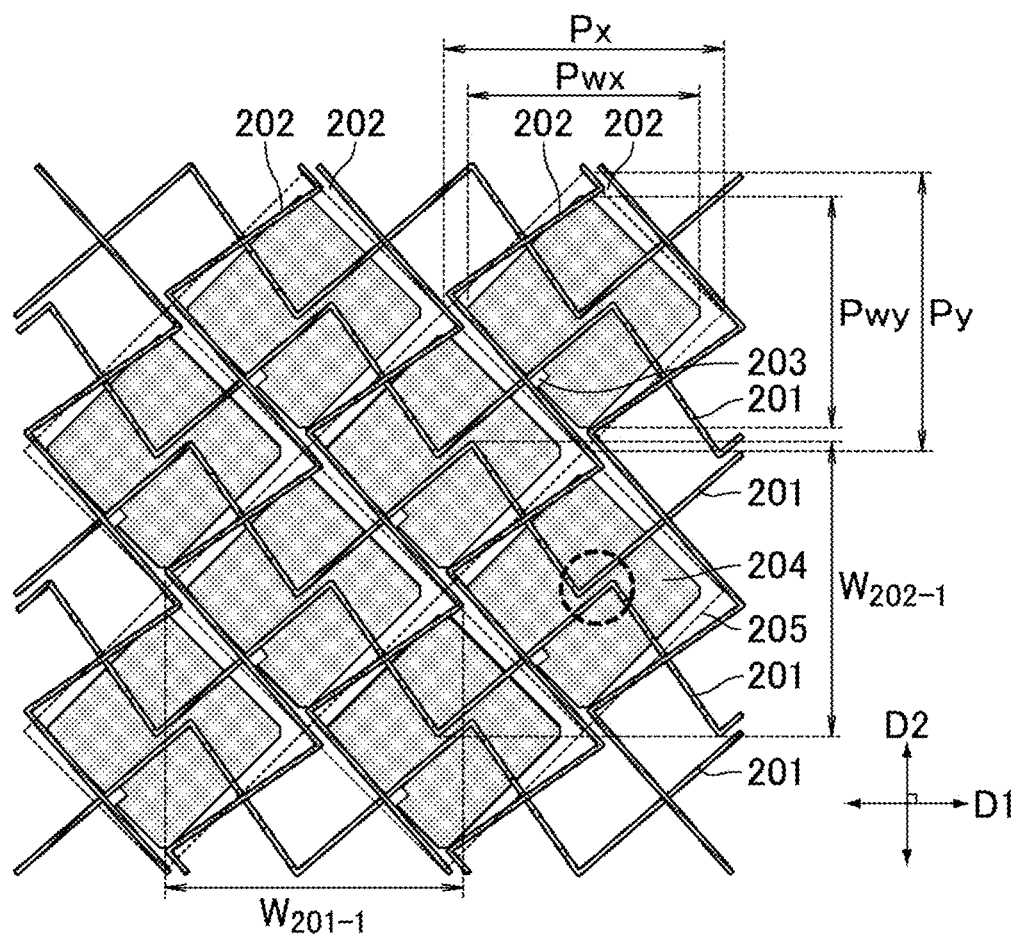
FIG. 28A is a schematic plan view obtained by superimposing the rhombic display electrodes shown in FIG. 13A with the first and second bus lines of Embodiment 3.
Figure 28B:
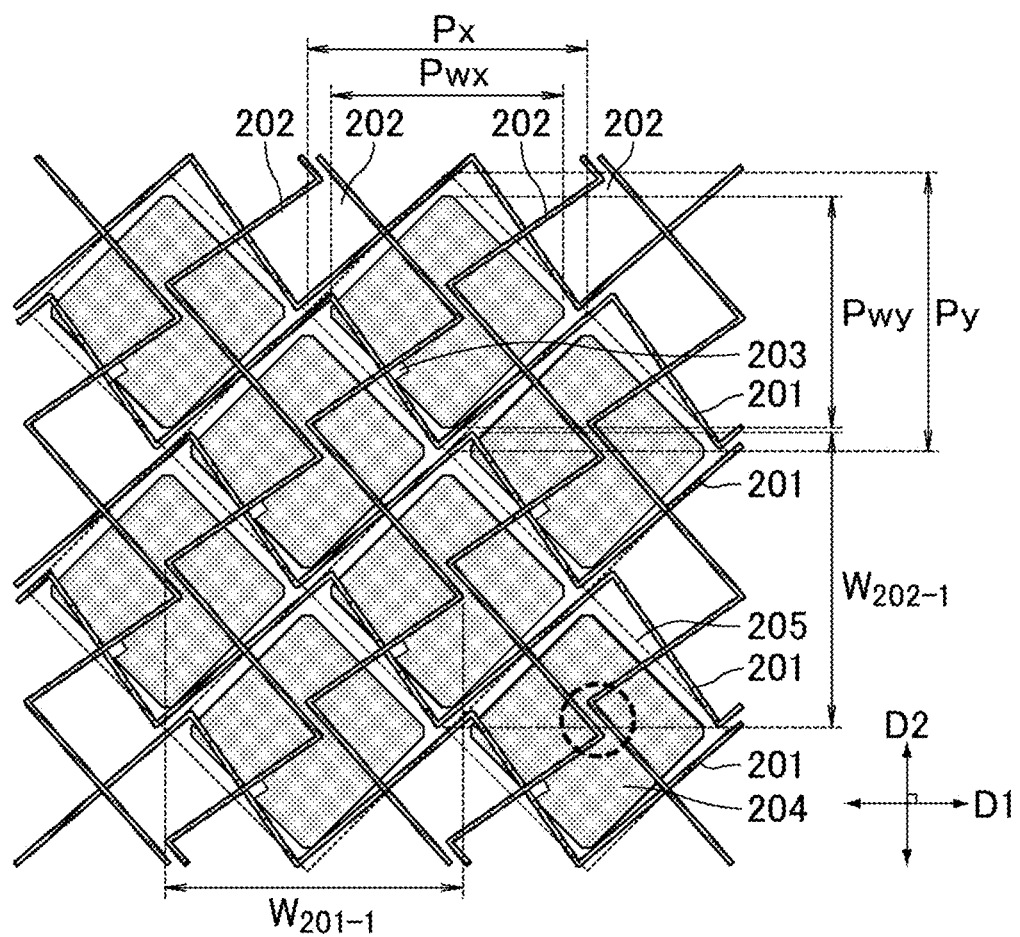
FIG. 28B shows a different example with different arrangement of the display electrodes shown in FIG. 28A.
Figure 29:
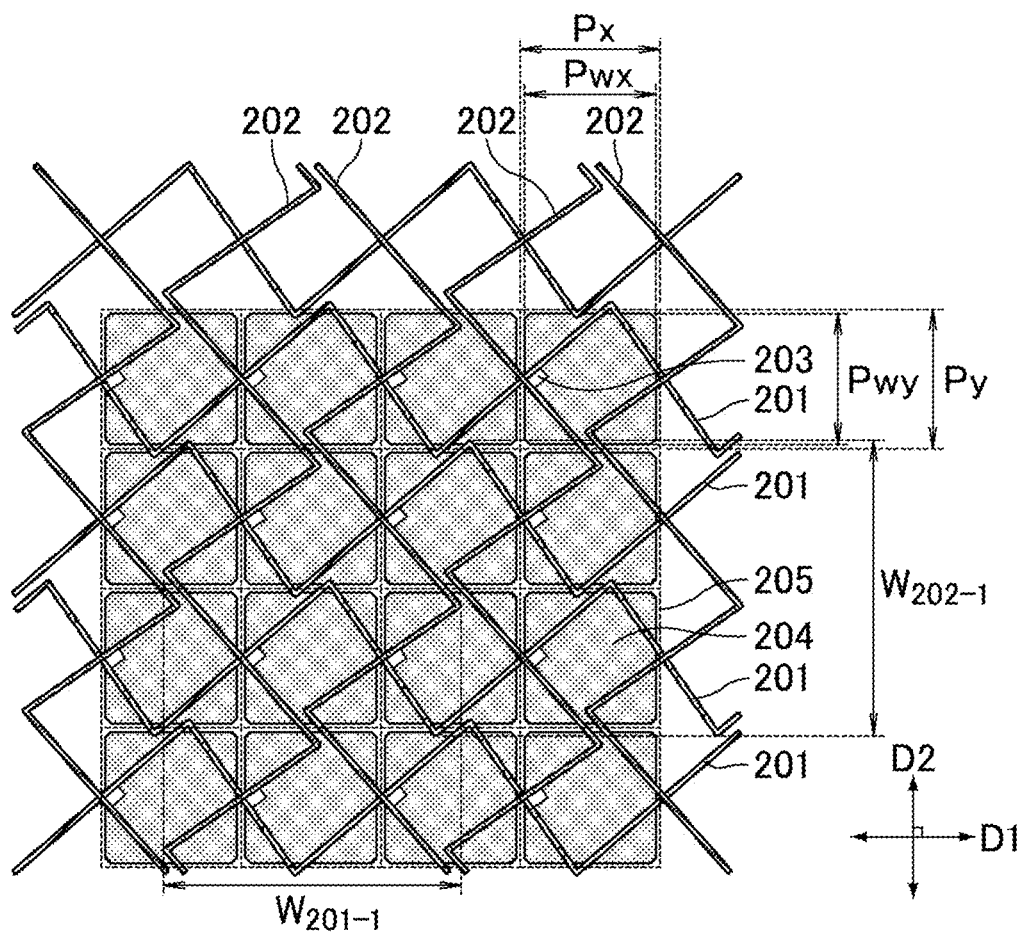
FIG. 29 is a schematic plan view obtained by superimposing the square display electrodes shown in FIG. 14A with the first and second bus lines of Embodiment 3.
Figure 30:
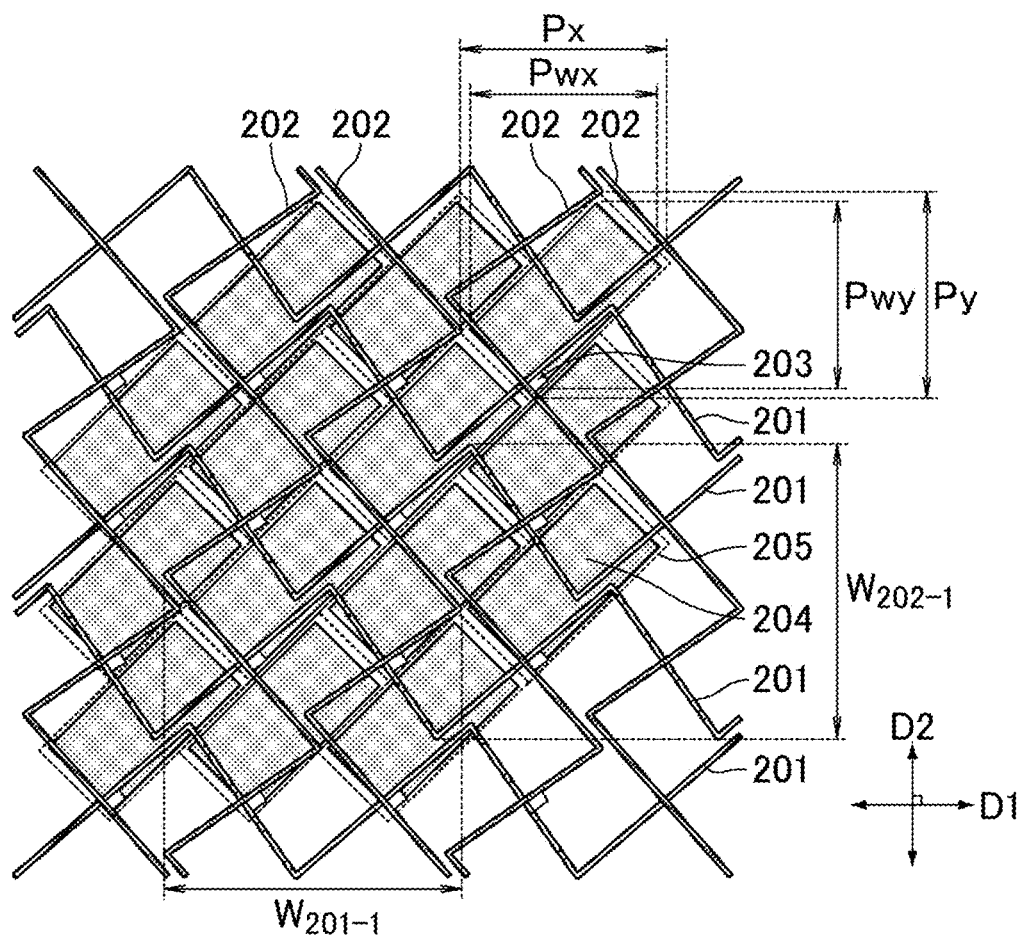
FIG. 30 is a schematic plan view obtained by superimposing the rectangular display electrodes shown in FIG. 15A with the first and second bus lines of Embodiment 3.

FIG. 28A is a schematic plan view obtained by superimposing the rhombic display electrodes shown in FIG. 13A with the first and second bus lines of Embodiment 3. FIG. 28B shows a different example with different arrangement of the display electrodes shown in FIG. 28A. FIG. 29 is a schematic plan view obtained by superimposing the square display electrodes shown in FIG. 14A with the first and second bus lines of Embodiment 3. FIG. 30 is a schematic plan view obtained by superimposing the rectangular display electrodes shown in FIG. 15A with the first and second bus lines of Embodiment 3. A portion surrounded by a dotted line in FIG. 28A and a portion surrounded by a dotted line in FIG. 28B respectively indicate a portion with the shortest distance between two adjacent first bus lines 201t and a portion with the shortest distance between two adjacent second bus lines 202. As shown in FIG. 28A to FIG. 30, the first and second bus lines of Embodiment 3 may also be combined with the rhombic, square, or rectangular display electrodes described in Embodiment 1. In order to eliminate the influence on display by signal lines through parasitic capacitance, preferably, the transparent conductive layer 214 shown in FIG. 5 is disposed and thereby shields between the first bus lines 201 and the display electrodes 204 and between the second bus lines 202 and the display electrodes 204.

Figure 31B:
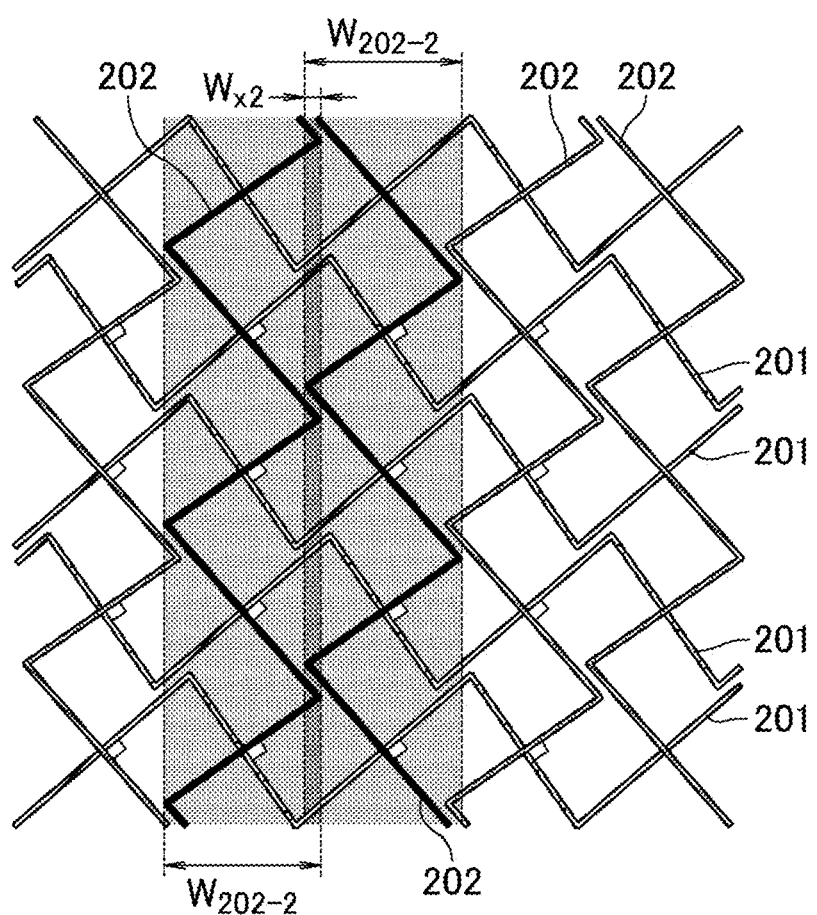
FIG. 31B is a schematic plan view showing arrangement of the second bus lines of Embodiment 3.

Hereinafter, arrangement of adjacent first or second bus lines is described with reference to FIG. 31A and FIG. 31B. FIG. 31A and FIG. 31B are each a schematic plan view of the TFT substrate 210 of the liquid crystal display panel 200.

FIG. 31A is a schematic plan view showing arrangement of the first bus lines of Embodiment 3. FIG. 31A includes a hatched portion showing a present region of one first bus line 201 indicated by a bold line, and shows present regions of two adjacent first bus lines 201. In FIG. 31A, the present regions of two adjacent first bus lines 201 overlap each other in a plan view. Preferably, an overlapping width $W_{y2}$ between the present regions of two adjacent first bus lines 201 in the direction perpendicular to the first direction D1 is 0.25 or less times the maximum length Py of one display unit 205 in the direction perpendicular to the first direction D1. More preferably, the distance $W_{y2}$ is 0.1 or less times the length Py.

With reference to one display electrode 204, the distance $W_{y2}$ is preferably 0.3 or less times, more preferably 0.12 or less times, the maximum length Pwy of the display electrode 204 in the direction perpendicular to the first direction D1.

FIG. 31B is a schematic plan view showing arrangement of the second bus lines of Embodiment 3. FIG. 31B includes a hatched portion showing a present region of one second bus line 202 indicated by a bold line, and shows present regions of two adjacent second bus lines 202. In FIG. 31B, the present regions of two adjacent second bus lines 202 overlap each other in a plan view. Preferably, an overlapping width $W_{x2}$ between the present regions of two adjacent second bus lines 202 in the direction perpendicular to the second direction D2 is 0.25 or less times the maximum length Px of one display unit 205 in the direction perpendicular to the second direction D2. More preferably, the distance $W_{x2}$ is 0.1 or less times the length Px.

With reference to one display electrode 204, the distance $W_{x2}$ is preferably 0.3 or less times, more preferably 0.12 or less times, the maximum length Pwx of the display electrode 204 in the direction perpendicular to the second direction D2.

The structure shown in FIG. 31A and the structure shown in FIG. 31B may be combined. Preferably, the present regions of two adjacent first bus lines 201 overlap each other in a plan view, the present regions of two adjacent second bus line 202 overlap each other in a plan view, the distance $W_{y2}$ is 0.25 or less times the length Pwy, and the distance $W_{x2}$ is 0.25 or less times the length Pwx. More preferably, the distance $W_{y2}$ is 0.1 or less times the length Pwy, and the distance $W_{x2}$ is 0.1 or less times the length Pwx.

Embodiment 4

Figure 32A:
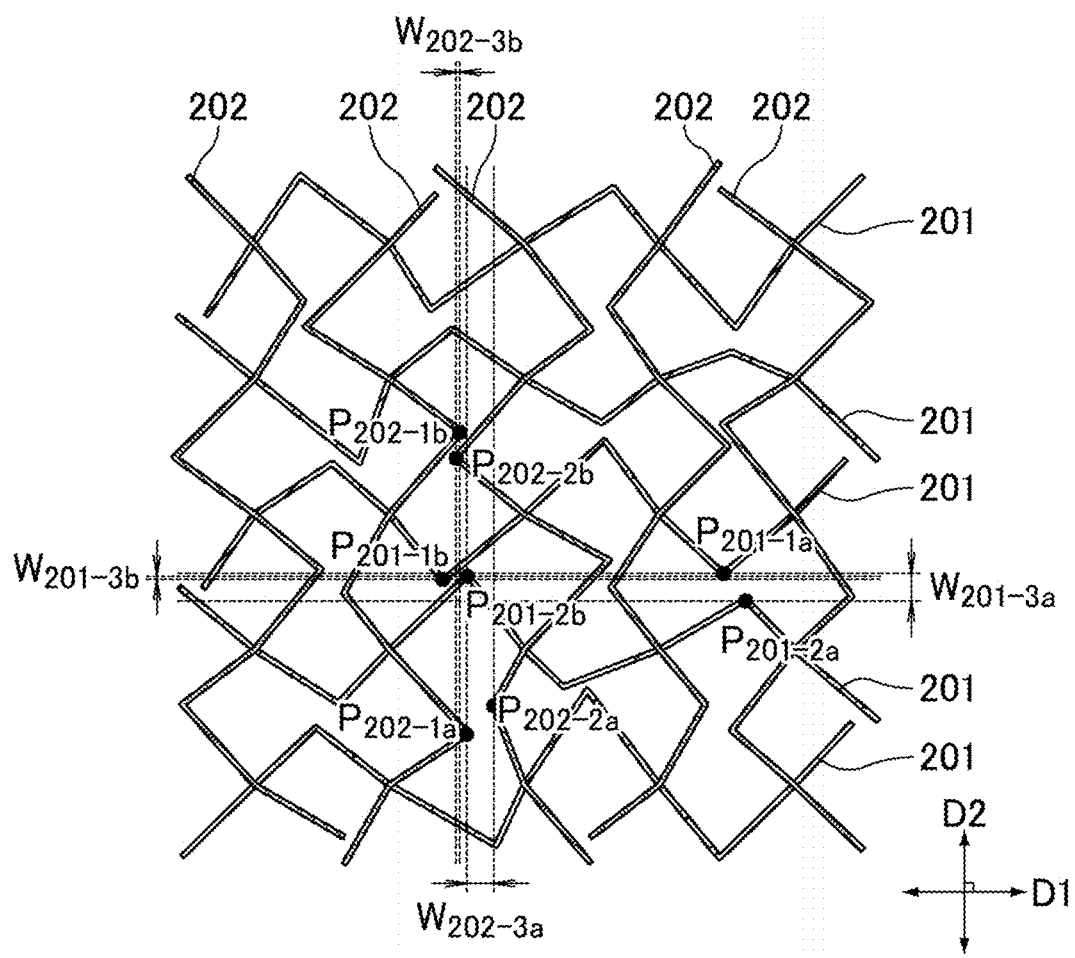
FIG. 32A is a schematic plan view of first and second bus lines of a liquid crystal display panel of Embodiment 4.
Figure 32B:
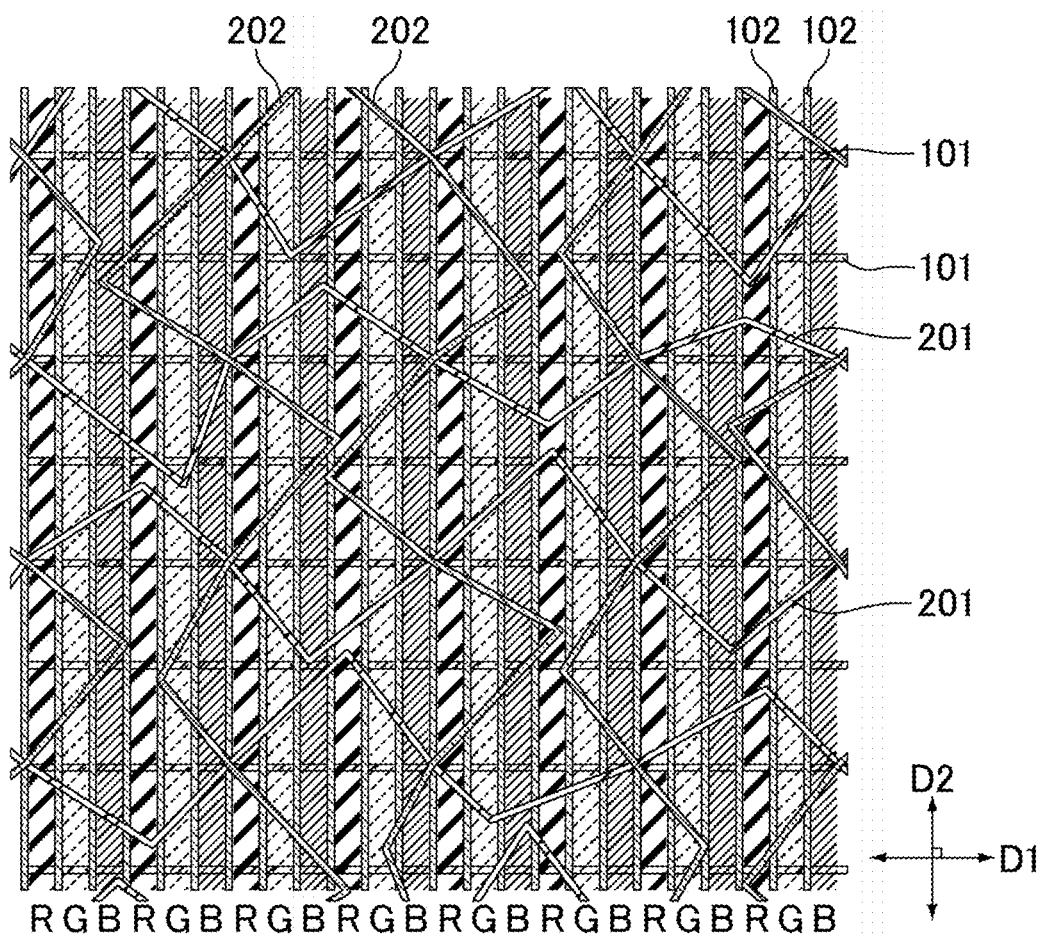
FIG. 32B is a schematic plan view obtained by superimposing the color display element shown in FIG. 2 with the first and second bus lines shown in FIG. 32A.
Figure 33A:
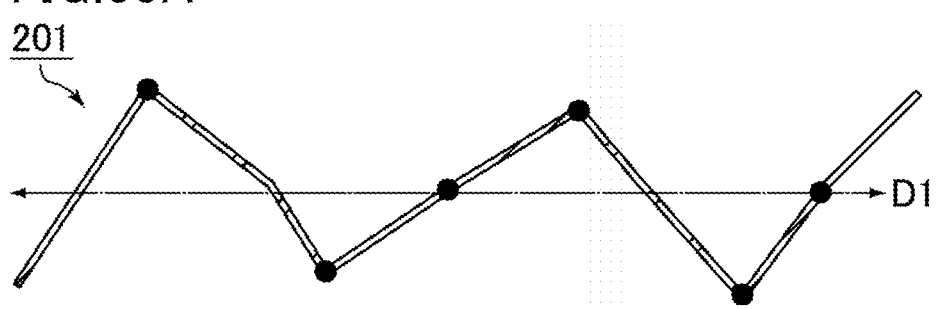
FIG. 33A is a schematic plan view of one first bus line shown in FIG. 32A.

In Embodiment 4, first and second bus lines have different shapes from those of Embodiment 1 and each have irregular bending width, bending period, and bending angle. FIG. 32A is a schematic plan view of first and second bus lines of a liquid crystal display panel of Embodiment 4. FIG. 32B is a schematic plan view obtained by superimposing the color display element shown in FIG. 2 with the first and second bus lines shown in FIG. 32A. FIG. 33A is a schematic plan view of one first bus line shown in FIG. 32A. FIG. 33B is a schematic plan view of one second bus line shown in FIG. 32A.

As shown in FIG. 32A, in Embodiment 4, the first and second bus lines each have irregular bending width, bending period, and bending angle. Even with the first and second bus lines not periodically bending, the structure as shown in FIG. 32B in which the first bus lines 201 and the second bus lines 202 are superimposed with sub-pixels of all colors of the color display element can average the influences caused by the overlapping between sub-pixels of the respective colors and the first bus lines 201 and caused by the overlapping between sub-pixels of the respective colors and the second bus lines 202 between the respective colors, leading to less occurrence of moreé.

In Embodiment 4, each of the first bus lines 201 extends in the first direction D1 and is formed by combination of linear portions with different lengths as shown in FIG. 33A. Each of the first bus lines includes multiple bending points. Similarly, each of the second bus lines 202 extends in the second direction D2 and is formed by combination of linear portions with different lengths as shown in FIG. 33B. Each of the second bus lines includes multiple bending points. In FIG. 33A and FIG. 33B, bending points are indicated by black dots. Each bending point means an intersection of line segments with different extending directions.

As shown in FIG. 32A, the distance between closest bending points P201-1a and P201-2a of two adjacent first bus lines 201 in the direction perpendicular to the first direction D1 is defined as W201-3a, and the distance between closest bending points P201-1b and P201-2b in the direction perpendicular to the first direction D1 is defined as $W_{201-3b}$. The distances $W_{201-3a}$ and $W_{201-3b}$ are each preferably 0.25 or less times the maximum length Py of one display unit 205 in the direction perpendicular to the first direction D1 (the reference signs 205 and Py are shown in FIG. 34A, FIG. 34B, FIG. 35, and FIG. 36). The distances $W_{201-3a}$ and $W_{201-3b}$ are each more preferably 0.1 or less times the maximum length Py.

With reference to one display electrode 204, the distances $W_{201-3a}$ and $W_{201-3b}$ are each preferably 0.3 or less times, more preferably 0.12 or less times, the maximum length Pwy of the display electrode 204 in the direction perpendicular to the first direction D1.

The distance between closest bending points P202-1a and P202-2a of two adjacent second bus lines 202 in the direction perpendicular to the second direction D2 is defined as $W2_{02-3a}$, and the distance between closest bending points P202-1b and P202-2b in the direction perpendicular to the second direction D2 is defined as $W_{202-3b}$. The distances $W2_{202-3a}$ and $W_{202-3b}$ are each preferably 0.25 or less times the maximum length Px of one display unit 205 in the direction perpendicular to the second direction D2 (the reference signs 205 and Px are shown in FIG. 34A, FIG. 34B, FIG. 35, and FIG. 36). The distances $W_{202-3a}$ and $W_{202-3b}$ are each more preferably 0.1 or less times the maximum length Px.

With reference to one display electrode 204, the distances $W_{202-3a}$ and $W_{202-3b}$ are each preferably 0.3 or less times, more preferably 0.12 or less times, the maximum length Pwx of the display electrode 204 in the direction perpendicular to the second direction D2.

Preferably, each of the distances (the distances $W_{201-3a}$ and $W_{201-3b}$) between the closest bending points between adjacent first bus lines 201 in the direction perpendicular to the first direction D1 is 0.25 or less times the maximum length Py of one display unit 205 in the direction perpendicular to the first direction D1, and each of the distances (the distances $W_{202-3a}$ and $W_{202-3b}$) between the closest bending points between adjacent second bus lines 202 in the direction perpendicular to the second direction D2 is 0.25 or less times the maximum length Px of one display unit 205 in the direction perpendicular to the second direction D2. More preferably, the distances $W_{201-3a}$ and $W_{201-3b}$ are each 0.1 or less times the maximum length Py, and the distances $W_{202-3a}$ and $W_{202-3b}$ are each 0.1 or less times the maximum length Px.

With reference to one display electrode 204, preferably, the distances $W_{201-3a}$ and $W_{201-3b}$ are each 0.3 or less times the length Pwy, and the distances $W_{202-3a}$ and $W_{202-3b}$ are each 0.12 or less times the length Pwx.

Figure 34A:
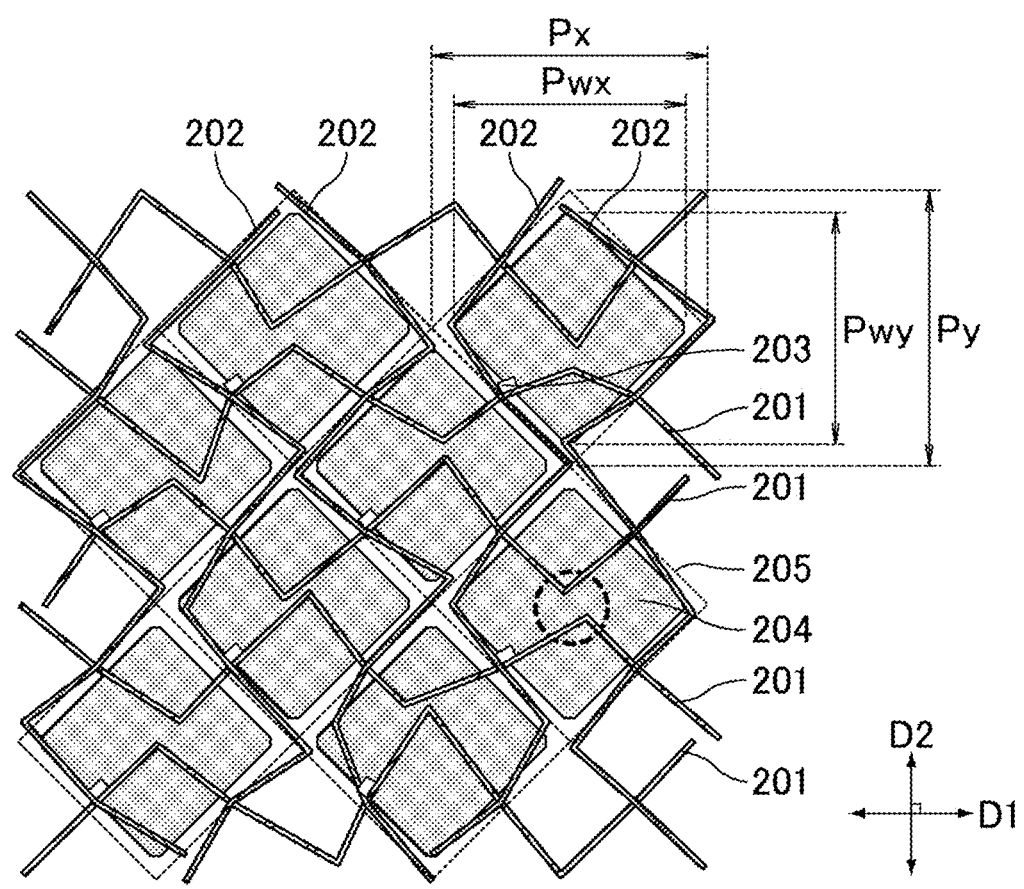
FIG. 34A is a schematic plan view obtained by superimposing the rhombic display electrodes shown in FIG. 13A with the first and second bus lines of Embodiment 4.
Figure 34B:
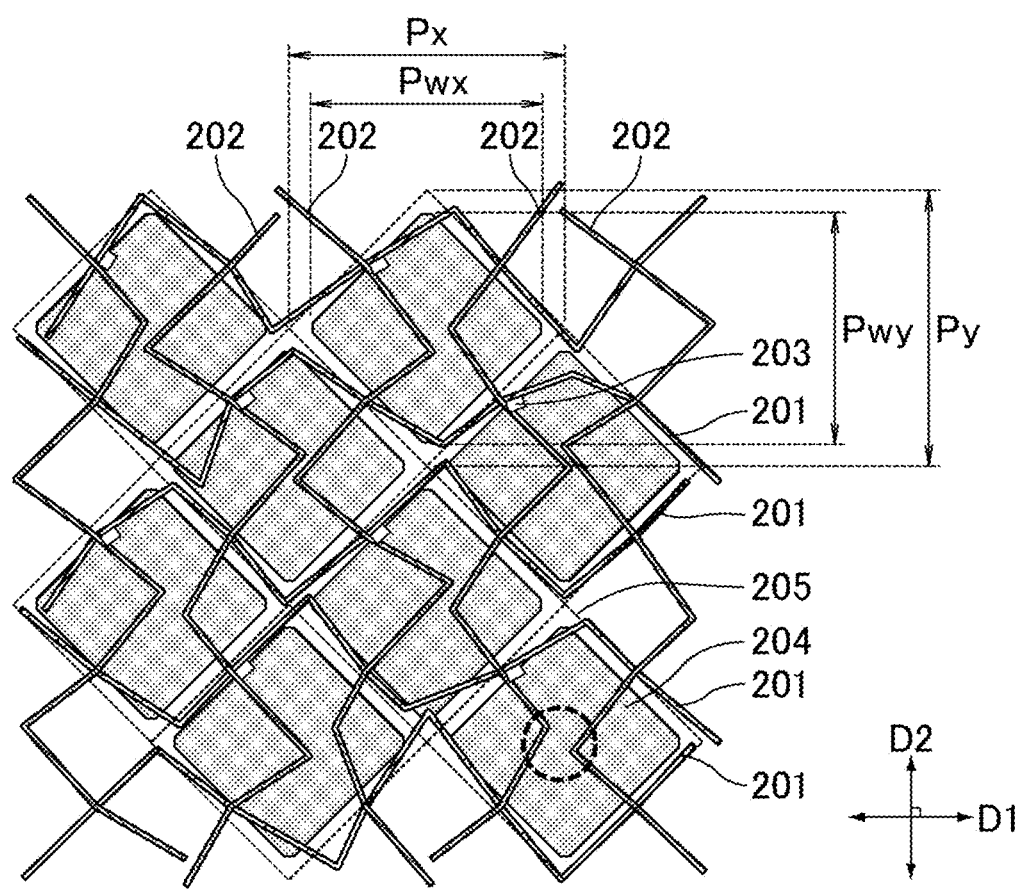
FIG. 34B shows a different example with different arrangement of the display electrodes shown in FIG. 34A.
Figure 35:
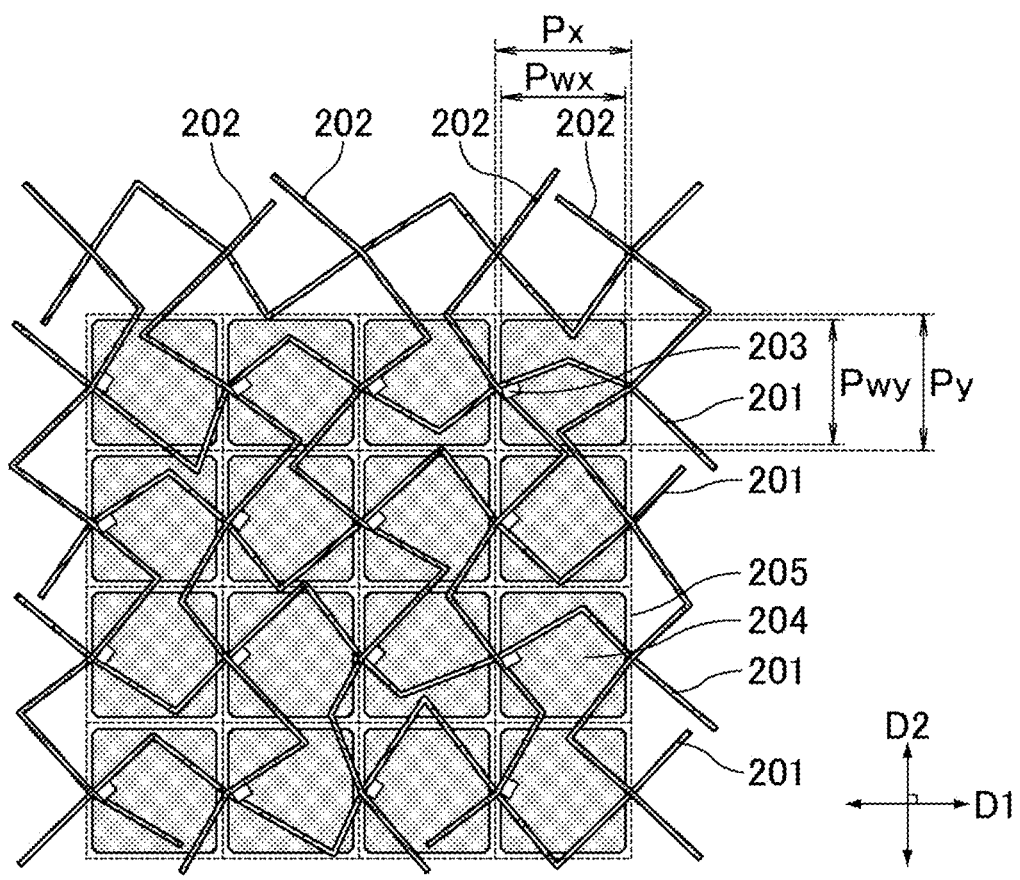
FIG. 35 is a schematic plan view obtained by superimposing the square display electrodes shown in FIG. 14A with the first and second bus lines of Embodiment 4.
Figure 36:
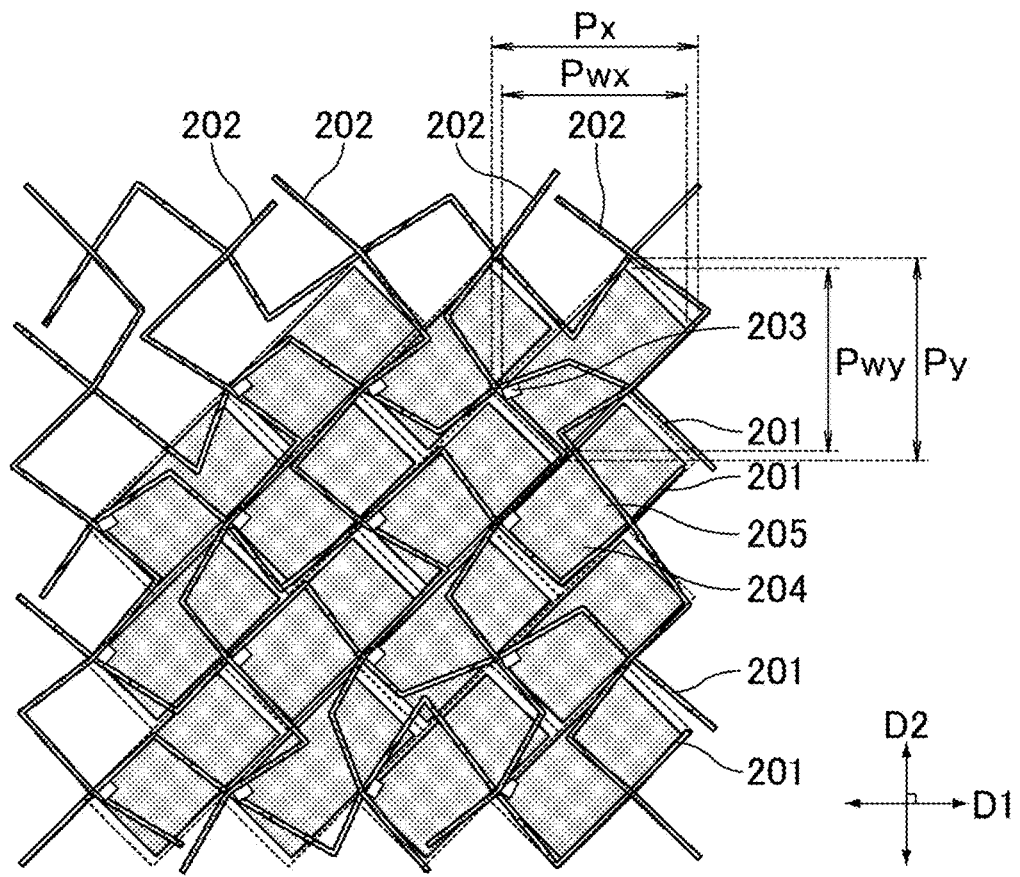
FIG. 36 is a schematic plan view obtained by superimposing the rectangular display electrodes shown in FIG. 15A with the first and second bus lines of Embodiment 4.

FIG. 34A is a schematic plan view obtained by superimposing the rhombic display electrodes shown in FIG. 13A with the first and second bus lines of Embodiment 4. FIG. 34B shows a different example with different arrangement of the display electrodes shown in FIG. 34A. FIG. 35 is a schematic plan view obtained by superimposing the square display electrodes shown in FIG. 14A with the first and second bus lines of Embodiment 4. FIG. 36 is a schematic plan view obtained by superimposing the rectangular display electrodes shown in FIG. 15A with the first and second bus lines of Embodiment 4. A portion surrounded by a dotted line in FIG. 34A and a portion surrounded by a dotted line in FIG. 34B respectively indicate a portion with the shortest distance between two adjacent first bus lines 201 and a portion with the shortest distance between two adjacent second bus lines 202. As shown in FIG. 34A to FIG. 36, the first and second bus lines of Embodiment 4 may also be combined with the rhombic, square, or rectangular display electrodes described in Embodiment 1. In order to eliminate the influence on display by signal lines through parasitic capacitance, preferably, the transparent conductive layer 214 shown in FIG. 5 is disposed and thereby shields between the first bus lines 201 and the display electrodes 204 and between the second bus lines 202 and the display electrodes 204.

Embodiment 5

A display device of Embodiment 5 includes: a color display element including pixels that are arranged in a row direction and in a column direction and each include sub-pixels of different colors; and a liquid crystal display panel stacked with the color display element, the liquid crystal display panel including a TFT substrate, a counter substrate, and a liquid crystal layer between the TFT substrate and the counter substrate, the TFT substrate including first bus lines extending in a first direction, second bus lines extending in a second direction intersecting the first direction, and display electrodes each at a position corresponding to an intersection of one of the first bus lines and one of the second bus lines, at least one of the first bus lines and at least one of the second bus lines each overlapping the sub-pixels of all colors of the color display element in a plan view. In the display device, the later-described same-color effective transmissive areas of sub-pixels of each color satisfy certain relations.

The components similar to those of Embodiment 1 are not described. The display device of Embodiment 5 can be appropriately combined with any of Embodiments 1 to 4.

In the sub-pixels of different colors of the color display element, same-color effective transmissive areas of each color satisfy the following formula (1) and the following formula (2):

$$(S_{Max}-S_{Ave})/S_{Ave} \leq 0.25 \quad (1)$$

$$(S_{Ave}-S_{Min})/S_{Ave} \leq 0.25 \quad (2)$$

wherein $S_{Max}$ represents a maximum value of same-color effective transmissive areas of respective measurement points, $S_{Min}$ represents a minimum value of the same-color effective transmissive areas of the respective measurement points, and $S_{Ave}$ represents an average value of the same-color effective transmissive areas of the respective measurement points, wherein the same-color effective transmissive areas each mean a sum of all sub-pixel effective transmissive areas of a same color in $N^2$ pixels in a region consisting of N rows and N columns in the color display element, where N is an integer of 2 or greater, the sub-pixel effective transmissive areas each mean an area obtainable by subtracting an area of a portion overlapping any of the first bus lines and any of the second bus lines of the liquid crystal display panel from an area of an aperture region of one of the sub-pixels in a plan view, and the same-color effective transmissive areas are determined for respective measurement points while the liquid crystal display panel is moved in the row direction and in the column direction with the color display element being fixed, wherein the measurement points are arranged in a grid pattern on the $N^2$ pixels with a certain width in the row direction and a certain width in the column direction.

The structure in which the overlapping amount between the first and second bus lines of the liquid crystal display panel and the sub-pixels of different colors of the color display element falling within a certain range can reduce or prevent moreé.

Preferably, the same-color effective transmissive areas of each color satisfy the following formula (3) and the following formula (4):

$$(S_{Max}-S_{Ave})/S_{Ave} \leq 0.1 \quad (3)$$

$$(S_{Ave}-S_{Min})/S_{Ave} \leq 0.1 \quad (4).$$

Figure 37:
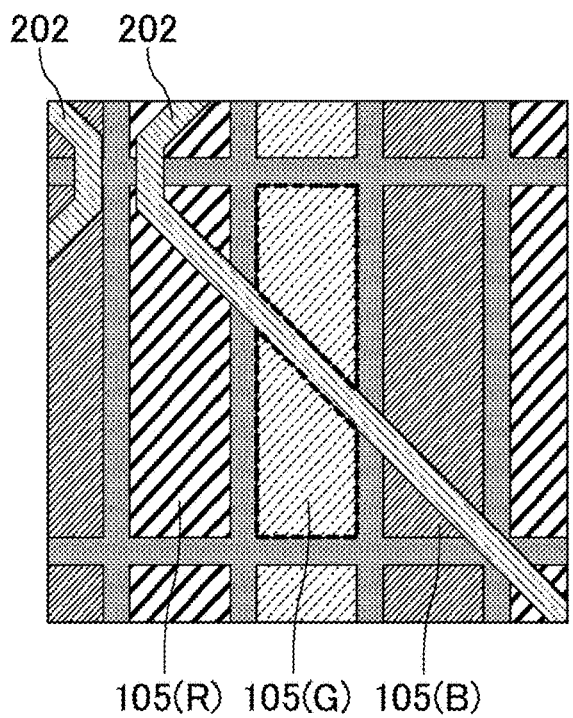
FIG. 37 is a schematic plan view showing a sub-pixel effective transmissive area in Embodiment 5.
Figure 38:
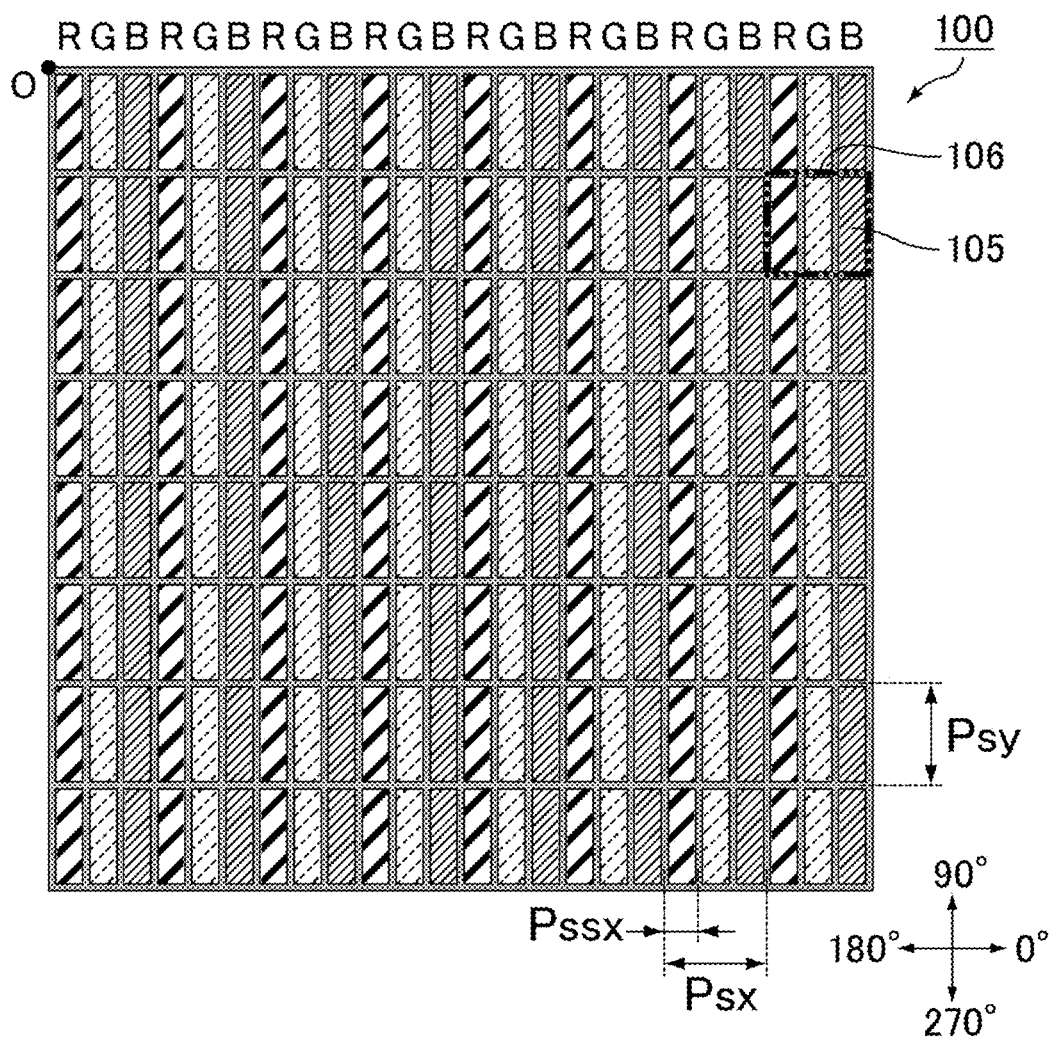
FIG. 38 is a schematic plan view of a color display element showing a method for calculating a same-color effective transmissive area.
Figure 39:
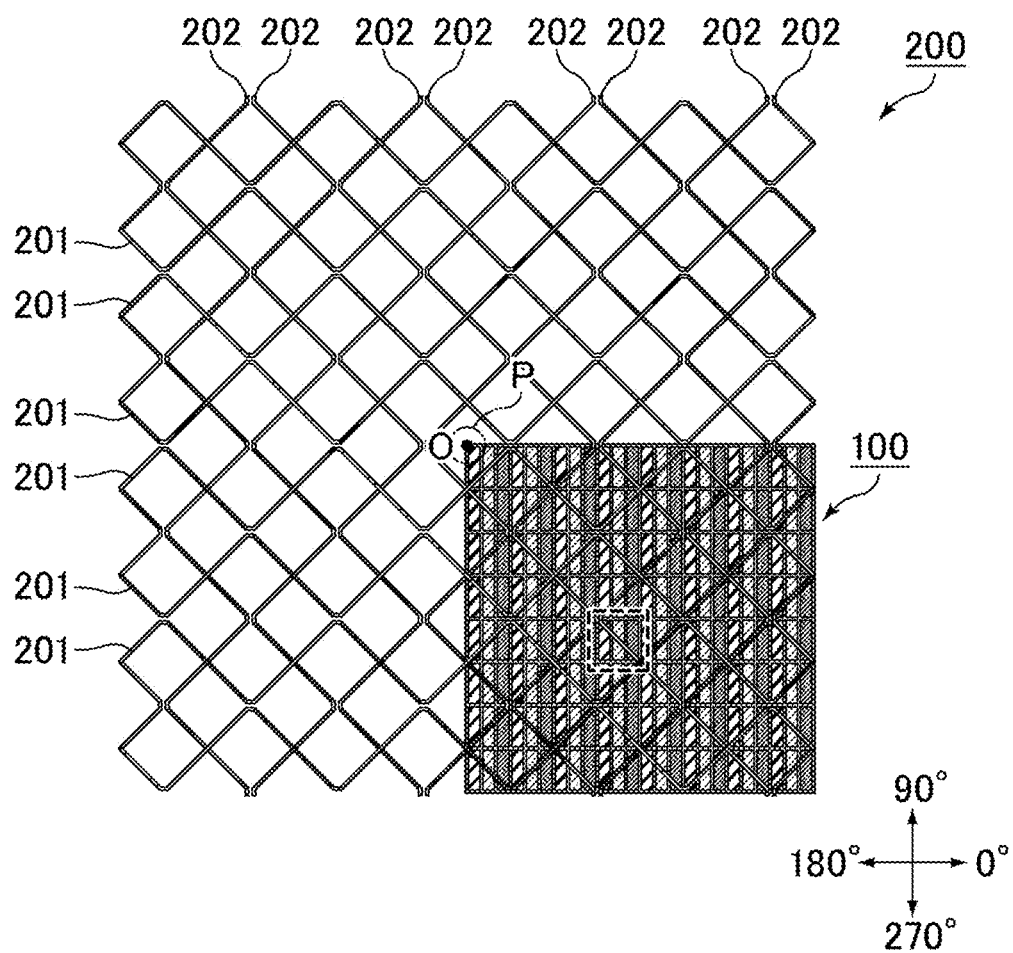
FIG. 39 is a schematic plan view obtained by superimposing the color display element shown in FIG. 38 with a liquid crystal display panel.

Hereinafter, a method for calculating a same-color effective transmissive area is described with reference to FIG. 37 to FIG. 39. FIG. 37 is a schematic plan view showing a sub-pixel effective transmissive area in Embodiment 5. FIG. 38 is a schematic plan view of a color display element showing a method for calculating a same-color effective transmissive area. FIG. 39 is a schematic plan view obtained by superimposing the color display element shown in FIG. 38 with a liquid crystal display panel. FIG. 37 is an enlarged schematic plan view of a region surrounded by the dotted line in FIG. 39. FIG. 38 shows the same structure as in FIG. 2, but the gate lines 101, source lines 102, TFTs 103, and pixel electrodes 104 are not shown.

As shown in FIG. 37, the case where the sub-pixels of different colors include a red sub-pixel 105(R), a green sub-pixel 105(G), and a blue sub-pixel 105(B) is described. Each of the red sub-pixel 105(R), the green sub-pixel 105(G), and the blue sub-pixel 105(B) has an aperture region surrounded by the gate lines 101 and the source lines 102 shown in FIG. 2, for example. With the green sub-pixel 105(G) shown in FIG. 37 taken as an example, the green sub-pixel 105(G) overlaps a second bus line 202. The regions surrounded by the dotted lines correspond to an area obtained by subtracting the area overlapping the second bus line 202 from the area of the aperture region of the green sub-pixel 105(G), and also correspond to the "sub-pixel effective transmissive area" of the green sub-pixel.

Hereinafter, a specific calculation method is described with reference to FIG. 38 and FIG. 39. As shown in FIG. 38, one pixel 106 includes a red sub-pixel R, a green sub-pixel G, and a blue sub-pixel B. FIG. 38 shows a region including 64 pixels consisting of 8 pixels in each row and 8 pixels in each column. In FIG. 38, a row direction corresponds to the 0°-180° direction, and a column direction corresponds to the 90°-270° direction. In the 64 pixels, the sum of sub-pixel effective transmissive areas of the red sub-pixels R is defined as a red same-color effective transmissive area, the sum of sub-pixel effective transmissive areas of the green sub-pixels G is defined as a green same-color effective transmissive area, and the sum of sub-pixel effective transmissive areas of the blue sub-pixels B is defined as a blue same-color effective transmissive area.

The following describes a method for setting on the 64 pixels measurement points arranged in a grid pattern with a certain width in the row direction and a certain width in the column direction. As shown in FIG. 38, the length of one pixel 106 in the row direction is defined as a length Psx, and the length of one pixel 106 in the column direction is defined as a length Psy. The length obtained by dividing the length Psx by three, which is the number of sub-pixels included in one pixel, is defined as a length Pssx. On the color display element 100, a distance being eight times the length Psx in the 0°-180° direction is divided by lines with a width being 0.25 times the length Pssx, whereby 97 parallel straight lines are set in the column direction. Also, a distance being eight times the length Psy in the 90°-270° direction is divided by lines with a width being 0.25 times the length Psy, whereby 33 parallel straight lines are set in the row direction. Then, the intersections of the 97 straight lines parallel in the column direction and the 33 straight lines parallel in the row direction are provided as measurement points, whereby 3201 measurement points arranged in a grid pattern are set.

As shown in FIG. 39, a randomly selected point on the liquid crystal display panel 200 is defined as a point P, and the origin O on the color display element 100 is placed on the point P in a plan view. With the color display element 100 being fixed, the liquid crystal display panel 200 is moved in the 0°-180° direction and in the 90°-270° direction such that the grid-pattern 3201 measurement points are placed on the randomly selected point P on the liquid crystal display panel 200. The number of times for moving is: 96 times in the 0°-180° direction (=3/0.25×8); and 32 times in the 90°-270° direction (=1/0.25×8), i.e., 3200 times (=(96+1)×(32+1)−1) in total. In each of the 3201 measurement points, the red same-color effective transmissive area, the green same-color effective transmissive area, and the blue same-color effective transmissive area are determined. The population for calculating the maximum value of same-color effective transmissive areas, the minimum value of same-color effective transmissive areas, and the average value of same-color effective transmissive areas is data including all data pieces of the same-color effective transmissive areas determined at the respective measurement points, and the number of data pieces is equal to the number of the measurement points.

According to the formulas (1) and (2), the value $S_{Max}$ corresponds to the maximum value of the 3201 same-color effective transmissive areas; the value $S_{Min}$ corresponds to the minimum value of the 3201 same-color effective transmissive areas; and the value $S_{Ave}$ corresponds to the average value of the 3201 same-color effective transmissive areas. In Embodiment 5, the red sub-pixels, the green sub-pixels, and the blue sub-pixels each satisfy the formulas (1) and (2).

FIG. 39 describes the case where the liquid crystal display panel 200 includes the first bus lines 201 and the second bus lines 202. Also in the case where the liquid crystal display panel 200 further includes redundant lines and auxiliary capacitance lines as shown in FIG. 17 to FIG. 19, the formulas (1) and (2) are still more preferred to be satisfied. When the liquid crystal display panel 200 includes redundant lines, the sub-pixel effective transmissive area is the area obtained by subtracting the areas overlapping first bus line(s), second bus line(s), and redundant line(s) from the area of the aperture region of a sub-pixel in a plan view. When the liquid crystal display panel 200 includes auxiliary capacitance lines, the sub-pixel effective transmissive area is the area obtained by subtracting the areas overlapping first bus line(s), second bus line(s), and auxiliary capacitance line(s) from the area of the aperture region of a sub-pixel in a plan view.

Figure 54:
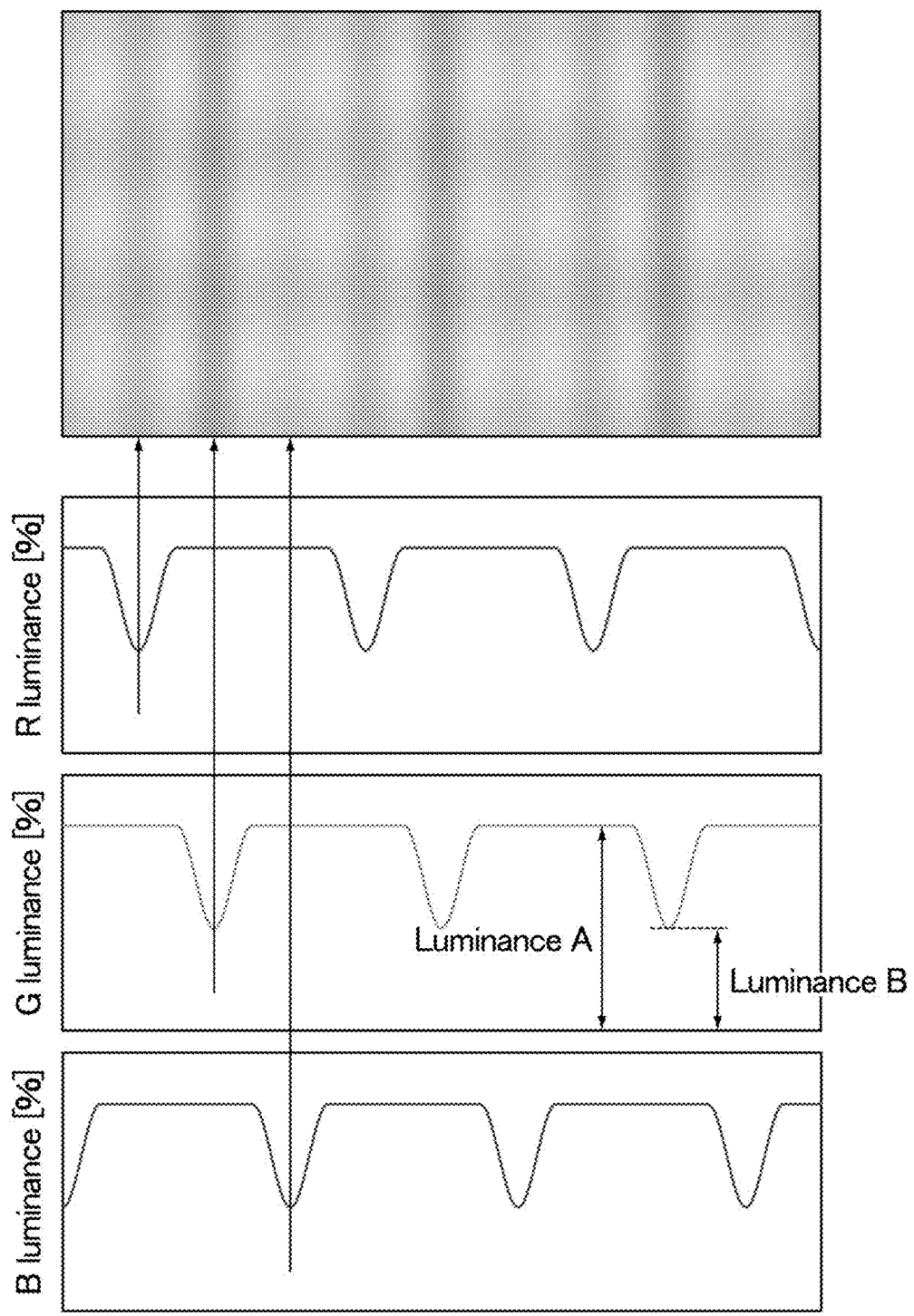
FIG. 54 is an explanatory diagram showing a color display reproducing moreé and the luminances of sub-pixels of respective colors.

The following describes the reason why the formula $(S_{Max}-S_{Ave})/S_{Ave}$ satisfies preferably 0.25 or less (the formula (1)), more preferably 0.1 or less (the formula (3)), and the formula $(S_{Ave}-S_{Min})/S_{Ave}$ satisfies preferably 0.25 or less (the formula (2)), more preferably 0.1 or less (the formula (4)), with reference to FIG. 54. FIG. 54 is an explanatory diagram showing a color display reproducing moreé and the luminances of sub-pixels of respective colors.

Using a typical liquid crystal display device for color display, occurrence of moreé was artificially reproduced in order to study at what level the perceived moreé is allowable and at what level no moreé is perceived. When the first and second bus lines overlap the red sub-pixels R, green sub-pixels G, and blue sub-pixels B depending on the viewing angle, the luminance is reduced in response to the overlapped area. Under an assumption of such luminance change, what degree of luminance change of each color from a base luminance (luminance A) is needed to cause perception of moreé (perception limit), and to what extent thereof the perceived moreé is allowable (allowable range) were examined. The cases with a luminance change within the allowable range can be considered as succeeding in reducing or preventing moreé. The cases with a luminance change not higher than the perception limit can be considered as succeeding in preventing perception of moreé.

Specifically, a striped pattern consisting of cyan, magenta, and yellow was displayed as shown in FIG. 54.

The cyan color was provided by setting the luminance of green sub-pixels (G luminance) and the luminance of blue sub-pixels (B luminance) at the base luminance (luminance A) and setting the luminance of red sub-pixels (R luminance) at a dark-portion luminance (luminance B). The magenta color was provided by setting the R luminance and the luminance of B luminance at the base luminance and setting the G luminance at a dark-portion luminance. The yellow color was provided by setting the R luminance and the luminance of G luminance at the base luminance and setting the B luminance at a dark-portion luminance. The R luminance, G luminance, and B luminance were varied to determine the luminance variabilities at each of which the luminance change falls within the allowable range and the luminance variabilities at each of which the luminance change is at the perception limit. Each luminance variability can be calculated by (luminance A−luminance B)/luminance A. Table 4 shows the results.

TABLE 4

| Base luminance | Luminance variability [(Luminance A − Luminance B)/Luminance A] | |
| --- | --- | --- |
| (Luminance A) | Perception limit | Allowable range |
| 100% | 10 | 25 |
| 75% | 10 | 27 |
| 50% | 12 | 30 |
| 25% | 15 | 35 |

The results in Table 4 demonstrate that the luminance variabilities at the allowable range were 25% to 35% and the luminance variabilities at the perception limit were 10% to 15% although the values changed depending on the brightness of the base luminance. Based on these results, the preferred upper limits of $(S_{Max}-S_{Ave})/S_{Ave}$ and $(S_{Ave}-S_{Min})/S_{Ave}$ were each set to 0.25, and more preferred upper limits thereof were each set to 0.1.

Embodiment 6

Figure 40:
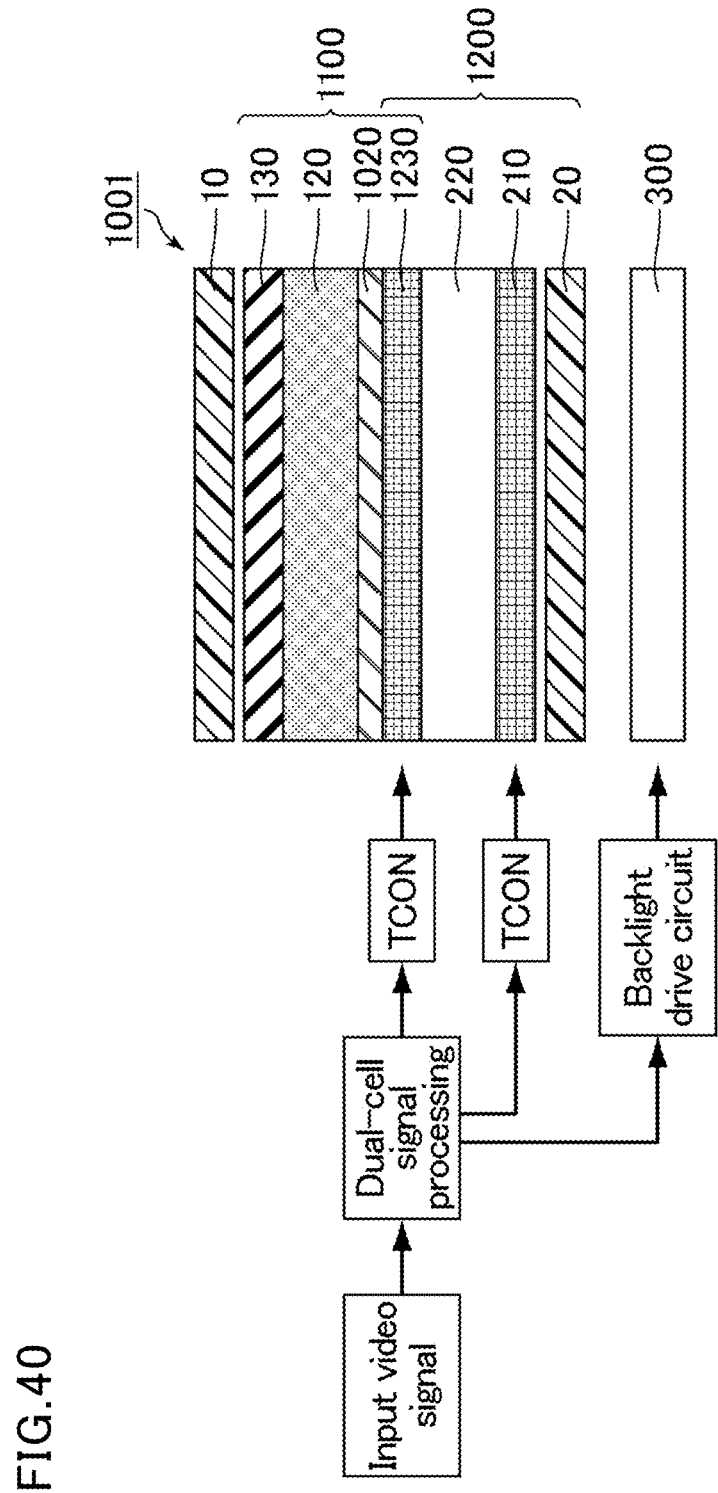
FIG. 40 is a schematic cross-sectional view of a display device of Embodiment 6.

FIG. 40 is a schematic cross-sectional view of a display device of Embodiment 6. As shown in FIG. 40, in a display device 1001 of Embodiment 6, with the liquid crystal layer of the liquid crystal display panel described in Embodiment 1 defined as a first liquid crystal layer, the color display element corresponds to a liquid crystal element that includes a second liquid crystal layer and a color filter substrate provided with color filters, the second liquid crystal layer is sandwiched between the color filter substrate and the counter substrate of the liquid crystal display panel, the color display element sequentially includes a first polarizing plate, the color filter substrate, the second liquid crystal layer, a polarizing layer, the counter substrate, a first liquid crystal layer, the TFT substrate, and a second polarizing plate, and the counter substrate includes, on the surface closer to the polarizing layer, switching elements for controlling voltage applied to the second liquid crystal layer.

Figure 45:
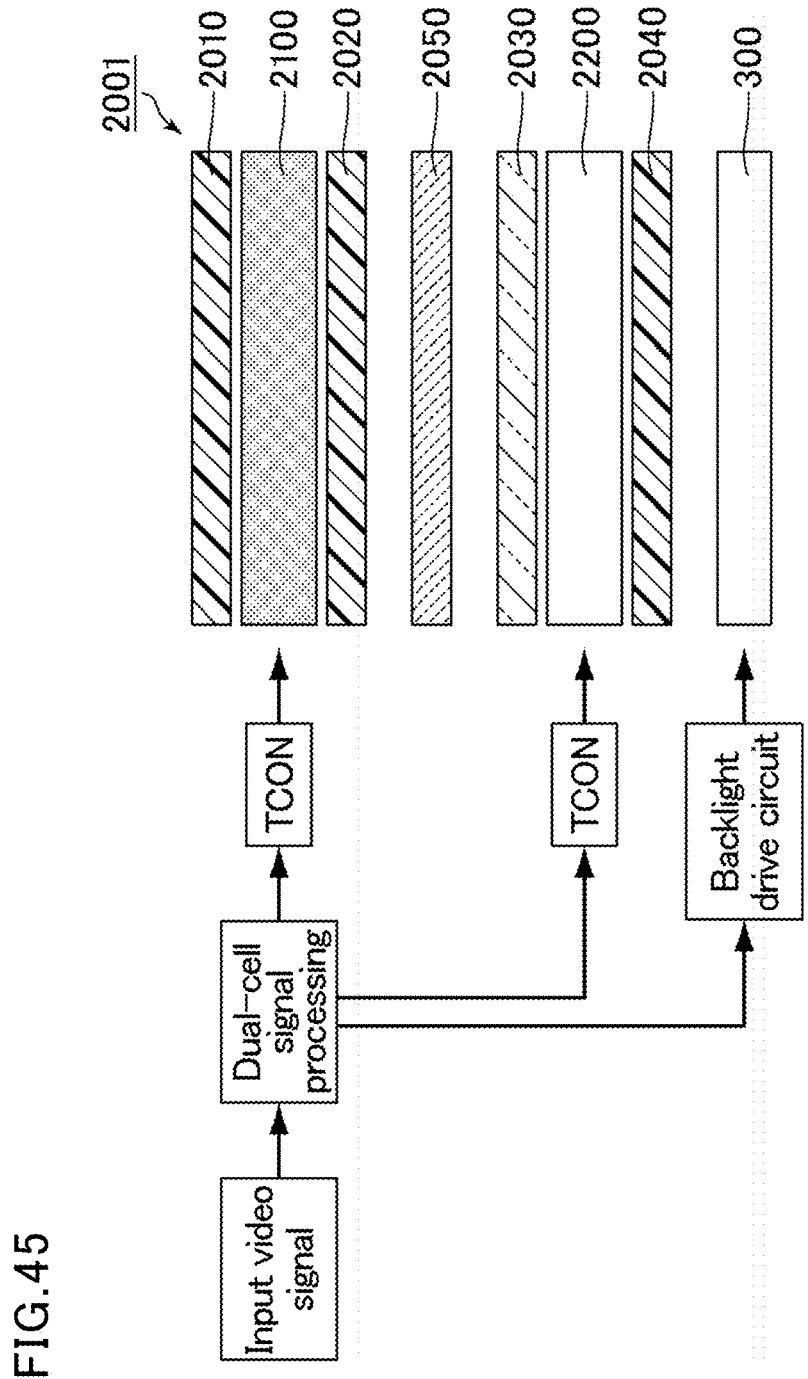
FIG. 45 is a schematic cross-sectional view of an example of a conventional dual-cell display.
Figure 46:
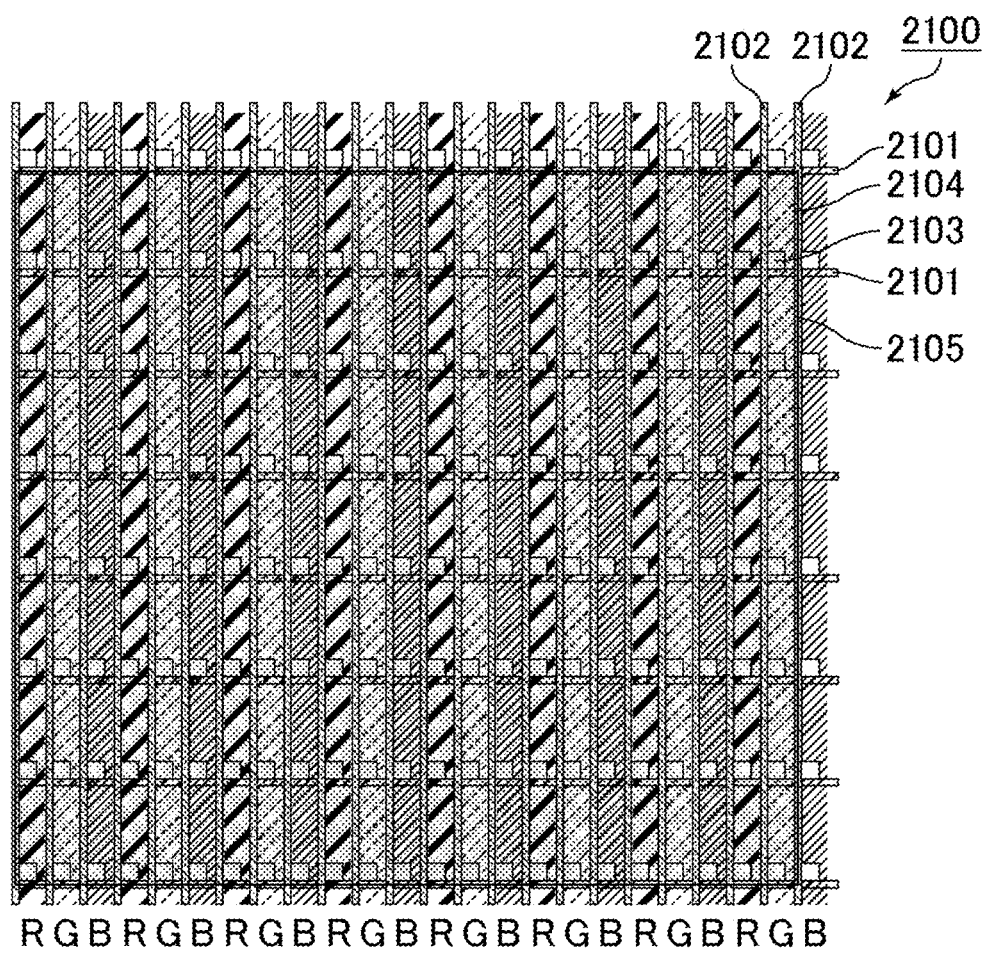
FIG. 46 is a schematic plan view of an example of a front panel used for a conventional dual-cell display.
Figure 47:
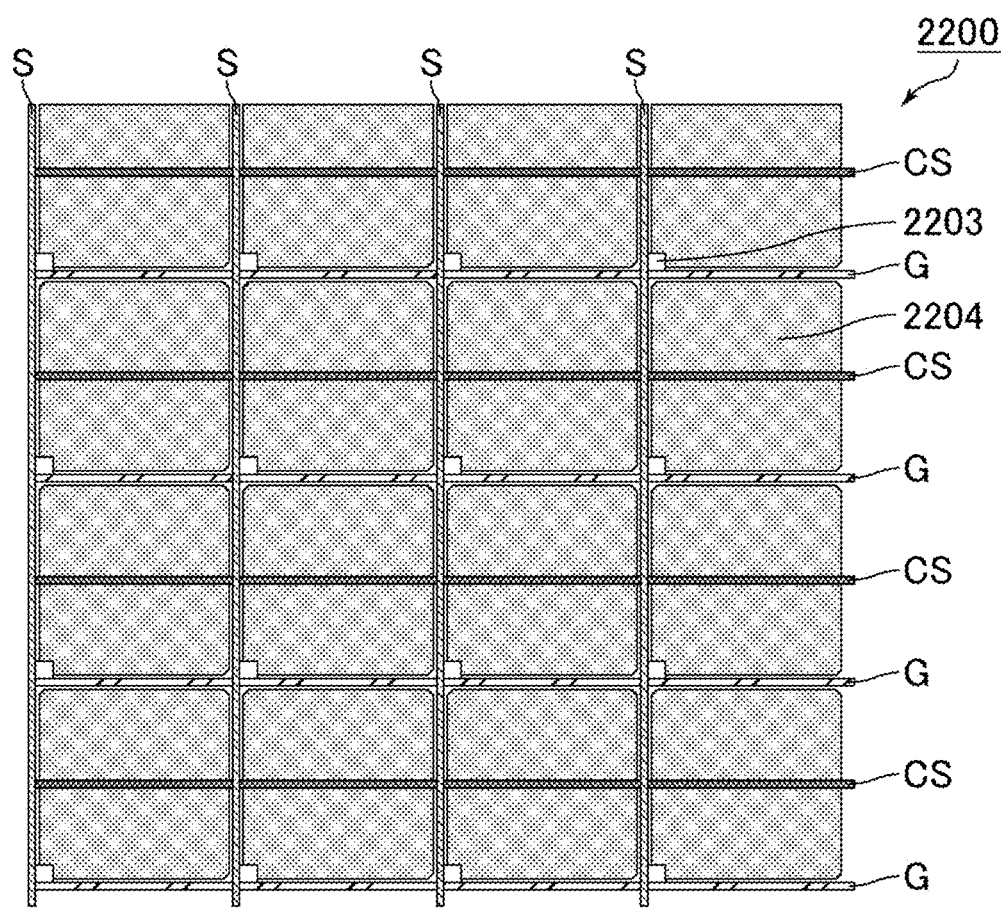
FIG. 47 is a schematic plan view of an example of a rear panel used for a conventional dual-cell display.
Figure 48:
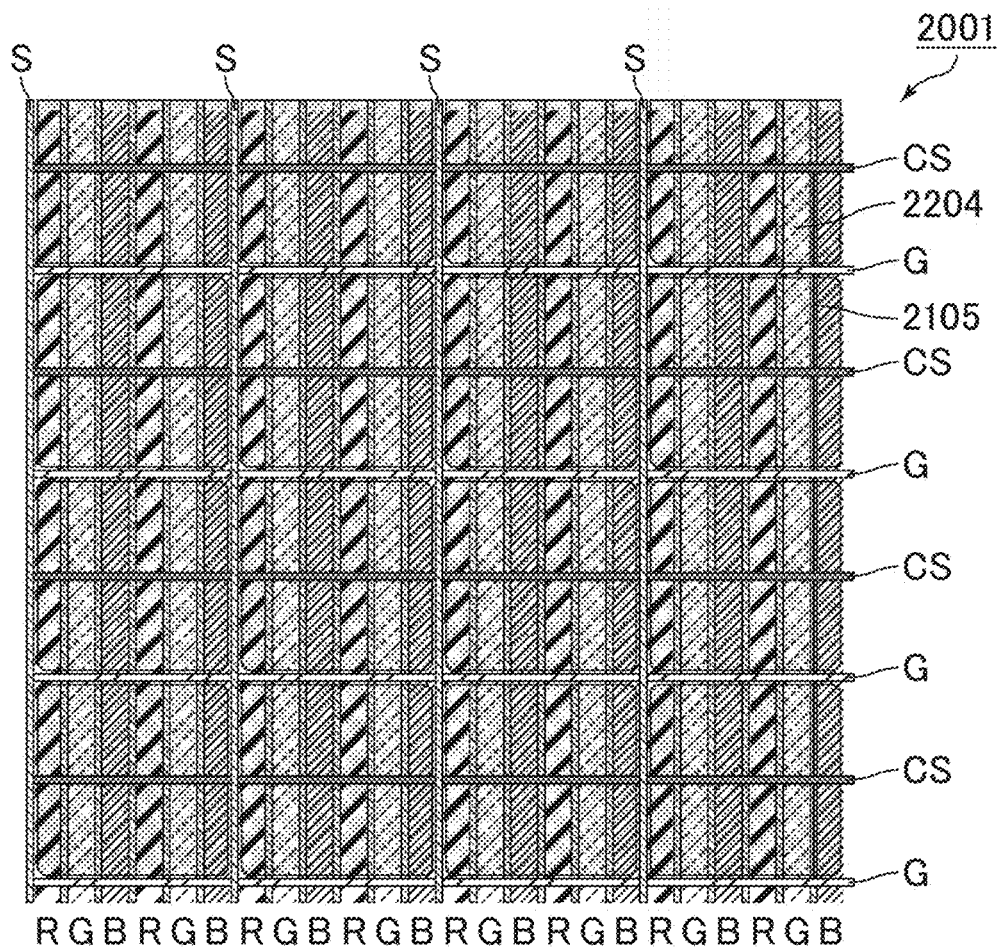
FIG. 48 is a schematic plan view of a conventional dual-cell display obtained by superimposing FIG. 46 with FIG. 47.

As shown in FIG. 45, in order to reduce perception of moreé, a conventional dual-cell display includes a diffusing layer such as a diffusing OCA 2050 between the front panel 2100 and the rear panel 2200. The diffusing layer is to have a thickness of about 100 μm in order to exert a sufficient diffusing property and thus cannot be easily incorporated in the inner structure of the front panel 2100 or the rear panel 2200. Accordingly, the front panel 2100 and the rear panel 2200, each being sandwiched by paired substrates such as glass substrates, are separately produced and then attached together. That is, four glass substrates are used. Meanwhile, the structures shown in Embodiments 1 to 4 can achieve less occurrence of moreé and thus can eliminate a diffusing layer. Therefore, the color display element and the liquid crystal display panel can be disposed without a distance for exerting a diffusing property. Accordingly, a dual-cell display can be produced through a series of steps and thus enables the number of glass substrates to be reduced from four to three.

Specifically, the display device of Embodiment 6 can be produced through the following steps.

1. On a surface of a counter substrate 1230 of a liquid crystal display panel 1200 shown in FIG. 40 are formed components for applying voltage to the second liquid crystal layer 120, including gate lines, source lines, TFTs, and pixel electrodes, and the polarizing layer 1020 is formed on the pixel electrodes.

2. Color filters are formed on the color filter substrate 130.

3. On the TFT substrate 210 of the liquid crystal display panel 1200 are formed the components described in Embodiments 1 to 4, including the display electrodes, the first and second bus lines, and TFTs.

4. The surface with the color filters of the color filter substrate 130 and the surface with the components such as the polarizing layer 1020 of the counter substrate 1230 are faced to and then attached to each other. A liquid crystal material was sealed between the substrates, whereby the second liquid crystal layer 120 is formed.

5. The surface remote from the components such as the polarizing layer 1020 of the counter substrate 1230 and the surface with the components such as the display electrodes of the TFT substrate 210 are faced to and then attached to each other. A liquid crystal material was sealed between the substrates, whereby the first liquid crystal layer 220 is formed.

6. The first polarizing plate 10 is attached to the side with the color filter substrate 130, and the second polarizing plate 20 is attached to the side with the TFT substrate 210.

7. On the panel formed in step 6 are mounted necessary components including a circuit substrate and a backlight.

The polarizing layer 1020 can be produced by, for example, application of a photopolymerizable liquid crystal material and then irradiation with ultraviolet light. The photopolymerizable liquid crystal material may be, for example, a liquid crystal material whose liquid crystal molecules each have a photopolymerizable group such as an acrylate or methacrylate group at a terminal of its skeleton. In the present embodiment, the polarizing layer is formed after formation of components including gate lines, source lines, TFTs, and pixel electrodes in order to avoid damage due to temperature change or the like during formation of the components including gate lines, source lines, TFTs, and pixel electrodes. Alternatively, the polarizing layer may be formed first depending on the material.

The polarization axis of the first polarizing plate 10 and the polarization axis of the polarizing layer 1020 may be perpendicular to each other, the polarization axis of the polarizing layer 1020 and the polarization axis of the second polarizing plate may be perpendicular to each other, and the polarization axis of the first polarizing plate 10 and the polarization axis of the second polarizing plate 20 may be parallel to each other.

Embodiment 7

Figure 41:
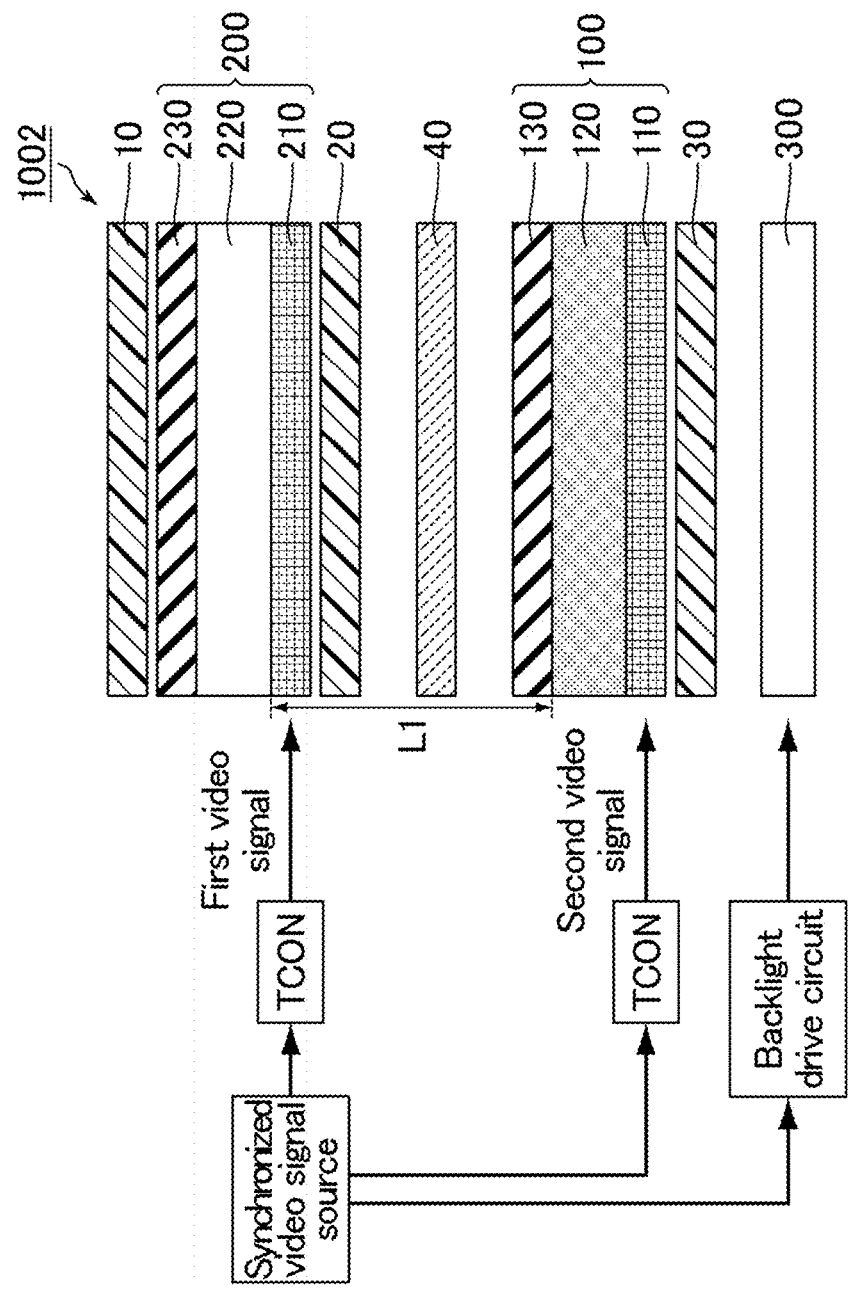
FIG. 41 is a schematic cross-sectional view of a display device of Embodiment 7.

FIG. 41 is a schematic cross-sectional view of a display device of Embodiment 7. As shown in FIG. 41, a display device 1002 of Embodiment 7 includes the liquid crystal display panel 200 as a front panel and the color display element 100 as a rear panel. The display device 1002 sequentially includes the liquid crystal display panel 200, the color display element 100, and the backlight 300.

In Embodiment 1, dual-cell signal processing is executed based on one input video signal to produce different video signals displayed on the color display element 100 and on the liquid crystal display panel 200, whereby display at a high contrast ratio is provided. In Embodiment 7, a video displayed on the color display element 100 and a video displayed on the liquid crystal display panel 200 are respectively provided by inputting a first video signal and a second video signal, which are independent from each other, through different TCONs from a synchronized video signal source, and inputting a lighting signal from a backlight drive circuit to the backlight 300. The color display element 100 and the liquid crystal display panel 200 can display videos independent from each other to achieve various video expressions. Such a device can be suitably used for highly entertaining amusement devices, for example.

The color display element 100 and the liquid crystal display panel 200 used can be similar to those described in Embodiments 1 to 4. Preferably, the liquid crystal display panel 200 includes no color filters, and the backlight 300 is driven based on the field-sequential color system.

The distance L1 between the first liquid crystal layer 220 and the second liquid crystal layer 120 in the thickness direction of the display device 1 is preferably 0.1 or more times the maximum length of one display unit 205 in the first direction D1 or the length of the maximum length of one display unit 205 in the second direction D2, whichever is longer. In FIG. 41, the distance L1 indicates the distance between the surface closer to the TFT substrate 210 of the first liquid crystal layer 220 and the surface closer to the color filter substrate 130 of the second liquid crystal layer 120. The structure in which the distance L1 is less than 0.1 times the maximum length of one display unit 205 in the first direction D1 or the maximum length of one display unit 205 in the second direction D2, whichever is longer, can prevent moreé. The distance L1 may have any upper limit, and may be 5000 times the maximum length of one display unit 205 in the first direction D1 or the maximum length of one display unit 205 in the second direction D2, whichever is longer. Differently from Embodiment 1, the phenomenon of double image causing double vision of a display image does not cause a trouble, and thus the distance L1 can be appropriately set in order to achieve a visual effect in expression. Specifically, the distance L1 may be 50 cm or shorter.

In order to reduce or prevent moreé, a conventional dual-cell display includes two panels spaced with a distance of several centimeters to several tens centimeters. Such a wide panel distance limits video expression to obstruct attractive expression. The display device of Embodiment 7 unlikely causes moreé and thus can flexibly set the distance between the liquid crystal display panel 200 and the color display element 100 to achieve highly entertaining video expression.

Embodiment 8

Figure 42:
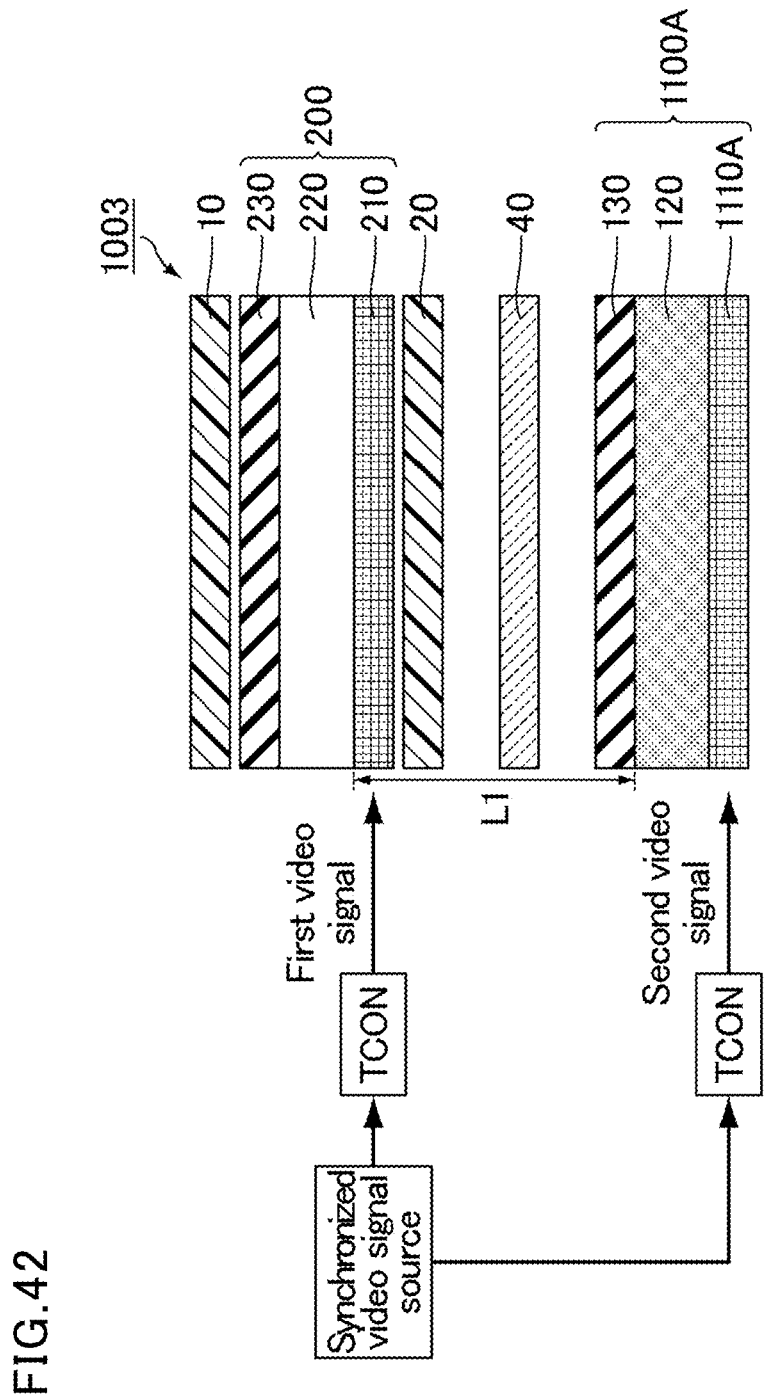
FIG. 42 is a schematic cross-sectional view of a display device of Embodiment 8.
Figure 43:
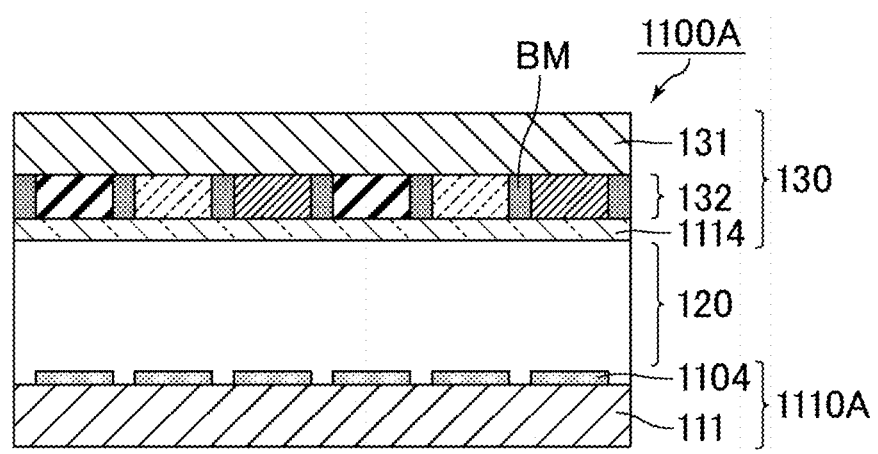
FIG. 43 is a schematic cross-sectional view of a color display element of Embodiment 8.

In Embodiment 8, the liquid crystal display element is a reflective color display element. The structure in which the liquid crystal display element is a reflective color display element can eliminate a backlight to reduce power consumption. FIG. 42 is a schematic cross-sectional view of a display device of Embodiment 8. FIG. 43 is a schematic cross-sectional view of a color display element of Embodiment 8. The components similar to those of other embodiments are not described.

As shown in FIG. 42, the display device 1003 of Embodiment 8 includes the liquid crystal display panel 200 as a front panel and a color display element 1100A as a rear panel. With the later-described liquid crystal layer 220 of the liquid crystal display panel 200 defined as a first liquid crystal layer 220, the color display element 1100A is a liquid crystal element including the second liquid crystal layer 120 between paired substrates. Of the paired substrates, a substrate 1110A on the back surface side of the display device includes a reflector on the side facing the second liquid crystal layer 120. The paired substrates consist of the color filter substrate 130 and the TFT substrate 1110A, for example.

As shown in FIG. 43, the TFT substrate 1110A may include the support substrate 111 such as a glass substrate and pixel electrodes 1104, for example. Examples of the reflector include the pixel electrodes 1104. The pixel electrodes 1104 are each preferably a reflective electrode formed from a metal such as silver or aluminum. The color filter substrate 130 may include a counter electrode 1114 for generating an electric field with the pixel electrodes 1104 across the second liquid crystal layer 120.

In Embodiment 8, similarly to Embodiment 7, a video displayed on the color display element 1100A and a video displayed on the liquid crystal display panel 200 may be provided by inputting a first video signal and a second video signal, which are independent from each other, through different TCONs from a synchronized video signal source. Alternatively, similarly to Embodiment 1, dual-cell signal processing may be executed based on one input video signal to produce different video signals for the color display element 1100A and the liquid crystal display panel 200.

Embodiment 9

Figure 44:
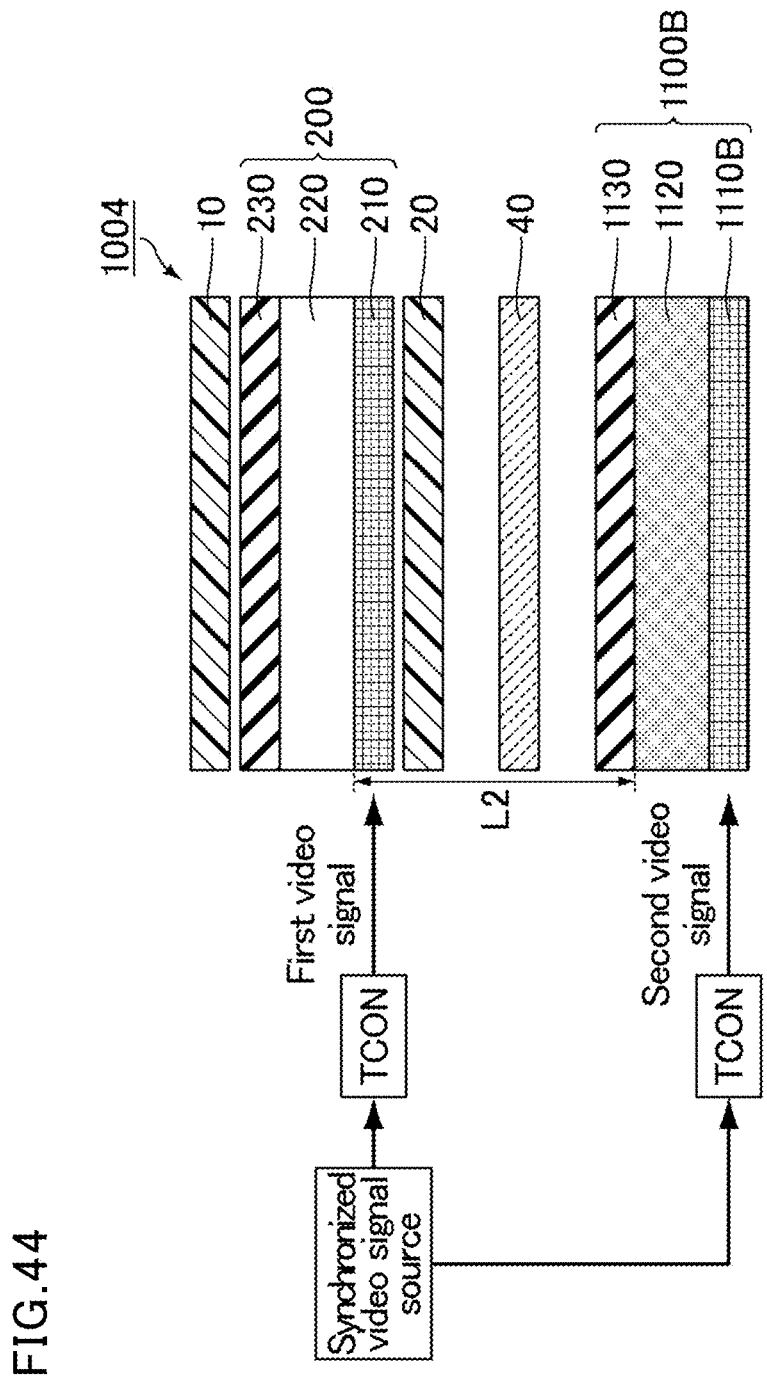
FIG. 44 is a schematic cross-sectional view of a display device of Embodiment 9.

FIG. 44 is a schematic cross-sectional view of a display device of Embodiment 9. As shown in FIG. 44, a display device 1004 of Embodiment 9 includes the liquid crystal display panel 200 as a front panel and a color display element 1100B as a rear panel.

In Embodiment 9, a video displayed on the color display element 1100B and a video displayed on the liquid crystal display panel 200 are provided by inputting a first video signal and a second video signal, which are independent from each other, through different TCONs from a synchronized video signal source. The structure in which the color display element 1100B and the liquid crystal display panel 200 can provide independent videos achieves various types of video expression. The liquid crystal display panel 200 used can be one similar to those described in Embodiments 1 to 4.

The color display element 1100B preferably includes a light-emitting layer 1120. The light-emitting layer 1120 may be disposed between paired substrates such as a TFT substrate 1110B and a counter substrate 1130. The light-emitting layer 1120 may include a self-light-emitting element such as an organic light-emitting diode (OLED), a quantum dot light-emitting diode (QLED), or a micro-LED. The micro-LED may be a fine (e.g., 3 μm or greater and 3000 μm or smaller) inorganic LED. In other words, the color display element 1100B may be a self-light-emitting panel such as an OLED display, a QLED display, or a micro-LED display.

The first polarizing plate 10, the liquid crystal display panel 200, the second polarizing plate 20, and the color display element 1100B may be stacked in the stated order. The liquid crystal display panel 200 and the color display element 1100B may be attached with the highly transparent OCA 40. The display device 1004 as a whole has a haze value in white display of preferably 79% or lower.

A distance L2 between the first liquid crystal layer 220 and the light-emitting layer 1120 in the thickness direction of the display device is preferably 0.1 or more times the maximum length of one display unit 205 in the first direction D1 or the length of the maximum length of one display unit 205 in the second direction D2, whichever is longer. In FIG. 44, the distance L2 indicates the distance between the surface closer to the TFT substrate 210 of the first liquid crystal layer 220 and the surface closer to the counter substrate 1130 of the light-emitting layer 1120. The structure in which the distance L2 is less than 0.1 times the maximum length of one display unit 205 in the first direction D1 or the maximum length of one display unit 205 in the second direction D2, whichever is longer, can prevent moreé. The distance L2 may have any upper limit, and may be 5000 times the maximum length of one display unit 205 in the first direction D1 or the maximum length of one display unit 205 in the second direction D2, whichever is longer. Differently from Embodiment 1, the phenomenon of double image causing double vision of a display image does not cause a trouble, and thus the distance L2 can be appropriately set in terms of a visual effect in expression. Specifically, the distance L2 may be 50 cm or shorter.

<Additional Remarks>

(1) One embodiment of the present disclosure is directed to a display device including: a color display element including pixels that are arranged in a row direction and in a column direction and each include sub-pixels of different colors; and a liquid crystal display panel stacked with the color display element, the liquid crystal display panel including a TFT substrate, a counter substrate, and a liquid crystal layer between the TFT substrate and the counter substrate, the TFT substrate including first bus lines extending in a first direction, second bus lines extending in a second direction intersecting the first direction, and display electrodes each at a position corresponding to an intersection of one of the first bus lines and one of the second bus lines, at least one of the first bus lines and at least one of the second bus lines each overlapping at least some sub-pixels of all colors among the sub-pixels of different colors of the color display element in a plan view.

(2) In an embodiment of the present disclosure, the display device includes the structure (1), at least one of the first bus lines may extend in the first direction with bending, and at least one of the second bus lines may extend in the second direction with bending.

(3) In an embodiment of the present disclosure, the display device includes the structure (2), and the first direction may be parallel to the row direction and the second direction may be parallel to the column direction.

(4) In an embodiment of the present disclosure, the display device includes the structure (2), at least one of the first bus lines may include linear portions, and the first direction and at least one of the linear portions may form a bending angle within a range of 45°±15°.

(5) In an embodiment of the present disclosure, the display device includes the structure (2), at least one of the second bus lines may include linear portions, and the second direction and at least one of the linear portions may form a bending angle within a range of 45°±15°.

(6) In an embodiment of the present disclosure, the display device includes the structure (2), at least one of the first bus lines and at least one of the second bus lines may each include linear portions, the first direction and at least one of the linear portions of the first bus line with bending may form a bending angle within a range of 45°±15°, and the second direction and at least one of the linear portions of the second bus line with bending may form a bending angle within a range of 45°±15°.

(7) In an embodiment of the present disclosure, the display device includes the structure (2), and a sum of bending widths of the first bus lines in a direction perpendicular to the first direction may be 0.75 or more and 1.25 or less times a length of a display region of the liquid crystal display panel in the direction perpendicular to the first direction.

(8) In an embodiment of the present disclosure, the display device includes the structure (2), and a sum of bending widths of the second bus lines in a direction perpendicular to the second direction may be 0.75 or more and 1.25 or less times a length of a display region of the liquid crystal display panel in the direction perpendicular to the second direction.

(9) In an embodiment of the present disclosure, the display device includes the structure (2), a sum of bending widths of the first bus lines in a direction perpendicular to the first direction may be 0.75 or more and 1.25 or less times a length of a display region of the liquid crystal display panel in the direction perpendicular to the first direction, and a sum of bending widths of the second bus lines in a direction perpendicular to the second direction may be 0.75 or more and 1.25 or less times a length of a display region of the liquid crystal display panel in the direction perpendicular to the second direction.

(10) In an embodiment of the present disclosure, the display device includes the structure (2), the liquid crystal display panel may include display units each provided with a corresponding one display electrode, and the first bus line with bending may have a bending period of three or less times a maximum length of one of the display units in the first direction.

(11) In an embodiment of the present disclosure, the display device includes the structure (2), the liquid crystal display panel may include display units each provided with a corresponding one display electrode, and the second bus line with bending may have a bending period of three or less times a maximum length of one of the display units in the second direction.

(12) In an embodiment of the present disclosure, the display device includes the structure (2), the liquid crystal display panel may include display units each provided with a corresponding one display electrode, the first bus line with bending may have a bending period of three or less times a maximum length of one of the display units in the first direction, and the second bus line with bending may have a bending period of three or less times a maximum length of one of the display units in the second direction.

(13) In an embodiment of the present disclosure, the display device includes the structure (2), two adjacent first bus lines among the first bus lines may have a varying distance therebetween, and a portion with a shortest distance between the two adjacent first bus lines may be superimposed with one of the display electrodes in a plan view.

(14) In an embodiment of the present disclosure, the display device includes the structure (2), two adjacent second bus lines among the second bus lines may have a varying distance therebetween, and a portion with a shortest distance between the two adjacent second bus lines may be superimposed with one of the display electrodes in a plan view.

(15) In an embodiment of the present disclosure, the display device includes the structure (2), the liquid crystal display panel may include display units each provided with a corresponding one display electrode, with a rectangular region whose short side corresponds to a bending width of one of the first bus lines in a direction perpendicular to the first direction and whose long side corresponds to a length of the first bus line in the first direction defined as a present region of the first bus line, two first bus lines adjacent in the direction perpendicular to the first direction among the first bus lines may have present regions not overlapping each other in a plan view, and the present regions of the two adjacent first bus lines may be spaced by a distance of 0.25 or less times a maximum length of one of the display units in the direction perpendicular to the first direction.

(16) In an embodiment of the present disclosure, the display device includes the structure (2), the liquid crystal display panel may include display units each provided with a corresponding one display electrode, with a rectangular region whose short side corresponds to a bending width of one of the second bus lines in a direction perpendicular to the second direction and whose long side corresponds to a length of the second bus line in the second direction defined as a present region of the second bus line, two second bus lines adjacent in the direction perpendicular to the second direction among the second bus lines may have present regions not overlapping each other in a plan view, and the present regions of the two adjacent second bus lines may be spaced by a distance of 0.25 or less times a maximum length of one of the display units in the direction perpendicular to the second direction.

(17) In an embodiment of the present disclosure, the display device includes the structure (2), the liquid crystal display panel may include display units each provided with a corresponding one display electrode, with a rectangular region whose short side corresponds to a bending width of one of the first bus lines in a direction perpendicular to the first direction and whose long side corresponds to a length of the first bus line in the first direction defined as a present region of the first bus line, and with a rectangular region whose short side corresponds to a bending width of one of the second bus lines in a direction perpendicular to the second direction and whose long side corresponds to a length of the second bus line in the second direction defined as a present region of the second bus line, two first bus lines adjacent in the direction perpendicular to the first direction among the first bus lines may have present regions not overlapping each other in a plan view, two second bus lines adjacent in the direction perpendicular to the second direction among the second bus lines may have present regions not overlapping each other in a plan view, the present regions of the two adjacent first bus lines may are be spaced by a distance of 0.25 or less times a maximum length of one of the display units in the direction perpendicular to the first direction, and the present regions of the two adjacent second bus lines may be spaced by a distance of 0.25 or less times a maximum length of one of the display units in the direction perpendicular to the second direction.

(18) In an embodiment of the present disclosure, the display device includes the structure (2), the liquid crystal display panel may include display units each provided with a corresponding one display electrode, with a rectangular region whose short side corresponds to a bending width of one of the first bus lines in a direction perpendicular to the first direction and whose long side corresponds to a length of the first bus line in the first direction defined as a present region of the first bus line, two first bus lines adjacent in the direction perpendicular to the first direction among the first bus lines may have present regions overlapping each other in a plan view, and the present regions of the two adjacent first bus lines may have an overlapping width of 0.25 or less times a maximum length of one of the display units in the direction perpendicular to the first direction.

(19) In an embodiment of the present disclosure, the display device includes the structure (2), the liquid crystal display panel may include display units each provided with a corresponding one display electrode, with a rectangular region whose short side corresponds to a bending width of one of the second bus lines in a direction perpendicular to the second direction and whose long side corresponds to a length of the second bus line in the second direction defined as a present region of the second bus line, two second bus lines adjacent in the direction perpendicular to the second direction among the second bus lines may have present regions overlapping each other in a plan view, and the present regions of the two adjacent second bus lines may have an overlapping width of 0.25 or less times a maximum length of one of the display units in the direction perpendicular to the second direction.

(20) In an embodiment of the present disclosure, the display device includes the structure (2), the liquid crystal display panel may include display units each provided with a corresponding one display electrode, with a rectangular region whose short side corresponds to a bending width of one of the first bus lines in a direction perpendicular to the first direction and whose long side corresponds to a length of the first bus line in the first direction defined as a present region of the first bus line, and with a rectangular region whose short side corresponds to a bending width of one of the second bus lines in a direction perpendicular to the second direction and whose long side corresponds to a length of the second bus line in the second direction defined as a present region of the second bus line, two first bus lines adjacent in the direction perpendicular to the first direction among the first bus lines may have present regions overlapping each other in a plan view, two second bus lines adjacent in the direction perpendicular to the second direction among the second bus lines may have present regions overlapping each other in a plan view, the present regions of the two adjacent first bus lines may have an overlapping width of 0.25 or less times a maximum length of one of the display units in the direction perpendicular to the first direction, and the present regions of the two adjacent second bus lines may have an overlapping width of 0.25 or less times a maximum length of one of the display units in the direction perpendicular to the second direction.

(21) In an embodiment of the present disclosure, the display device includes the structure (1), the liquid crystal display panel may include display units each provided with a corresponding one display electrode, the first bus lines may each include bending points, and a distance between two closest bending points of two adjacent first bus lines among the first bus lines in a direction perpendicular to the first direction may be 0.25 or less times a maximum length of one of the display units in the direction perpendicular to the first direction.

(22) In an embodiment of the present disclosure, the display device includes the structure (1), the liquid crystal display panel may include display units each provided with a corresponding one display electrode, the second bus lines may each include bending points, and a distance between two closest bending points of two adjacent second bus lines among the second bus lines in a direction perpendicular to the second direction may be 0.25 or less times a maximum length of one of the display units in the direction perpendicular to the second direction.

(23) In an embodiment of the present disclosure, the display device includes the structure (1), the liquid crystal display panel may include display units each provided with a corresponding one display electrode, the first bus lines may each include bending points, a distance between two closest bending points of two adjacent first bus lines among the first bus lines in a direction perpendicular to the first direction may be 0.25 or less times a maximum length of one of the display units in the direction perpendicular to the first direction, the second bus lines may each include bending points, and a distance between two closest bending points of two adjacent second bus lines among the second bus lines in a direction perpendicular to the second direction may be 0.25 or less times a maximum length of one of the display units in the direction perpendicular to the second direction.

(24) In an embodiment of the present disclosure, the display device includes the structure (1), and in the sub-pixels of different colors of the color display element, same-color effective transmissive areas of each color may satisfy the following formula (1) and the following formula (2):

$$(S_{Max}-S_{Ave})/S_{Ave} \leq 0.25 \quad (1)$$

$$(S_{Ave}-S_{Min})/S_{Ave} \leq 0.25 \quad (2)$$

wherein $S_{Max}$ represents a maximum value of same-color effective transmissive areas of respective measurement points, $S_{Min}$ represents a minimum value of the same-color effective transmissive areas of the respective measurement points, and $S_{Ave}$ represents an average value of the same-color effective transmissive areas of the respective measurement points, wherein the same-color effective transmissive areas each mean a sum of all sub-pixel effective transmissive areas of a same color in $N^2$ pixels in a region consisting of N rows and N columns in the color display element, where N is an integer of 2 or greater, the sub-pixel effective transmissive areas each mean an area obtainable by subtracting an area of a portion overlapping any of the first bus lines and any of the second bus lines of the liquid crystal display panel from an area of an aperture region of one of the sub-pixels in a plan view, and the same-color effective transmissive areas are determined for the respective measurement points while the liquid crystal display panel is moved in the row direction and in the column direction with the color display element being fixed, wherein the measurement points are arranged in a grid pattern on the $N^2$ pixels with a certain width in the row direction and a certain width in the column direction.

(25) In an embodiment of the present disclosure, the display device includes the structure (24), and the same-color effective transmissive areas of each color may satisfy the following formula (3) and the following formula (4):

$$(S_{Max}-S_{Ave})/S_{Ave} \leq 0.1 \quad (3)$$

$$(S_{Ave}-S_{Min})/S_{Ave} \leq 0.1 \quad (4).$$

(26) In an embodiment of the present disclosure, the display device includes the structure (1), the liquid crystal display panel may include display units each provided with a corresponding one display electrode, and at least one of the display units may have an area greater than one of the pixels of the color display element.

(27) In an embodiment of the present disclosure, the display device includes the structure (1), the sub-pixels of the color display element may each include a pixel electrode having an outline including at least one linear portion, and in a plan view, the linear portion of the pixel electrode may extend in a direction intersecting each side forming the outline of the display electrode of the liquid crystal display panel.

(28) In an embodiment of the present disclosure, the display device includes the structure (27), and an extending direction of the linear portion of the pixel electrode and an extending direction of at least one side forming the outline of the display electrode may form an angle of 30° or greater and 60° or smaller.

(29) In an embodiment of the present disclosure, the display device includes the structure (1), and the display electrodes may each have a tetragonal shape.

(30) In an embodiment of the present disclosure, the display device includes the structure (1), and the display electrodes may each have a rectangular shape.

(31) In an embodiment of the present disclosure, the display device includes the structure (30), and the display electrodes may each have a rectangular shape whose long side has a length 1.5 or more and 2.5 or less times a length of its short side.

(32) In an embodiment of the present disclosure, the display device includes the structure (1), and in a plan view, at least one of the first bus lines may include at least one first electrode-overlapping portion that overlaps one of the display electrodes.

(33) In an embodiment of the present disclosure, the display device includes the structure (32), and a total length of the at least one first electrode-overlapping portion of one of the first bus lines may be 75% or more of a total length of the first bus line.

(34) In an embodiment of the present disclosure, the display device includes the structure (1), and in a plan view, at least one of the second bus lines may include at least one second electrode-overlapping portion that overlaps one of the display electrodes.

(35) In an embodiment of the present disclosure, the display device includes the structure (34), and a total length of the at least one second electrode-overlapping portion of one of the second bus lines may be 75% or more of a total length of the second bus line.

(36) In an embodiment of the present disclosure, the display device includes the structure (1), in a plan view, at least one of the first bus lines may include at least one first electrode-overlapping portion that overlaps one of the display electrodes, and in a plan view, at least one of the second bus lines may include at least one second electrode-overlapping portion that overlaps one of the display electrodes.

(37) In an embodiment of the present disclosure, the display device includes the structure (36), a total length of the at least one first electrode-overlapping portion of one of the first bus lines may be 75% or more of a total length of the first bus line, and a total length of the at least one second electrode-overlapping portion of one of the second bus lines may be 75% or more of a total length of the second bus line.

(38) In an embodiment of the present disclosure, the display device includes the structure (1), and the TFT substrate of the liquid crystal display panel may sequentially include a support substrate, the first bus lines, a first insulating layer, the second bus lines, a second insulating layer, and the display electrodes.

(39) In an embodiment of the present disclosure, the display device includes the structure (38), and the display device may include, between the second insulating layer and the display electrodes, a transparent conductive layer and a third insulating layer sequentially from a side closer to the second insulating layer.

(40) In an embodiment of the present disclosure, the display device includes the structure (39), in a plan view, at least one of the first bus lines may include at least one first electrode-overlapping portion that overlaps one of the display electrodes, and the transparent conductive layer may be superimposed with the first electrode-overlapping portion.

(41) In an embodiment of the present disclosure, the display device includes the structure (39), in a plan view, at least one of the second bus lines may include at least one second electrode-overlapping portion that overlaps one of the display electrodes, and the transparent conductive layer may be superimposed with the second electrode-overlapping portion.

(42) In an embodiment of the present disclosure, the display device includes the structure (39), in a plan view, at least one of the first bus lines may include at least one first electrode-overlapping portion that overlaps one of the display electrodes, and at least one of the second bus lines may include at least one second electrode-overlapping portion that overlaps one of the display electrodes, and the transparent conductive layer may be superimposed with the first and second electrode-overlapping portions.

(43) In an embodiment of the present disclosure, the display device includes the structure (1), and in a plan view, the liquid crystal display panel may not include a light-shielding component between two adjacent display electrodes among the display electrodes.

(44) In an embodiment of the present disclosure, the display device includes the structure (1), and the display device as a whole may have a haze value in white display of 79% or lower.

(45) In an embodiment of the present disclosure, the display device includes the structure (1), and the display device as a whole may have a haze value in white display of 50% or lower.

(46) In an embodiment of the present disclosure, the display device includes the structure (1), with the liquid crystal layer of the liquid crystal display panel defined as a first liquid crystal layer, the color display element may be a liquid crystal element that includes a second liquid crystal layer between paired substrates, and the display device may include a stack sequentially including a first polarizing plate, the color display element, a second polarizing plate, the liquid crystal display panel, and a third polarizing plate.

(47) In an embodiment of the present disclosure, the display device includes the structure (1), with the liquid crystal layer of the liquid crystal display panel defined as a first liquid crystal layer, the color display element may be a liquid crystal element that includes a second liquid crystal layer and a color filter substrate provided with a color filter, the second liquid crystal layer may be sandwiched between the color filter substrate and the counter substrate of the liquid crystal display panel, the display device may sequentially include a first polarizing plate, the color filter substrate, the second liquid crystal layer, a polarizing layer, the counter substrate, the first liquid crystal layer, the TFT substrate, and a second polarizing plate, and the counter substrate may include, on a surface closer to the polarizing layer, switching elements for controlling voltage applied to the second liquid crystal layer.

(48) In an embodiment of the present disclosure, the display device includes the structure (1), liquid crystal display panel may be a front panel and the color display element may be a rear panel, with the liquid crystal layer of the liquid crystal display panel defined as a first liquid crystal layer, the color display element may be a liquid crystal element that includes a second liquid crystal layer between paired substrates, and a substrate constituting the paired substrates and located on a back surface side of the display device may include a reflector on a side facing the second liquid crystal layer.

(49) In an embodiment of the present disclosure, the display device includes the structure (47) or (48), the liquid crystal display panel may include display units each provided with a corresponding one display electrode, and the first liquid crystal layer and the second liquid crystal layer may be spaced by a distance, in a thickness direction of the display device, of 0.1 or more times a maximum length of one of the display units in the first direction or a maximum length thereof in the second direction, whichever is longer.

(50) In an embodiment of the present disclosure, the display device includes the structure (1), the color display element may be a front panel and the liquid crystal display panel may be a rear panel, and the display device may sequentially include the color display element, the liquid crystal display panel, and a backlight.

(51) In an embodiment of the present disclosure, the display device includes the structure (1), the liquid crystal display panel may be a front panel and the color display element may be a rear panel, and the display device may sequentially include the liquid crystal display panel, the color display element, and a backlight.

(52) In an embodiment of the present disclosure, the display device includes the structure (1), and the counter substrate of the liquid crystal display panel may include a color filter.

(53) In an embodiment of the present disclosure, the display device includes the structure (50) or (51), the backlight may include light-emitting elements of multiple colors, and the liquid crystal display panel may provide color display by driving the light-emitting elements of multiple colors based on a field-sequential color system in which the light-emitting elements are turned on time-divisionally.

(54) In an embodiment of the present disclosure, the display device includes the structure (1), the liquid crystal display panel may be a front panel and the color display element may be a rear panel, and the color display element may include a light-emitting layer.

(55) In an embodiment of the present disclosure, the display device includes the structure (54), the liquid crystal display panel may include display units each provided with a corresponding one display electrode, and the liquid crystal layer and the light-emitting layer may be spaced by a distance, in a thickness direction of the display device, of 0.1 or more times a maximum length of one of the display units in the first direction or a maximum length thereof in the second direction, whichever is longer.

REFERENCE SIGNS LIST 1, 1001, 1002, 1003, 1004, 2001: display device
10, 2010: first polarizing plate
20, 2020: second polarizing plate
30, 2030: third polarizing plate
40: highly transparent OCA
100, 1100A, 1100B: color display element
101, 2101: gate line
102, 2102: source line
103, 203, 2203: switching element (TFT)
104, 2104: pixel electrode
105, 2105: sub-pixel
106: pixel
110, 210, 1110A, 1110B, 1210: TFT substrate
111, 131, 211: support substrate
114, 1114: counter electrode
115: insulating layer
120: second liquid crystal layer
130, 1130: color filter substrate
132: color filter layer
200, 1200: liquid crystal display panel
201: first bus line
202: second bus line
202sub: redundant line
204: display electrode
205: display unit
206: connecting point
207: auxiliary capacitance line
212: first insulating layer
213: second insulating layer
214: transparent conductive layer
215: third insulating layer
220: liquid crystal layer (first liquid crystal layer)
230: counter substrate
300: backlight
400: photometer
1000: sample for transmittance evaluation
1020: polarizing layer
1040: diffusing layer
1120: light-emitting layer
1130: counter substrate
2001: dual-cell display
2040: fourth polarizing plate
2050: diffusing OCA sheet
2100: front panel
2200: rear panel

What is claimed is:

1. A display device comprising:
a color display element including pixels; and
a liquid crystal display panel stacked with the color display element,
the liquid crystal display panel including a TFT substrate, a counter substrate, and a liquid crystal layer between the TFT substrate and the counter substrate,
the pixels including sub-pixels of different colors,
the sub-pixels of all the pixels, viewed as a whole, being arranged in a pattern including arrays of sub-pixels of different colors placed in a first direction and arrays of sub-pixels of same colors placed in a second direction intersecting the first direction,
the TFT substrate including first bus lines extending in the first direction, second bus lines extending in the second direction, and display electrodes each at a position corresponding to an intersection of one of the first bus lines and one of the second bus lines,
at least one of the first bus lines and at least one of the second bus lines each overlapping at least some sub-pixels of all colors among the sub-pixels of different colors of the color display element in a plan view,
at least one of the second bus lines extending in the second direction while bending, and
all the arrays of the sub-pixels of the same colors overlapping a portion of one of the second bus lines.

2. The display device according to claim 1,
wherein at least one of the first bus lines extends in the first direction while bending,
at least one of the first bus lines and at least one of the second bus lines each include linear portions,
the first direction and at least one of the linear portions of the first bus line with bending form a bending angle within a range of 45°±15°, and
the second direction and at least one of the linear portions of the second bus line with bending form a bending angle within a range of 45°±15°.

3. The display device according to claim 1,
wherein at least one of the first bus lines extends in the first direction while bending,
a sum of bending widths of the first bus lines in a direction perpendicular to the first direction is 0.75 or more and 1.25 or less times a length of a display region of the liquid crystal display panel in the direction perpendicular to the first direction, and
a sum of bending widths of the second bus lines in a direction perpendicular to the second direction is 0.75 or more and 1.25 or less times a length of a display region of the liquid crystal display panel in the direction perpendicular to the second direction.

4. The display device according to claim 1,
wherein at least one of the first bus lines extends in the first direction while bending
the liquid crystal display panel includes display units each provided with a corresponding one display electrode,
the first bus line with bending has a bending period of three or less times a maximum length of one of the display units in the first direction, and the second bus line with bending has a bending period of three or less times a maximum length of one of the display units in the second direction.

5. The display device according to claim 1,
wherein at least one of the first bus lines extends in the first direction while bending,
two adjacent first bus lines among the first bus lines have a varying distance therebetween and
a portion with a shortest distance between the two adjacent first bus lines is superimposed with one of the display electrodes in a plan view, or
two adjacent second bus lines among the second bus lines have a varying distance therebetween and
a portion with a shortest distance between the two adjacent second bus lines is superimposed with one of the display electrodes in a plan view.

6. The display device according to claim 1,
wherein at least one of the first bus lines extends in the first direction while bending
the liquid crystal display panel includes display units each provided with a corresponding one display electrode,
with a rectangular region whose short side corresponds to a bending width of one of the first bus lines in a direction perpendicular to the first direction and whose long side corresponds to a length of the first bus line in the first direction defined as a present region of the first bus line, and
with a rectangular region whose short side corresponds to a bending width of one of the second bus lines in a direction perpendicular to the second direction and whose long side corresponds to a length of the second bus line in the second direction defined as a present region of the second bus line,
two first bus lines adjacent in the direction perpendicular to the first direction have present regions satisfying one of the following relations A to C in a plan view:
A: the present regions of the two adjacent first bus lines are in contact with each other;
B: the present regions of the two adjacent first bus lines do not overlap each other and are spaced by a distance of 0.25 or less times a maximum length of one of the display units in the direction perpendicular to the first direction; and
C: the present regions of the two adjacent first bus lines overlap each other and their overlapping width is 0.25 or less times a maximum length of one of the display units in the direction perpendicular to the first direction,
and two second bus lines adjacent in the direction perpendicular to the second direction have present regions satisfying one of the following relations D to F in a plan view:
D: the present regions of the two adjacent second bus lines are in contact with each other;
E: the present regions of the two adjacent second bus lines do not overlap each other and are spaced by a distance of 0.25 or less times a maximum length of one of the display units in the direction perpendicular to the second direction; and
F: the present regions of the two adjacent second bus lines overlap each other and their overlapping width is 0.25 or less times a maximum length of one of the display units in the direction perpendicular to the second direction.

7. The display device according to claim 1,
wherein the liquid crystal display panel includes display units each provided with a corresponding one display electrode,
the first bus lines each include bending points,
a distance between two closest bending points of two adjacent first bus lines among the first bus lines in a direction perpendicular to the first direction is 0.25 or less times a maximum length of one of the display units in the direction perpendicular to the first direction,
the second bus lines each include bending points, and
a distance between two closest bending points of two adjacent second bus lines among the second bus lines in a direction perpendicular to the second direction is 0.25 or less times a maximum length of one of the display units in the direction perpendicular to the second direction.

8. The display device according to claim 1,
wherein, in the sub-pixels of different colors of the color display element, same-color effective transmissive areas of each color satisfy the following formula (1) and the following formula (2):

$$(S_{Max}-S_{Ave})/S_{Ave} \leq 0.25 \tag{1}$$

$$(S_{Ave}-S_{Min})/S_{Ave} \leq 0.25 \tag{2}$$

wherein $S_{Max}$ represents a maximum value of same-color effective transmissive areas of respective measurement points,
$S_{Min}$ represents a minimum value of the same-color effective transmissive areas of the respective measurement points, and
$S_{Ave}$ represents an average value of the same-color effective transmissive areas of the respective measurement points,
wherein the same-color effective transmissive areas each mean a sum of all sub-pixel effective transmissive areas of a same color in N2 pixels in a region consisting of N rows and N columns in the color display element, where N is an integer of 2 or greater,
the sub-pixel effective transmissive areas each mean an area obtainable by subtracting an area of a portion overlapping any of the first bus lines and any of the second bus lines of the liquid crystal display panel from an area of an aperture region of one of the sub-pixels in a plan view, and
the same-color effective transmissive areas are determined for the respective measurement points while the liquid crystal display panel is moved in the row direction and in the column direction with the color display element being fixed,
wherein the measurement points are arranged in a grid pattern on the $N^2$ pixels with a certain width in the row direction and a certain width in the column direction.

9. The display device according to claim 1,
wherein the liquid crystal display panel includes display units each provided with a corresponding one display electrode, and
at least one of the display units has an area greater than one of the pixels of the color display element.

10. The display device according to claim 1,
wherein the sub-pixels of the color display element each include a pixel electrode having an outline including at least one linear portion, and
in a plan view, the linear portion of the pixel electrode extends in a direction intersecting each side forming the outline of the display electrode of the liquid crystal display panel.

11. The display device according to claim 1,
wherein the display electrodes each have a substantially tetragonal shape that can be within a rectangular frame whose long side has a length 1.5 or more and 2.5 or less times a length of its short side or within a rectangular frame whose long side has a length 1.25 or less times a length of its short side.

12. The display device according to claim 1,
wherein in a plan view, at least one of the first bus lines and the second bus lines includes at least one electrode-overlapping portion that overlaps one of the display electrodes, and
a total length of the at least one electrode-overlapping portion of one of the bus lines is 75% or more of a total length of the one of the bus lines.

13. The display device according to claim 1,
wherein in a plan view, at least one of the first bus lines and the second bus lines includes at least one electrode-overlapping portion that overlaps one of the display electrodes,
the at least one electrode-overlapping portion includes a first electrode-overlapping portion and a second electrode-overlapping portion,
the first electrode-overlapping portion is a portion where at least one of the first bus lines overlaps one of the display electrodes, and
the second electrode-overlapping portion is a portion where at least one of the second bus lines overlaps one of the display electrodes.

14. The display device according to claim 1,
wherein in a plan view, at least one of the first bus lines and the second bus lines includes at least one electrode-overlapping portion that overlaps one of the display electrodes,
the TFT substrate of the liquid crystal display panel further includes a transparent conductive layer and a third insulating layer,
a support substrate, the first bus lines, a first insulating layer, the second bus lines, a second insulating layer, the transparent conductive layer, the third insulating layer, and the display electrodes are sequentially disposed, and
in a plan view, the transparent conductive layer is superimposed with the electrode-overlapping portion.

15. The display device according to claim 1,
wherein in a plan view, the liquid crystal display panel does not include a light-shielding component between two adjacent display electrodes among the display electrodes.

16. The display device according to claim 1,
wherein with the liquid crystal layer of the liquid crystal display panel defined as a first liquid crystal layer,
the color display element is a liquid crystal element that includes a second liquid crystal layer between paired substrates, and
the display device includes a stack sequentially including a first polarizing plate, the color display element, a second polarizing plate, the liquid crystal display panel, and a third polarizing plate.

17. The display device according to claim 1,
wherein with the liquid crystal layer of the liquid crystal display panel defined as a first liquid crystal layer,
the color display element is a liquid crystal element that includes a second liquid crystal layer and a color filter substrate provided with a color filter,
the second liquid crystal layer is sandwiched between the color filter substrate and the counter substrate of the liquid crystal display panel,
the display device sequentially includes a first polarizing plate, the color filter substrate, the second liquid crystal layer, a polarizing layer, the counter substrate, the first liquid crystal layer, the TFT substrate, and a second polarizing plate, and
the counter substrate includes, on a surface closer to the polarizing layer, switching elements for controlling voltage applied to the second liquid crystal layer.

18. The display device according to claim 1,
wherein liquid crystal display panel is a front panel and the color display element is a rear panel,
with the liquid crystal layer of the liquid crystal display panel defined as a first liquid crystal layer,
the color display element is a liquid crystal element that includes a second liquid crystal layer between paired substrates, and
a substrate constituting the paired substrates and located on a back surface side of the display device includes a reflector on a side facing the second liquid crystal layer.

19. The display device according to claim 1,
wherein the color display element is a front panel and the liquid crystal display panel is a rear panel, and
the display device sequentially includes the color display element, the liquid crystal display panel, and a backlight.

20. The display device according to claim 1,
wherein the liquid crystal display panel is a front panel and the color display element is a rear panel, and
the display device sequentially includes the liquid crystal display panel, the color display element, and a backlight.

21. The display device according to claim 19,
wherein the backlight includes light-emitting elements of multiple colors, and
the liquid crystal display panel provides color display by driving the light-emitting elements of multiple colors based on a field-sequential color system in which the light-emitting elements are turned on time-divisionally.

22. The display device according to claim 1,
wherein the liquid crystal display panel is a front panel and the color display element is a rear panel, and
the color display element includes a light-emitting layer.

23. A display device comprising:
a color display element including pixels that are arranged in a row direction and in a column direction and each include sub-pixels of different colors; and
a liquid crystal display panel stacked with the color display element,
the liquid crystal display panel including a TFT substrate, a counter substrate, and a liquid crystal layer between the TFT substrate and the counter substrate,
the TFT substrate including first bus lines extending in a first direction, second bus lines extending in a second direction intersecting the first direction, and display electrodes each at a position corresponding to an intersection of one of the first bus lines and one of the second bus lines,
at least one of the first bus lines and at least one of the second bus lines each overlapping at least some sub-pixels of all colors among the sub-pixels of different colors of the color display element in a plan view,
at least two adjacent first bus lines extending in the first direction while bending, and being parallel to each other with their bending periods misaligned in the first direction,
at least two adjacent second bus lines extending in the second direction while bending, and being parallel to each other with their bending periods misaligned in the second direction, and both of a distance between the at least two adjacent first bus lines and a distance between the at least two adjacent second bus lines periodically changing.

24. A display device comprising:

a color display element including pixels that are arranged in a row direction and in a column direction and each include sub-pixels of different colors; and a liquid crystal display panel stacked with the color display element, the liquid crystal display panel including a TFT substrate, a counter substrate, and a liquid crystal layer between the TFT substrate and the counter substrate, the TFT substrate including first bus lines extending in a first direction, second bus lines extending in a second direction intersecting the first direction, and display electrodes each at a position corresponding to an intersection of one of the first bus lines and one of the second bus lines, at least one of the first bus lines and at least one of the second bus lines each overlapping at least some sub-pixels of all colors among the sub-pixels of different colors of the color display element in a plan view, and at least one of the first bus lines extending in the first direction while bending, and including multiple bending points, at least one of multiple bending points included in one of the first bus lines overlapping one of the display electrodes in a plan view, or at least one of the second bus lines extending in the second direction while bending, and including multiple bending points, at least one of multiple bending points included in one of the second bus lines overlapping one of the display electrodes in a plan view.

25. The display device according to claim 24, wherein two adjacent first bus lines extend in the first direction while bending and include multiple bending points, and closest bending points of two adjacent first bus lines overlap one of the display electrodes in a plan view, or two adjacent second bus lines extend in the second direction while bending and include multiple bending points, and closest bending points of two adjacent second bus lines overlap one of the display electrodes in a plan view.

* * * * *